United States Patent
Nakamura et al.

(10) Patent No.: US 7,672,474 B2
(45) Date of Patent: Mar. 2, 2010

(54) ELECTRONIC WATERMARK EMBEDDING DEVICE, ELECTRONIC WATERMARK DETECTION DEVICE, METHOD THEREOF, AND PROGRAM

(75) Inventors: Takao Nakamura, Kanagawa (JP); Atushi Katayama, Tokyo (JP); Masashi Yamamuro, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1210 days.

(21) Appl. No.: 10/548,755

(22) PCT Filed: Jan. 31, 2005

(86) PCT No.: PCT/JP2005/001345
§ 371 (c)(1),
(2), (4) Date: Sep. 8, 2005

(87) PCT Pub. No.: WO2005/074248
PCT Pub. Date: Aug. 11, 2005

(65) Prior Publication Data
US 2008/0137903 A1    Jun. 12, 2008

(30) Foreign Application Priority Data

| Feb. 2, 2004 | (JP) | ............................. 2004-025899 |
| May 28, 2004 | (JP) | ............................. 2004-159840 |
| May 28, 2004 | (JP) | ............................. 2004-159841 |
| May 28, 2004 | (JP) | ............................. 2004-159842 |

(51) Int. Cl.
*G06K 9/00* (2006.01)
*H04L 9/32* (2006.01)

(52) U.S. Cl. ..................................... 382/100; 713/176
(58) Field of Classification Search ................. 382/100; 713/176
See application file for complete search history.

(56) References Cited

U.S. PATENT DOCUMENTS
6,141,441 A * 10/2000 Cass et al. .................. 382/166

(Continued)

FOREIGN PATENT DOCUMENTS
JP        11-98479         4/1999

(Continued)

OTHER PUBLICATIONS

Nakamura et al., "Digital Watermark Detection Scheme for Service Mediation Using Mobile Telephone with Camera", Forum on Information Technology FIT 2003, N-020, 2003.

(Continued)

*Primary Examiner*—Brian P Werner
*Assistant Examiner*—Randolph Chu
(74) *Attorney, Agent, or Firm*—Oblon, Spivak, McClelland, Maier & Neustadt, L.L.P.

(57) ABSTRACT

A digital watermark embedding apparatus of the present invention includes: a block dividing unit for dividing an input image into plural pixel blocks; a digital watermark information spreading unit for obtaining an embedding series having a length corresponding to a number of divided pixel blocks; a block-by-block embedding unit for selecting at least a frequency from predetermined plural frequencies according to a term value of the embedding series corresponding to a position of a pixel block in the image, amplifying amplitude of a waveform pattern corresponding to the selected frequency with an embedding strength value, and superimposing the waveform pattern in which the amplitude is amplified on the pixel block; and an image outputting unit for outputting an image on which a corresponding waveform pattern is superimposed on each pixel block by the block-by-block embedding unit.

6 Claims, 79 Drawing Sheets

U.S. PATENT DOCUMENTS 6,768,807 B1 * 7/2004 Muratani .................... 382/100

FOREIGN PATENT DOCUMENTS

| JP | 2000-287073 | 10/2000 |
| JP | 2003-209676 | 7/2003 |
| JP | 2003-219141 | 7/2003 |

OTHER PUBLICATIONS

U.S. Appl. No. 10/548,672, filed Sep. 8, 2005, Nakamura, et al.

* cited by examiner

ORIGINAL IMAGE

DIGITAL WATERMARK
EMBEDDED IMAGE
(PATTERN IS EMPHASIZED
FOR EXPLANATION)

DIGITAL WATERMARK
DETECTION OBJECT IMAGE

DETECTION VALUE MATRIX

DIGITAL WATERMARK
DETECTION OBJECT IMAGE

DETECTION VALUE MATRIX

FIG.39
(a) BINARIZING
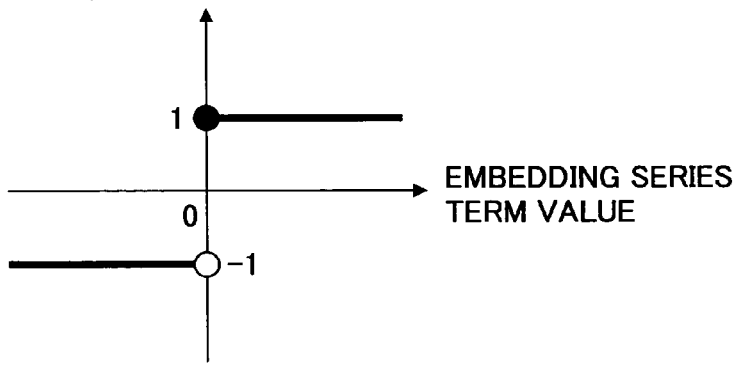
(b) QUANTIZING TO THREE VALUES
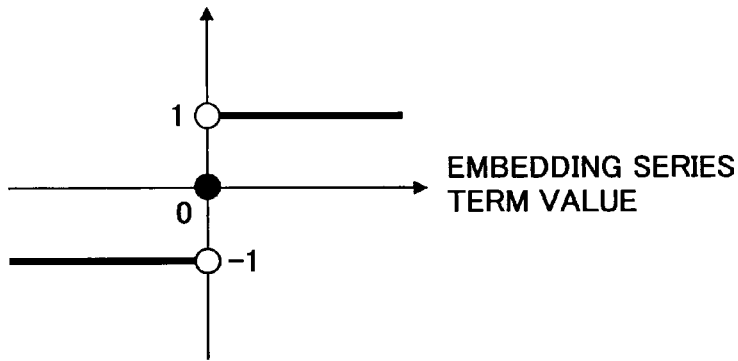
(c) QUANTIZING TO n VALUES
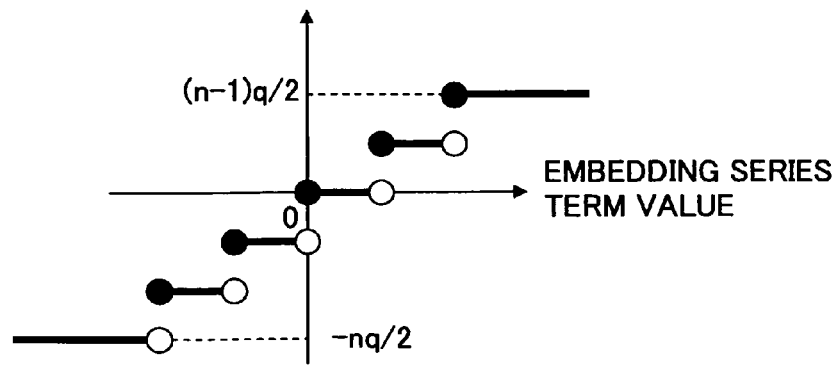

DETECTION OBJECT IMAGE DATA

DIGITAL WATERMARK DETECTION OBJECT IMAGE

FIG.52
(a) 
WAVEFORM PATTERN
OF FREQUENCY $f_0$
| 0 | 1 | 0 |
|---|---|---|
| -1 | 0 | 1 |
| 0 | -1 | 0 |
CONVOLUTION OPERATOR
CORRESPONDING TO
FREQUENCY $f_0$
(b) 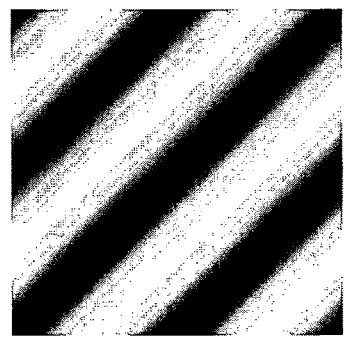
WAVEFORM PATTERN
OF FREQUENCY $f_1$
| 0 | -1 | 0 |
|---|---|---|
| -1 | 0 | 1 |
| 0 | 1 | 0 |
CONVOLUTION OPERATOR
CORRESPONDING TO
FREQUENCY $f_1$ FIG.55
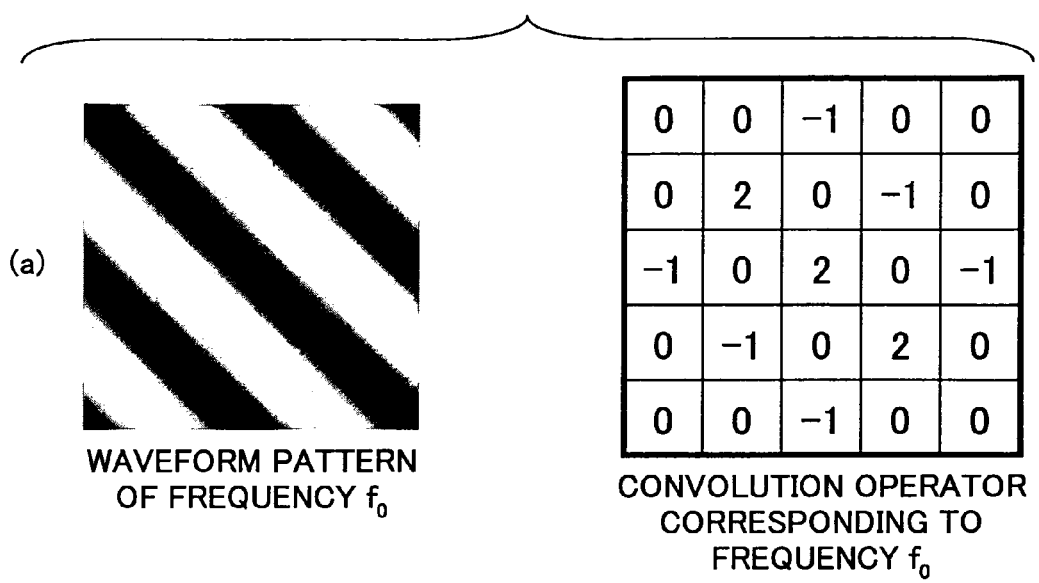
(a) WAVEFORM PATTERN OF FREQUENCY $f_0$ — CONVOLUTION OPERATOR CORRESPONDING TO FREQUENCY $f_0$
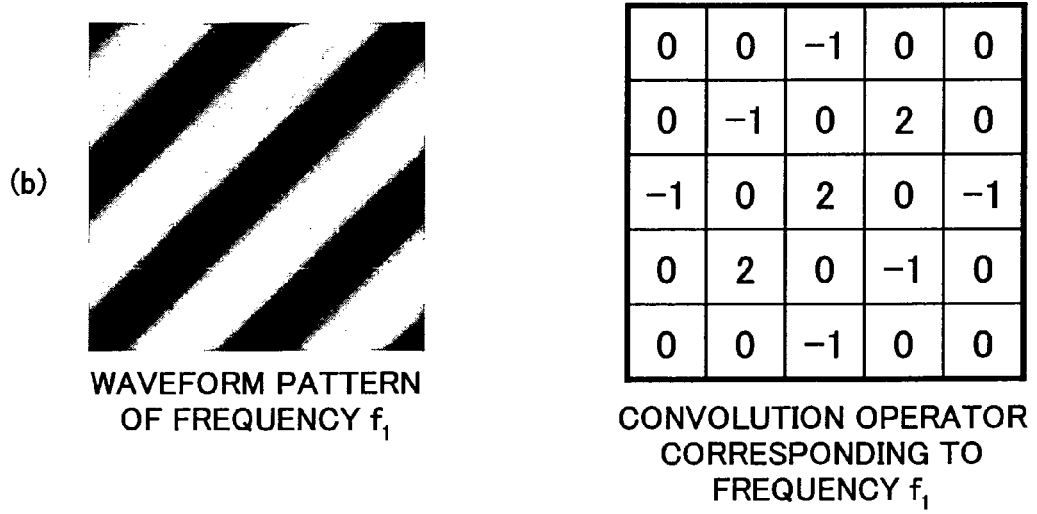
(b) WAVEFORM PATTERN OF FREQUENCY $f_1$ — CONVOLUTION OPERATOR CORRESPONDING TO FREQUENCY $f_1$

FIG.75
PIXEL BLOCK GROUP CORRESPONDING
TO EACH FILTER PROCESSED IMAGE
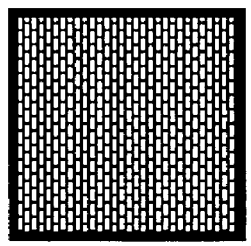 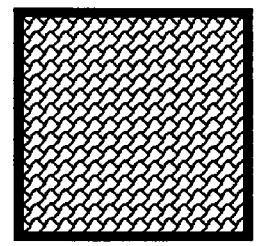
OBTAIN TOTAL SUM OF ABSOLUTE VALUES
OF PIXEL VALUES IN PIXEL BLOCK
500        100
PIXEL ABSOLUTE VALUE SUM GROUP
CORRESPONDING TO EACH PIXEL BLOCK FIG.76
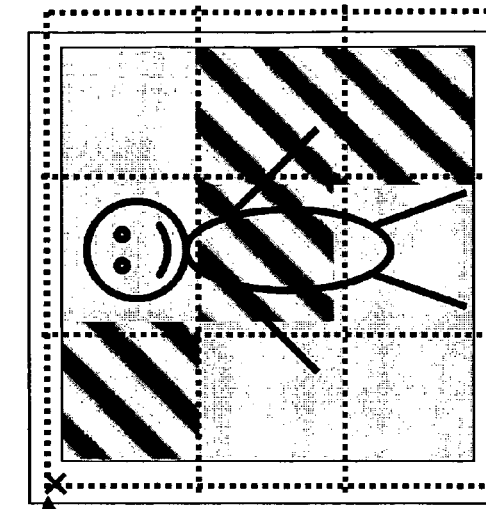
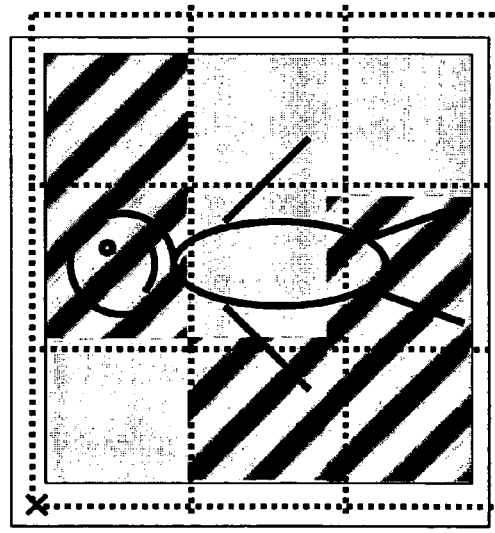

ELECTRONIC WATERMARK EMBEDDING DEVICE, ELECTRONIC WATERMARK DETECTION DEVICE, METHOD THEREOF, AND PROGRAM

TECHNICAL FIELD

The present invention relates to a digital watermark technology that is a technology for embedding sub-information into content such as an image or video such that the sub-information cannot be perceived by a human and for reading the sub-information. The digital watermark technology is currently used in copyright protection/management systems for content and in content service providing systems.

BACKGROUND ART

In order to achieve objectives for identifying and managing content and providing related information when distributing content such as the image, video and voice, there is a method using the digital watermarking technology for imperceptibly embedding another information into the content. Especially, for the usage in which a printed matter is input in a scanner or in a camera so as to detect digital watermark from the input image to provide related information (refer to non-patent document 1 and the like), a detection method that can perform processes at high speed is required for detecting the digital watermark in a terminal such as a mobile telephone that lacks enough computational resources.

Although geometric conversion caused by camera angle is corrected using a frame line and the like, and lens distortion is corrected using distortion coefficients determined beforehand (refer to the non-patent document 1), since an error may occur to some extent according to accuracy of correction, geometric distortion remains to some extent in an image from which the digital watermark is to be detected. Conventionally, as a digital watermark technology that has tolerance to such geometric distortion, there is a method disclosed in patent document 1.

However, in the conventional technology, there is no digital watermark embedding method and no detection method that can perform the detection process at high speed in a terminal while allowing some geometric distortion.

[Non-patent Document 1]
Nakamura, Katayama, Miyaji, Yamashita, Yamamuro "Digital watermark detection scheme for service mediation using mobile telephone with camera", Forum on Information Technology FIT 2003, N-020, September 2003.

[Patent Document 1]
Japanese Laid-Open Patent Application No. 2000-287073

DISCLOSURE OF THE INVENTION

Problem to be Solved by the Invention

The present invention is contrived from the viewpoint of the above-mentioned problems, and an object of the present invention is to provide a digital watermark embedding technology and a digital watermark detection technology that have tolerance to some geometric distortion and that can detect the digital watermark at high speed even in an environment such as a mobile telephone in which computational resources are limited.

Mean for Solving the Problem

The object is achieved by a digital watermark embedding apparatus for embedding digital watermark information into an image, the digital watermark embedding apparatus including:
a block dividing unit for dividing an input image into plural pixel blocks;
a digital watermark information spreading unit for spreading input digital watermark information to obtain an embedding series having a length corresponding to a number of divided pixel blocks;
a block-by-block embedding unit for selecting at least a frequency from predetermined plural frequencies according to a term value of the embedding series corresponding to a position of a pixel block in the image, amplifying amplitude of a waveform pattern corresponding to the selected frequency with an embedding strength value, and superimposing the waveform pattern in which the amplitude is amplified on the pixel block; and
an image output unit for outputting an image on which a corresponding waveform pattern is superimposed on each pixel block by the block-by-block embedding unit.

According to the present invention, a digital watermark embedded image in which digital watermark information is superimposed on the original image as a specific frequency waveform pattern for each pixel block can be obtained. As to such digital watermark embedded image, since detection of the size of the frequency energy can be stably performed even when a cut out position of the pixel block is shifted to some extent when detecting digital watermark information, high speed detection process having tolerance to geometric distortion to some extent can be realized.

The block-by-block embedding unit in the digital watermark embedding apparatus may quantize the term value of the embedding series, and select the at least a frequency according to the quantized value.

The block-by-block embedding unit may select the at least a frequency according to a sign of the term value of the embedding series, amplify the amplitude of the waveform pattern corresponding to the selected frequency with an absolute value of the term value of the embedding series in addition to the embedding strength value to superimpose the amplitude amplified waveform pattern on the pixel block.

In the digital watermark embedded image obtained by superimposing the waveform pattern in such a way, detection performance when detecting digital watermark can be improved.

The above-object is also achieved by a digital watermark detection apparatus including:
a block dividing unit for dividing an input image into plural pixel blocks;
a block-by-block detection unit for, for a pixel block, determining a frequency having a larger energy from two kinds of frequencies associated with a sign + and a sign −, obtaining a sign corresponding to the determined frequency, and obtains a value according to the sign as a detection value corresponding to the pixel block; and
a watermark information despreading unit for despreading a series of detection values corresponding to the plural pixel blocks obtained by the block-by-block detection unit so as to detect the digital watermark information embedded in the image.

As to the digital watermark embedded image on which the waveform pattern is superimposed, since detection of the size of the frequency energy can be stably performed even when a cut out position of the pixel block is shifted to some extent when detecting digital watermark information, a digital watermark detection apparatus can be realized that enables detection process having tolerance to geometric distortion to some extent according to the present invention. In addition, when determining detection information from each pixel block, it is not necessary to perform frequency transform for the whole pixel blocks and it is only necessary to calculate energy of particular frequencies. Thus, the detection process can be performed at high speed.

The block-by-block detection unit may obtain a detection value matrix by setting the detection values corresponding to the pixel blocks as values of elements of a matrix in which elements are arranged like plural pixel blocks in the image, so that the watermark information despreading unit obtains the series of the detection values from the detection value matrix.

The block-by-block detection unit may, for a pixel block, obtain energy values for two kinds of frequencies associated with a sign + and a sign − respectively, and subtract an energy value of a frequency associated with the sign − from an energy value of a frequency associated with the sign + to obtain a value as a detection value corresponding to the pixel block.

In addition, the block-by-block detection unit may, for a pixel block, obtain an absolute value of a difference between energy values for two kinds of frequencies associated with a sign + and a sign − respectively, determine a frequency having a larger energy from two kinds of frequencies, obtaining a sign corresponding to the determined frequency, and obtain a value by adding the sign to the absolute value of the difference as a detection value corresponding to the pixel block.

In addition, the block-by-block detection unit may, for a pixel block, determine a frequency having the largest energy among predetermined plural frequencies, and obtain a value corresponding to the determined frequency as a detection value corresponding to the pixel block.

The watermark information despreading unit may despread the series of the detection values to obtain an index value indicating presence or absence of digital watermark and information obtained by the despreading, and output digital watermark detection impossible when the index value indicating presence or absence of digital watermark is smaller than a predetermined threshold, and output the information obtained by the despreading as the digital watermark information when the index value is equal to or greater than the threshold. In this process, index value indicating presence or absence of digital watermark is an absolute sum of correlation values corresponding to each bit in despreading calculation, for example.

By performing such process by the watermark information despreading unit, reliability of the detected digital watermark information when detection succeeds improves, and it becomes possible to output detection impossible with reliability avoiding to output erroneous information as correctly detected when detection is impossible.

The above-object is also achieved by a digital watermark detection apparatus for detecting digital watermark information from an image on which a waveform pattern is superimposed on each pixel block, the digital watermark detection apparatus including:

a block dividing unit for dividing an input image into plural divided regions, and obtaining, from each divided region, a pixel block that is a region reduced inward by a predetermined size from each end of the divided region;

a block-by-block detection unit for, for a pixel block, obtaining two energy values for two kinds of frequencies associated with a sign + and a sign − respectively, and subtracting an energy value of a frequency associated with the sign − from an energy value of a frequency associated with the sign + to obtain a value as a detection value corresponding to the pixel block; and a watermark information despreading unit for despreading a series of detection values corresponding to the plural pixel blocks obtained by the block-by-block detection unit so as to detect the digital watermark information embedded in the image.

As to the digital watermark embedded image on which the waveform pattern is superimposed, since detection of the size of the frequency energy can be stably performed even when a cut out position of the pixel block is shifted to some extent when detecting digital watermark information, a digital watermark detection apparatus can be realized that enables detection process having tolerance to geometric distortion to some extent according to the present invention. In addition, when determining detection information from each pixel block, it is not necessary to perform frequency transform for the whole pixel blocks and it is only necessary to calculate energy of particular frequencies. Thus, the detection process can be performed at high speed. In addition, since a pixel block that is a region reduced inward by a predetermined size from each end of the divided region is obtained, even when cut out position of the pixel block is shifted to some extent, a probability that a cut out pixel block straddles a border between original pixel blocks becomes low. That is, since pixel blocks on which another frequency pattern is superimposed are not included, tolerance to some geometrical distortion is further improved.

The digital watermark detection apparatus can be also configured to include:

a block dividing unit for dividing an input image into plural pixel blocks;

a block-by-block detection unit for, for a pixel block and for each frequency of two kinds of frequencies associated with a sign + and a sign − respectively, applying a directional convolution operator corresponding to the frequency to each pixel of the pixel block to obtain operator applied values so as to obtain sum of absolute values of the operator applied value, and subtracting the sum of absolute values corresponding to the frequency corresponding to the sign − from the sum of absolute values corresponding to the frequency corresponding to the sign + to obtain a value as a detection value corresponding to the pixel block; and a watermark information despreading unit for despreading a series of detection values corresponding to the plural pixel blocks obtained by the block-by-block detection unit so as to detect the digital watermark information embedded in the image.

As mentioned above, by determining the energy value by performing calculation using convolution operator, computational complexity can be lowered compared to a case in which the energy of the frequency is calculated using a definition formula, so that detection process can be performed at higher speed.

The digital watermark detection apparatus may include an image size conversion unit for converting an input image to a converted image having a predetermined size so as to divide the converted image into plural pixel blocks.

By performing the image size conversion process, the greater the size of the input image is, the more computational complexity is reduced, so that the detection process can be realized at higher speed. In addition, when the convolution calculation is used for obtaining the frequency energy, by converting (normalizing) the image size, wavelength of the frequency pattern is determined. Thus, a convolution operator in which wavelength after normalized is considered can be used. Thus, since the frequency energy can be measured with higher precision, tolerance improves further.

The digital watermark detection apparatus can be also configured to include:

a pre-process filter processing unit for applying pre-process filter processing to an input image for reducing low frequency components to obtain a filter processed image;

a block dividing unit for dividing the filter processed image into plural pixel blocks;

a block-by-block detection unit for, for a pixel block, obtaining energy values for two kinds of frequencies associated with a sign + and a sign – respectively, and subtracting an energy value of a frequency associated with the sign – from an energy value of a frequency associated with the sign + to obtain a value as a detection value corresponding to the pixel block; and a watermark information despreading unit for despreading a series of detection values corresponding to the plural pixel blocks obtained by the block-by-block detection unit so as to detect the digital watermark information embedded in the image.

By performing the pre-process filtering for reducing low frequency components, the effects of the pattern of the original image data against the frequency pattern can be reduced so that S/N ratio in which digital watermark is regarded as a signal and the original image is regarded as a noise can be improved. Accordingly, detection can be realized more robustly.

The block-by-block detection unit in the digital watermark detection apparatus may, for a pixel block, determine a frequency having the largest energy among predetermined plural frequencies, and obtain a value corresponding to the determined frequency as a detection value corresponding to the pixel block The above-object can be also achieved by a digital watermark detection apparatus for detecting digital watermark information from an image on which a waveform pattern is superimposed on each pixel block, the digital watermark detection apparatus including:

a block dividing unit for dividing an input image into plural pixel blocks;

a block-by-block detection unit for, for a pixel block, obtaining two energy values for two kinds of frequencies associated with a sign + and a sign – respectively, subtracting an energy value of a frequency associated with the sign – from an energy value of a frequency associated with the sign + to obtain a value as a detection value corresponding to the pixel block, and obtaining a detection value matrix by setting detection values corresponding to each pixel block to element values in a matrix in which elements are arranged in the same way as the plural pixel blocks in the image; and a watermark information despreading unit for generating four matrixes by rotating arrangement of elements of the detection value matrix by 0 degree, 90 degrees, 180 degrees and 270 degrees respectively, reversing each sign of all elements of two matrixes rotated by 90 degrees and 270 degrees respectively, and outputting, as detected digital watermark information, most reliable piece of information among a group of pieces of information obtained by despreading detection value series obtained from the four matrixes.

As to the digital watermark embedded image on which the waveform pattern is superimposed, since detection of the size of the frequency energy can be stably performed even when a cut out position of the pixel block is shifted to some extent when detecting digital watermark information, a digital watermark detection apparatus can be realized that enables detection process having tolerance to geometric distortion to some extent according to the present invention. In addition, when determining detection information from each pixel block, it is not necessary to perform frequency transform for the whole pixel blocks and it is only necessary to calculate energy of particular frequencies. Thus, the detection process can be performed at high speed. In addition, according the present invention, the arrangement of the detection value matrix is rotated 90 degree by 90 degree, and when it is rotated by 90 degrees or 270 degrees, each sign of the detection values is reversed, so that a matrix group is obtained. Then, the despreading process is performed for each matrix to output most reliable detected watermark information. Therefore, high speed watermark detection can be realized while addressing the 90 degree by 90 degree rotation of the image.

The digital watermark detection apparatus of the present invention can be also configured to include:

a frequency-by-frequency filter processed image group generation unit for applying, for each of two kinds of frequencies associated with a sign + and a sign – respectively, a convolution operator corresponding to the frequency to an input image to obtain filter processed images each corresponding to one of the frequencies;

a search position setting unit for setting coordinates of a point in a predetermined search region;

a block cut out position response value calculation unit for performing block dividing on each image in the filter processed images each corresponding to one of the frequencies using the coordinates as a block cut out position, obtaining pixel blocks located in the same block position from the images each corresponding to one of the frequencies, obtaining, for each pixel block in the pixel blocks located in the same block position, sum of absolute values of pixel values of all pixels in the pixel block to obtain a pixel absolute value sum group and obtain a largest value in the pixel absolute value sum group as a largest absolute value sum, and performing processes for obtaining the largest absolute value sum for every block position to obtain total sum of largest absolute value sums and output the total sum as a block cut out position response value;

a block cut out position detection unit for obtaining block cut out position response values by the block cut out position response value calculation unit for each point in the search region set by the search position setting unit, and detecting, as the block cut out position, coordinates corresponding to a largest block cut out position response value among block cut out position response values corresponding to each point;

a detection value matrix configuration unit for dividing the input image into plural pixel blocks based on the coordinates of the block cut out position, and, for a pixel block, obtaining two energy values for two kinds of frequencies associated with a sign + and a sign – respectively, subtracting an energy value of a frequency associated with the sign – from an energy value of a frequency associated with the sign + to obtain a value as a detection value corresponding to the pixel block, and obtaining a detection value matrix by setting detection values corresponding to each pixel block to element values in a matrix in which elements are arranged in the same way as the plural pixel blocks in the image; and a watermark information despreading unit for despreading a series of detection values corresponding to the plural pixel blocks obtained by the block-by-block detection unit so as to detect the digital watermark information embedded in the image.

According to the present invention, when performing detection from the detection object image including some geometric distortion, a block cut out position by which detection gain becomes the largest is searched for efficiently. Thus, by obtaining detected watermark information by generating the detection value matrix from the detected block cut out position, watermark detection that further improves tolerance to some geometric distortion can be realized.

When obtaining a detection value corresponding to a frequency, the block cut out position response value calculation unit may determine, for a pixel block, a frequency having the largest energy among predetermined plural frequencies, and obtain a value corresponding to the determined frequency as the detection value corresponding to the pixel block.

EFFECT OF THE INVENTION

According to the present invention, it becomes possible to provide digital watermark embedding technology and digital watermark detection technology that have tolerance to geometric distortion to some extent and that can detect the digital watermark at high speed even in an environment such as the mobile telephone in which computational resources are limited.

BRIEF DESCRIPTION OF THE DRAWINGS

FIG. 39 is a figure for explaining the operation of the embedding series term quantization unit 74;

FIG. 52 is a figure for explaining the operation of the frequency corresponding detection value determination unit 110;

FIG. 55 is a figure for explaining effects of the seventh embodiment;

FIG. 75 is a figure for explaining the operation of a pixel absolute value sum calculation unit 151;

FIG. 76 is a figure for explaining an operation effect of the block cut out position response value calculation unit 146;

Figure 1:
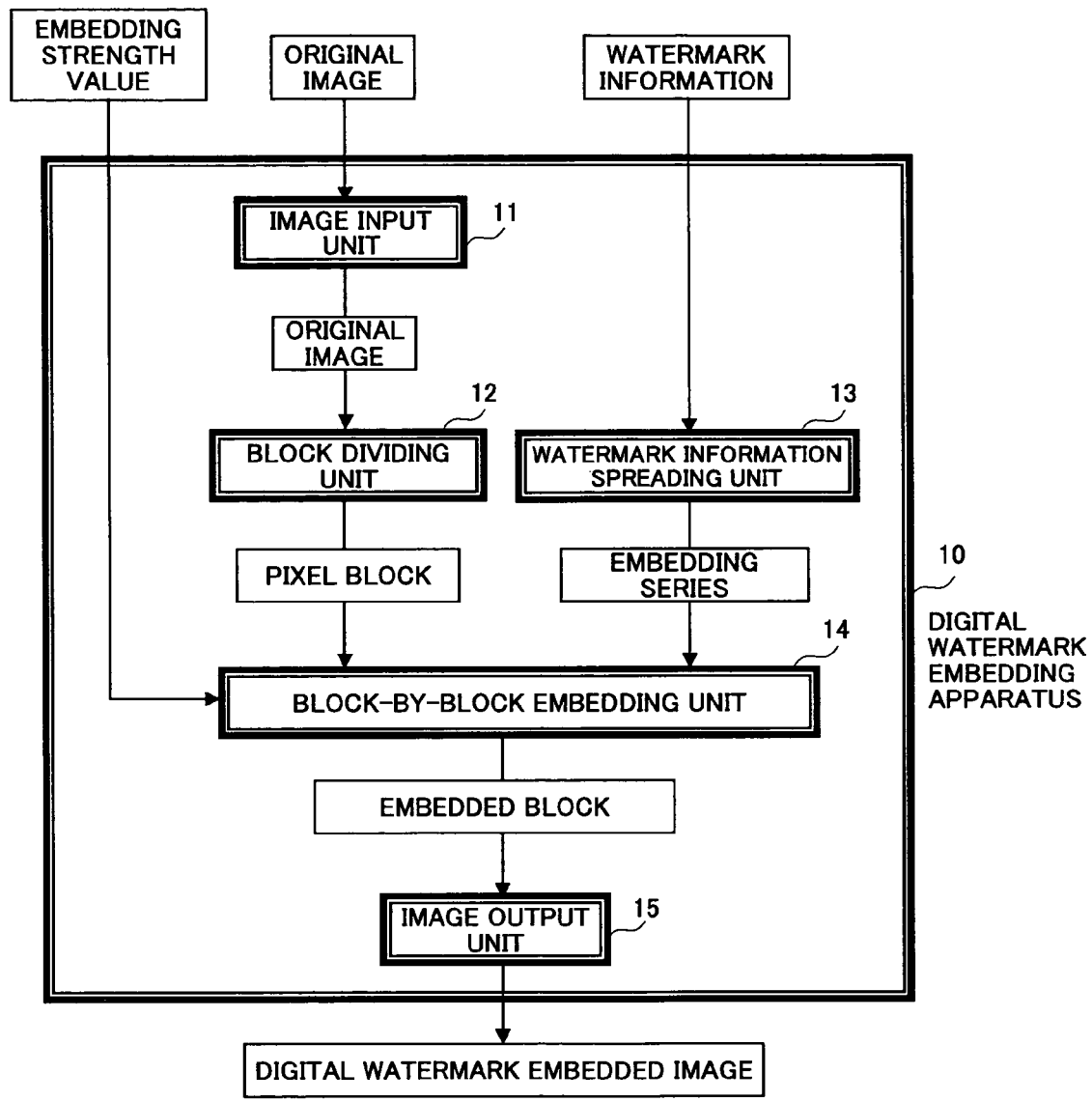
FIG. 1 is a block diagram of a digital watermark embedding apparatus 10 in a first embodiment of the present invention.

EXPLANATION OF SYMBOLS 10 digital watermark embedding apparatus
11, 31 image input unit
12, 32, 100, 150, 155 block dividing unit
13 watermark information spreading unit
14, 50, 70 block-by-block embedding unit
15 image output unit
16 error correction/detection encoding unit
17, 39, 162 pseudorandom number generator
18 embedding series generation unit
19, 51, 71 embedding term selection unit
20, 52, 72 frequency selection unit
21, 53, 73 frequency pattern superimposing unit
22, 54 embedding series term sign obtaining unit
23, 55, 75 selection unit
24, 37, 93, 144 sign corresponding frequency database
25, 57 waveform pattern generation unit
26, 58 waveform pattern superimposing unit
33, 60, 80, 90 block-by-block detection unit
34, 130, 160 watermark information despreading unit
35, 61, 81, 91, 110 frequency corresponding detection value determination unit
36, 62, 82, 92 detection value matrix setting unit
38, 161 one-dimensionalizing processing unit
40, 133, 163 despreading unit
41, 134, 164 error correction/detection decoding unit
74 embedding series term quantization unit
76, 83 quantization corresponding frequency database
101 region dividing unit
102 pixel block cutting out unit
111 convolution calculation unit
112 convolution result absolute value adding unit
113 detection value determination unit
120 image size normalization unit
121 pre-process filter processing unit
131 90°-by-90° one-dimensionalizing process unit
135 detection watermark information selection unit
140 detection value matrix generation unit
141 filter processed image group generation unit corresponding to each frequency
142, 148 block cut out position detection unit
143 detection value matrix configuration unit
145 search position setting unit
146 block cut out position response value calculation unit
147 block cut out position response value buffer
151, 156 pixel absolute value sum calculation unit
152 largest value absolute value sum determination unit
153 largest value absolute value sum adding unit
157 largest energy frequency determination unit
158 detection value matrix element value setting unit

PREFERRED EMBODIMENTS FOR CARRYING OUT THE INVENTION

In the following, embodiments of the present invention are described with reference to figures.

First Embodiment

In the first embodiment, the digital watermark embedding technology is described first, and the digital watermark detecting technology is described next.

(Digital Watermark Embedding)

Figure 2:
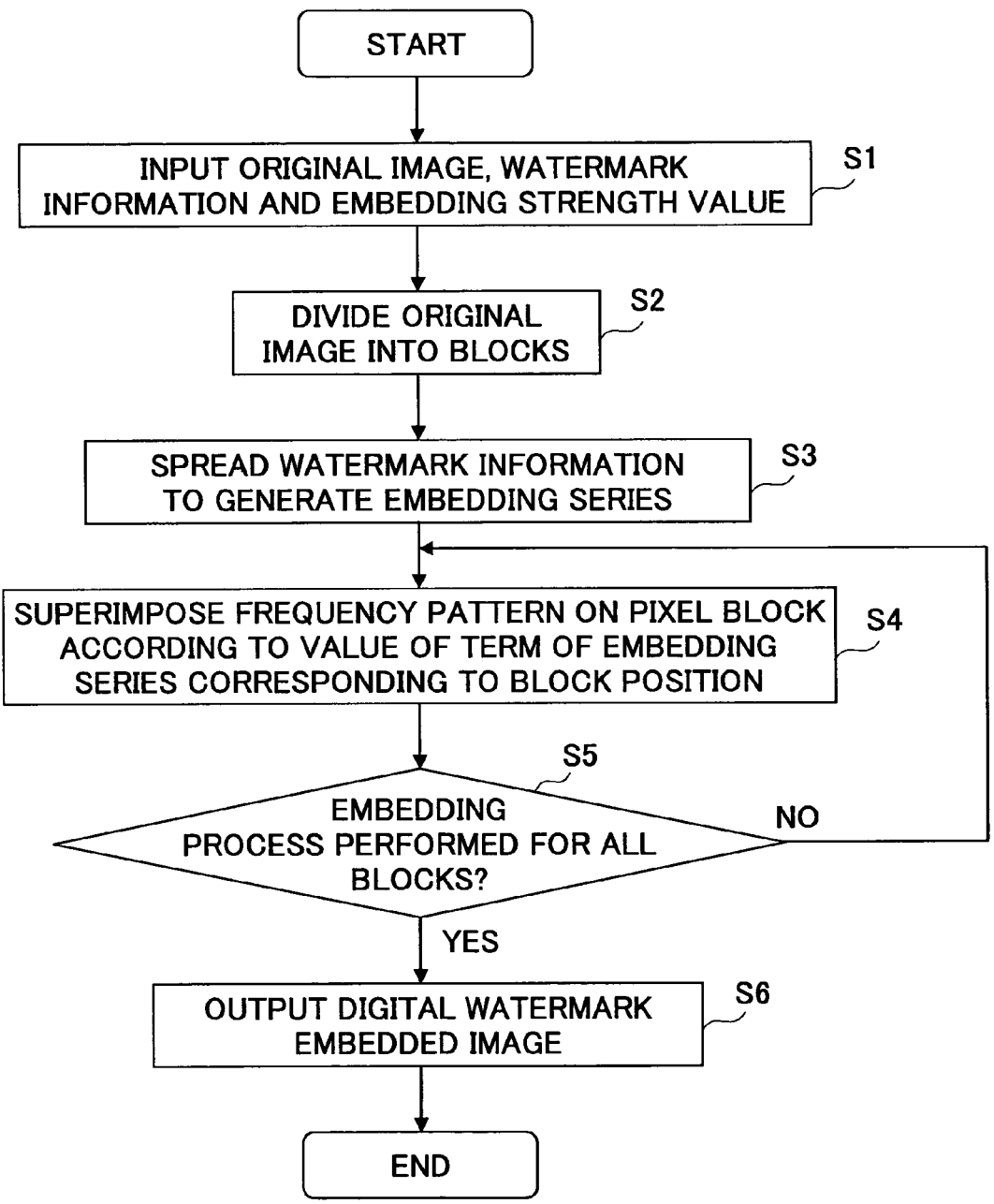
FIG. 2 is a figure showing a process flow of the digital watermark embedding apparatus 10.

FIG. 1 shows a configuration of a digital watermark embedding apparatus 10 in the first embodiment of the present invention. FIG. 2 shows a flowchart showing a process flow of the digital watermark embedding apparatus 10.

As shown in FIG. 1, the digital watermark embedding apparatus 10 in the first embodiment includes an image input unit 11, a block dividing unit 12, a watermark information spreading unit 13, a block-by-block embedding unit 14 and an image output unit 15. The operation of the digital watermark embedding apparatus 10 having such a configuration is described with reference to the flowchart shown in FIG. 2.

First, an original image, an embedding strength value and watermark information are supplied (step 1). The original image is supplied via the image input unit 11 such as a camera, for example. The embedding strength value is a parameter for specifying the strength by which a digital watermark pattern is embedded in the image and is supplied to the block-by-block embedding unit 14 (wherein the larger the parameter is, the greater the degree is in which the image quality deteriorates, but detection of the digital watermark becomes more stable.). The watermark information is information to be embedded in the original image and is supplied to the watermark information spreading unit 13.

The original image input by the image input unit 11 is passed to the block dividing unit 12, so that the block dividing unit 12 divides the original image into plural pixel blocks (step 2). The watermark information spreading unit 13 generates an embedding series by spreading the input watermark information (step 3).

The block-by-block embedding unit 14 receives pixel blocks divided by the block dividing unit 12 and the embedding series generated by the watermark information spreading unit 13 so as to select a frequency from plural frequencies determined beforehand for each pixel block according to a sign of a value of the embedding series corresponding to a block position, amplify an amplitude of a waveform of the selected frequency with the embedding strength value and superimpose the waveform on the block to obtain a embedded block (step 4).

When the frequency embedding process ends for every pixel block in the block-by-block embedding unit 14 (Yes in step 5), the image output unit 15 outputs every pixel block in which the waveform of the frequency is embedded as an digital watermark embedded image (step 6).

In the following, processes of each unit are described in more detail.

Figure 3:
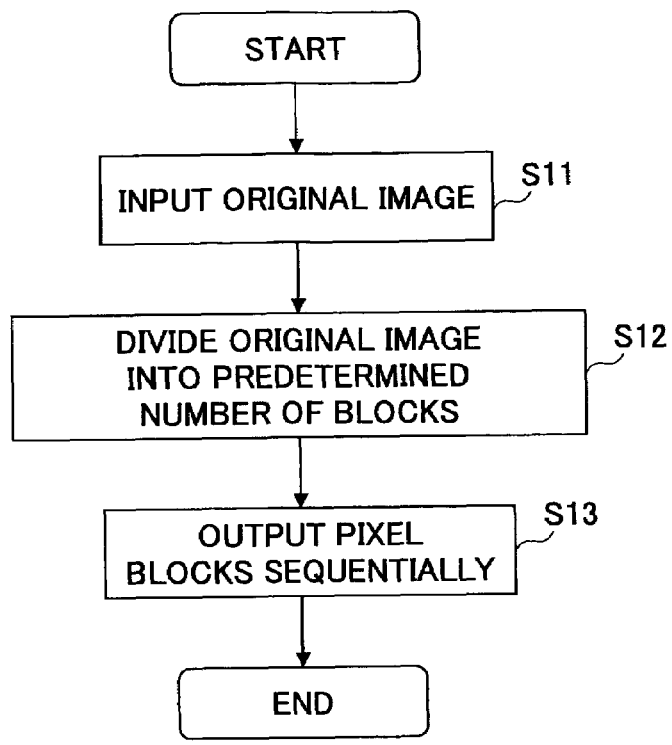
FIG. 3 is a figure showing a process flow of a block dividing unit 12.
Figure 4:
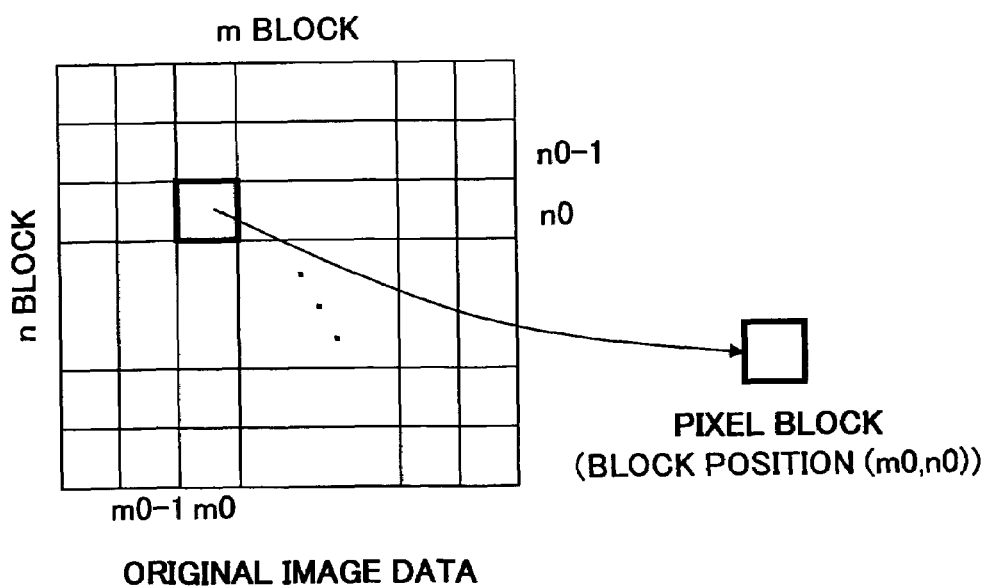
FIG. 4 is a figure showing processes in the block dividing unit 12.

FIG. 3 shows a process flow in the block dividing unit 12 of the digital watermark embedding apparatus 10. When the block dividing unit 10 receives the original image (step 11), the block dividing unit 10 divides the original image into a predetermined number of pixel blocks (step 12), and outputs the pixel blocks in sequence (step 13). In the dividing process into the pixel blocks in step 12, the original image is divided into pixel blocks of m×n as shown in FIG. 4, for example. Then, block position information of the pixel block on the original image is added to each pixel block to be output.

Figure 5:
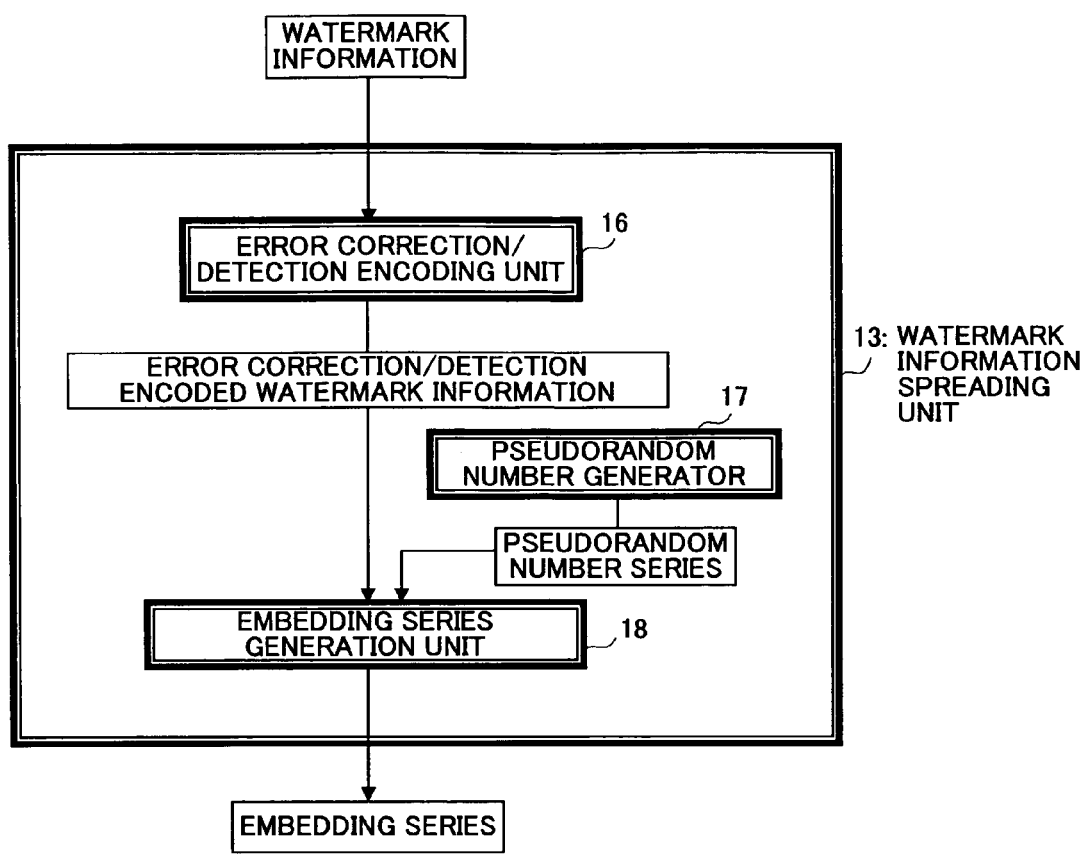
FIG. 5 is a block diagram of a watermark information spreading unit 13.
Figure 6:
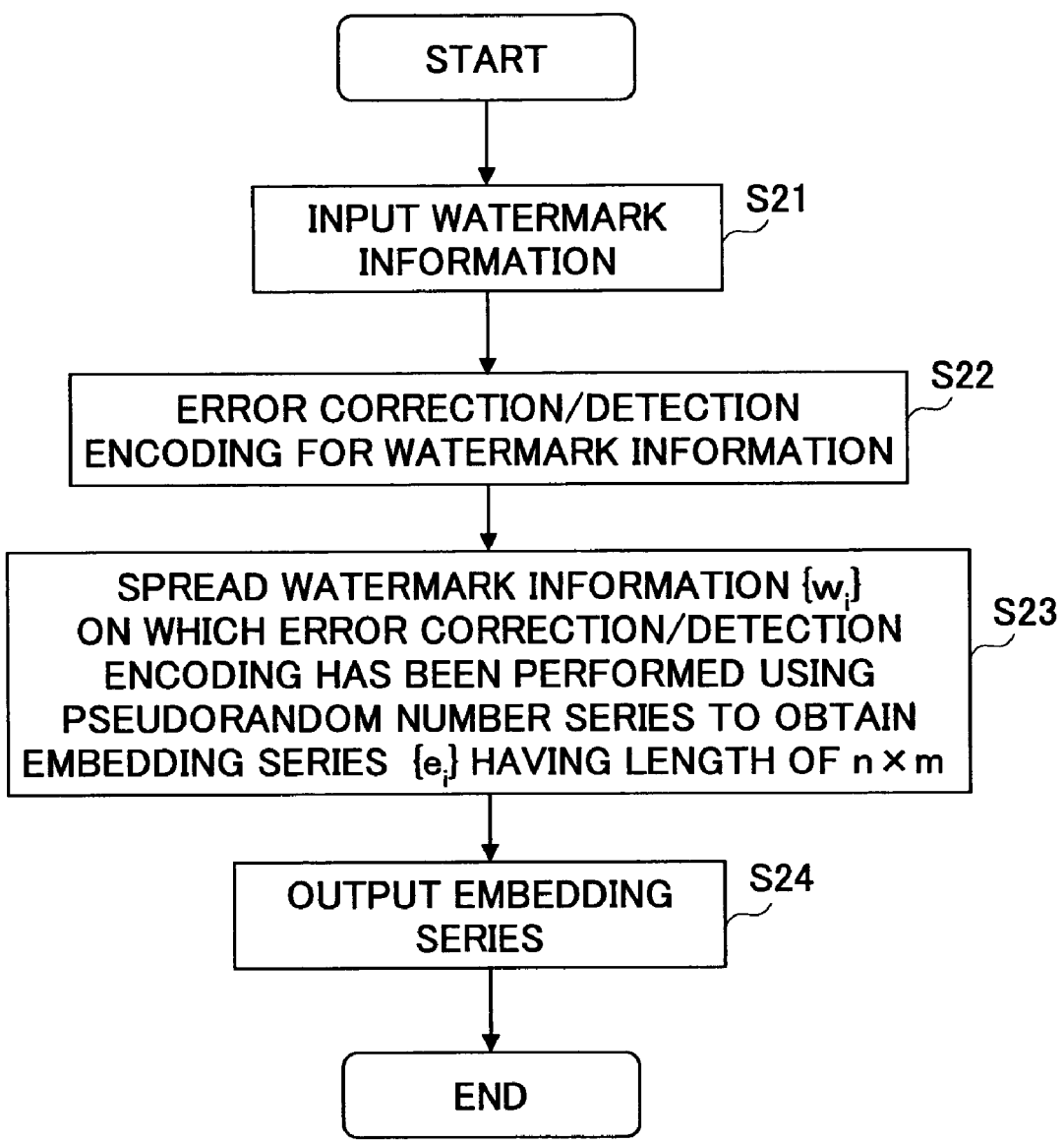
FIG. 6 shows a process flow of the watermark information spreading unit 13.

FIG. 5 shows a configuration of the watermark information spreading unit 13, and FIG. 6 shows a process flow of the unit. The watermark information spreading unit 13 includes an error correction/detection encoding unit 16, a pseudorandom number generator 17 and an embedding series generation unit 18.

As shown in FIG. 6, watermark information is supplied first (step 21), so that the error correction/detection encoding unit 16 performs error correction/detection encoding for the watermark information (step 22). As the error correction/detection encoding method, any method such as BCH code or Reed Solomon code can be used. Next, the embedding series generation unit 18 spreads the watermark information on which the error correction/detection encoding has been performed into an embedding series that is a sequence having a length m×n using the pseudorandom number series generated by the pseudorandom number generator 17 wherein the length m×n corresponds to the total number of the divided pixel blocks in the block dividing unit 12 (step 23), so as to output the embedding series (step 24). An initial value for generating the pseudorandom numbers in the pseudorandom number generator 17 may be a parameter input from the outside as a key parameter for watermarking. By using this method, following effects can be obtained, for example: independent digital watermark embedding can be realized using different key parameters, and it becomes difficult to estimate an embedding algorithm.

Concrete examples ((A)-(C)) of the method for spreading the watermark information in the embedding sequence generation part 18 are shown below:

(A) Assuming that watermark information (S bits) on which error correction/detection encoding has been performed is $\{w_i\}$ (i=0~S−1), and that the pseudorandom number series is $\{r_i\}$ (i=0~mn−1 (total number of pixel blocks)), the embedding series $\{e_i\}$ (i=0~mn−1) is obtained by:

$$e_i = r_i \times w_{i \% S} \ (i=0 \sim mn-1)$$

wherein $w_i=1$ or −1 ($w_i=1$ when i-th bit in the watermark information on which error correction/detection encoding has been performed is 1, $w_i=-1$ when i-th bit in the watermark information on which error correction/detection encoding has been performed is 0) and $r_i$ is a random number sequence wherein $r_i=1$ or −1. In addition, x % y is a surplus when dividing x by y.

(B) Assuming that watermark information (S bits) on which error correction/detection encoding has been performed is $\{w_i\}$ (i=0~S−1), and that two types of pseudorandom number series are generated in which one is $\{r1_i\}$ (i=0~mn−1) and another is $\{r2_i\}$ (i=0~mn−1), an array for permutation is generated using $\{r1_i\}$ first. For example, an array $\{p_i\}$ (i=0~mn−1) representing $$\begin{pmatrix} 0 & 1 & 2 & 3 & \ldots & mn-1 \\ p_0 & p_1 & p_2 & p_3 & \ldots & p_{mn-1} \end{pmatrix} \quad \text{[equation 1]}$$

is determined in the following way, wherein it is assumed that $r1_i$ is a random number of 0~mn−1:

```
For( i = 0 ; i<=mn-1 ; i++ ) {
    p_i = i;
}
For( i = 0 ; i<=mn-1 ; i++ ) {
    r = r1_i%mn;
    a = p_i;
    p_i = p_r;
    p_r = a;
}
```

Next, the embedding series $\{e_i\}$ (i=0~mn−1) is obtained in the following way:

$$e_i = r2_{p_i} \times w_{p_i \% S} \ (i=0 \sim mn-1)$$

wherein $w_i=1$ or −1 ($w_i=1$ when i-th bit in the watermark information on which error correction/detection encoding has been performed is 1, $w_i=-1$ when i-th bit in the watermark information on which error correction/detection encoding has been performed is 0) and $r2_i$ is a random number sequence wherein $r2_i=1$ or $-1$. In addition, x % y is a surplus when dividing x by y. As mentioned above, $\{r1_i\}$ is a pseudorandom number series for generating $\{p_i\}$, and $\{r2_i\}$ is a pseudorandom number series for spreading $\{w_i\}$.

(C) Assuming that watermark information (S bits) on which error correction/detection encoding has been performed is $\{w_i\}$ (i=0~S−1), and that the pseudorandom number series is $\{r_i\}$ (i=0~mn−1), the embedding series $\{e_i\}$ (i=0~mn−1) is obtained by:

$$e_i = \Sigma_{k=0 \sim S-1}(r_{(i+k)\% mn} \times w_k) \ (i=0 \sim mn-1)$$

wherein $w_i=1$ or $-1$ ($w_i=1$ when i-th bit in the watermark information on which error correction/detection encoding has been performed is 1, $w_i=-1$ when i-th bit in the watermark information on which error correction/detection encoding has been performed is 0) and $r_i$ is a random number sequence wherein $r_i=1$ or $-1$. In addition, x % y is a surplus when dividing x by y.

Although binary random number series is used in the above examples, other random number series such as a random number series complying with Gaussian distribution can be used for performing spreading.

Figure 7:
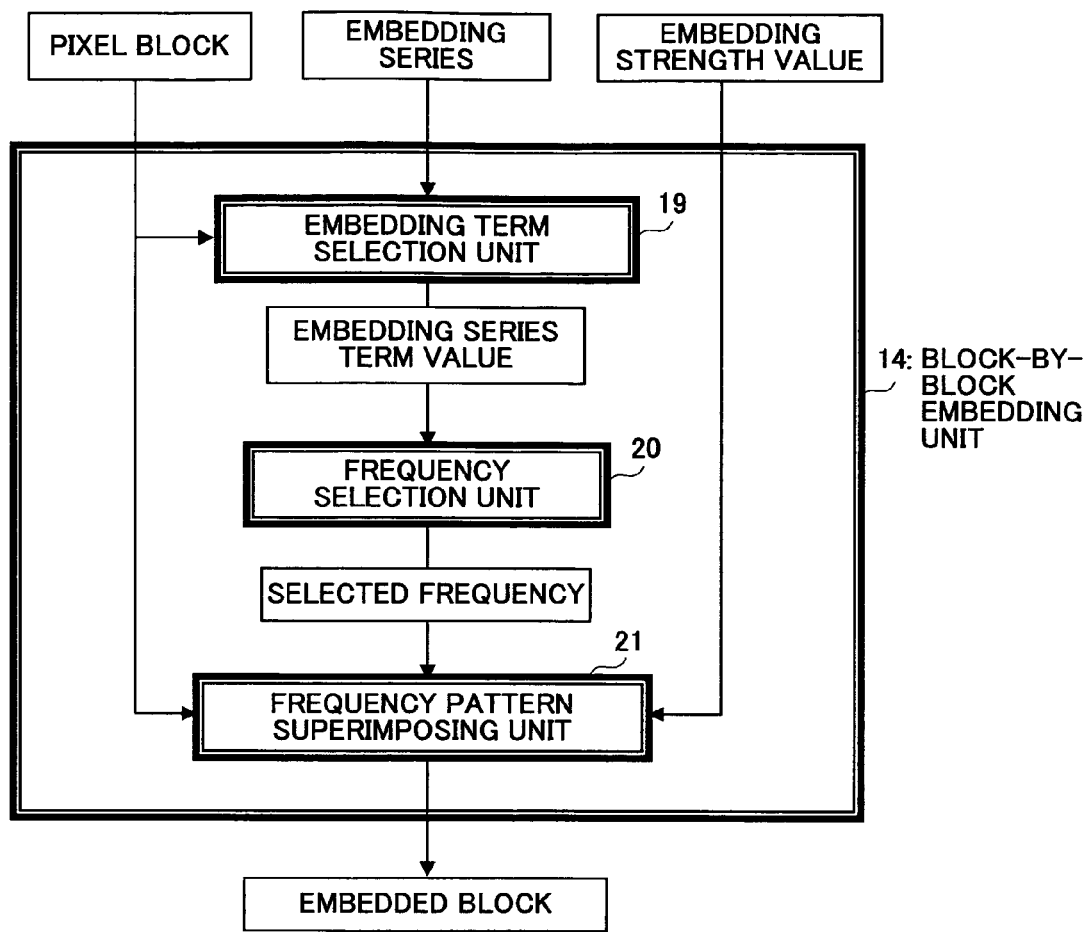
FIG. 7 is a block diagram of a block-by-clock embedding unit 14.
Figure 8:
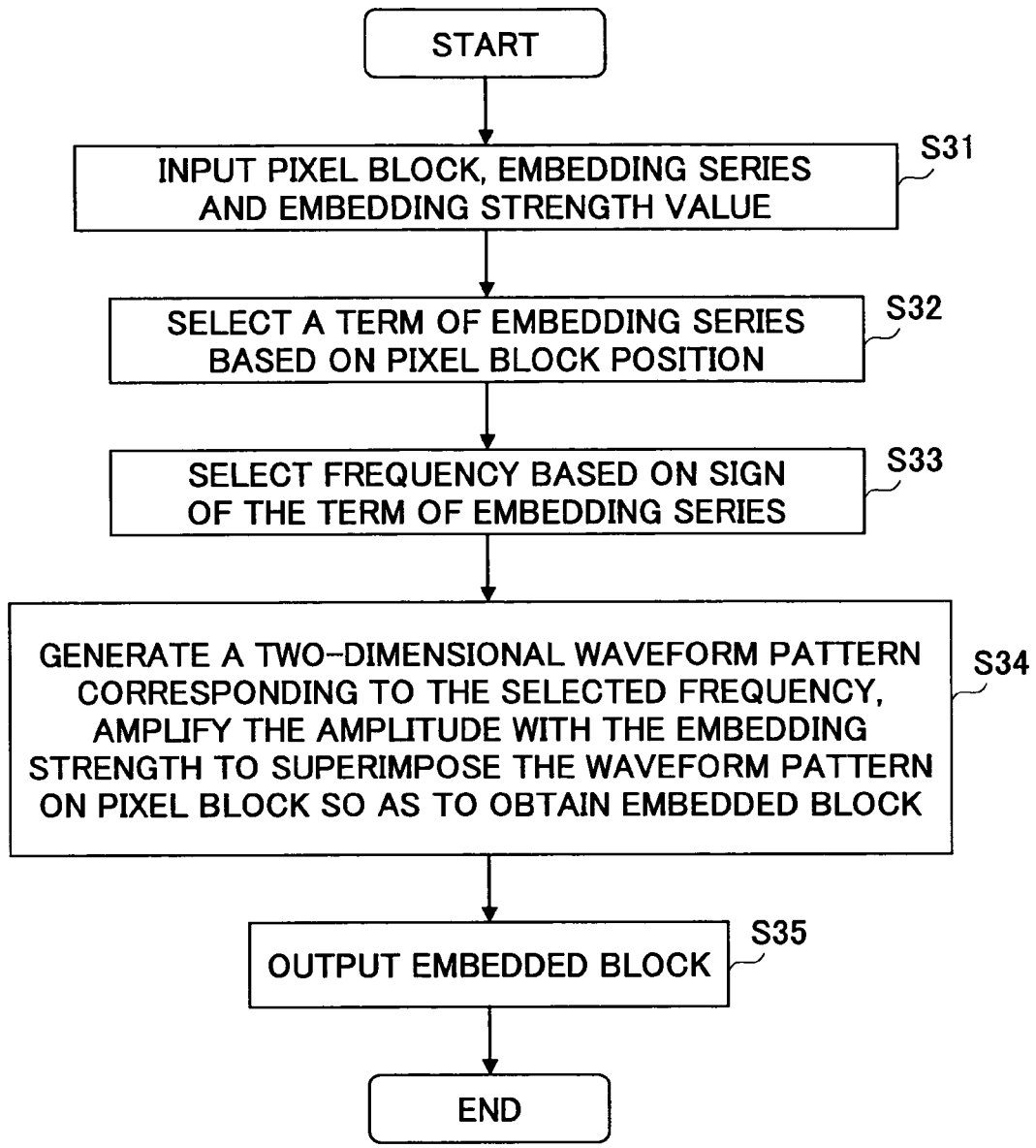
FIG. 8 shows a process flow of the block-by-clock embedding unit 14.

Next, the block-by-clock embedding unit 14 in the digital watermark embedding apparatus 10 in the present embodiment is described. FIG. 7 shows a configuration of the block-by-clock embedding unit 14, and a process flow of the unit is shown in FIG. 8. As shown in FIG. 7, the block-by-block embedding unit 14 includes an embedding term selection unit 19, a frequency selection unit 20 and a frequency pattern superimposing unit 21. In the following, the operation of the block-by-block embedding unit 14 including operations of each unit is described in detail.

Figure 9:
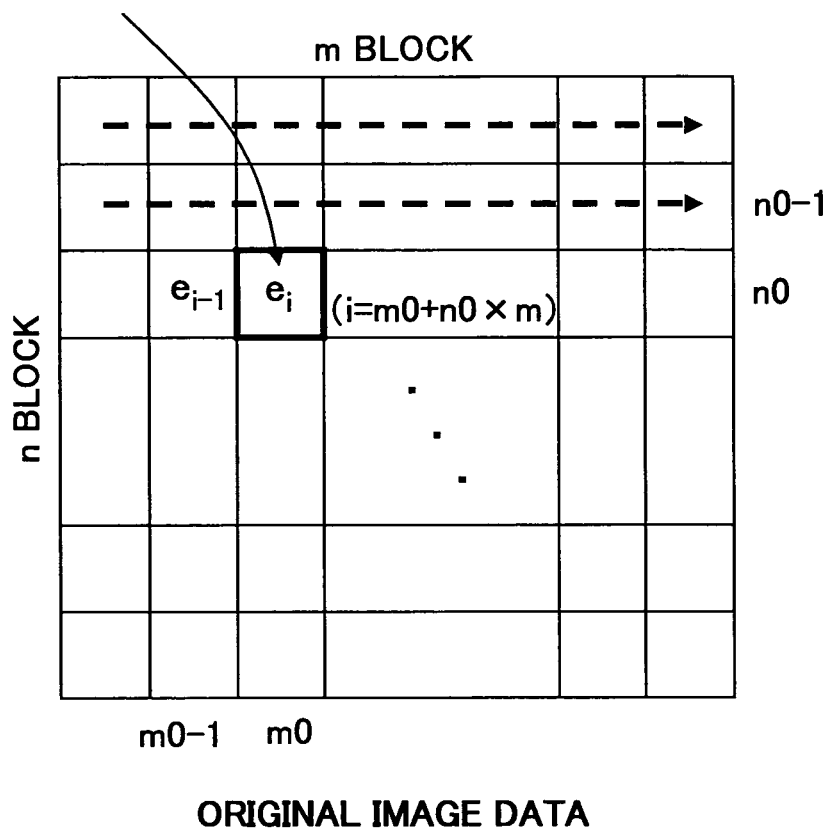
FIG. 9 is a diagram for explaining processes of an embedding term selection unit 19.

As shown in FIG. 8, when the block-by-block embedding unit 14 receives the pixel block, the embedding series and the embedding strength value (step 31), the embedding term selection unit 19 selects one term from the embedding series based on position information of the pixel block (step 32). The embedding term selection unit 19 selects a term of the embedding series having one-to-one correspondence with the block position such that, as shown in FIG. 9, when the position information of the pixel block is (m0, n0), a term $e_i$ of the embedding series wherein i=m0+n0×m (m is a total number of blocks in the x direction) is selected, for example.

Next, the frequency selection unit 20 selects a frequency based on a sign of the term of the embedding series (step 33). Then, the frequency pattern superimposing unit 21 generates a two-dimensional waveform pattern corresponding to the selected frequency, multiplies the amplitude of the waveform pattern by the embedding strength value to superimpose the amplitude-multiplied waveform pattern on the corresponding pixel block so as to obtain an embedded block (step 34) and outputs it (step 35). The block-by-block embedding unit 14 performs the above-mentioned process for every pixel block.

In the following, operations of the frequency selection unit 20 and the frequency pattern superimposing unit 21 in the block-by-block embedding unit 14 are described in more detail.

First, the frequency selection unit 20 is described in detail.

Figure 10:
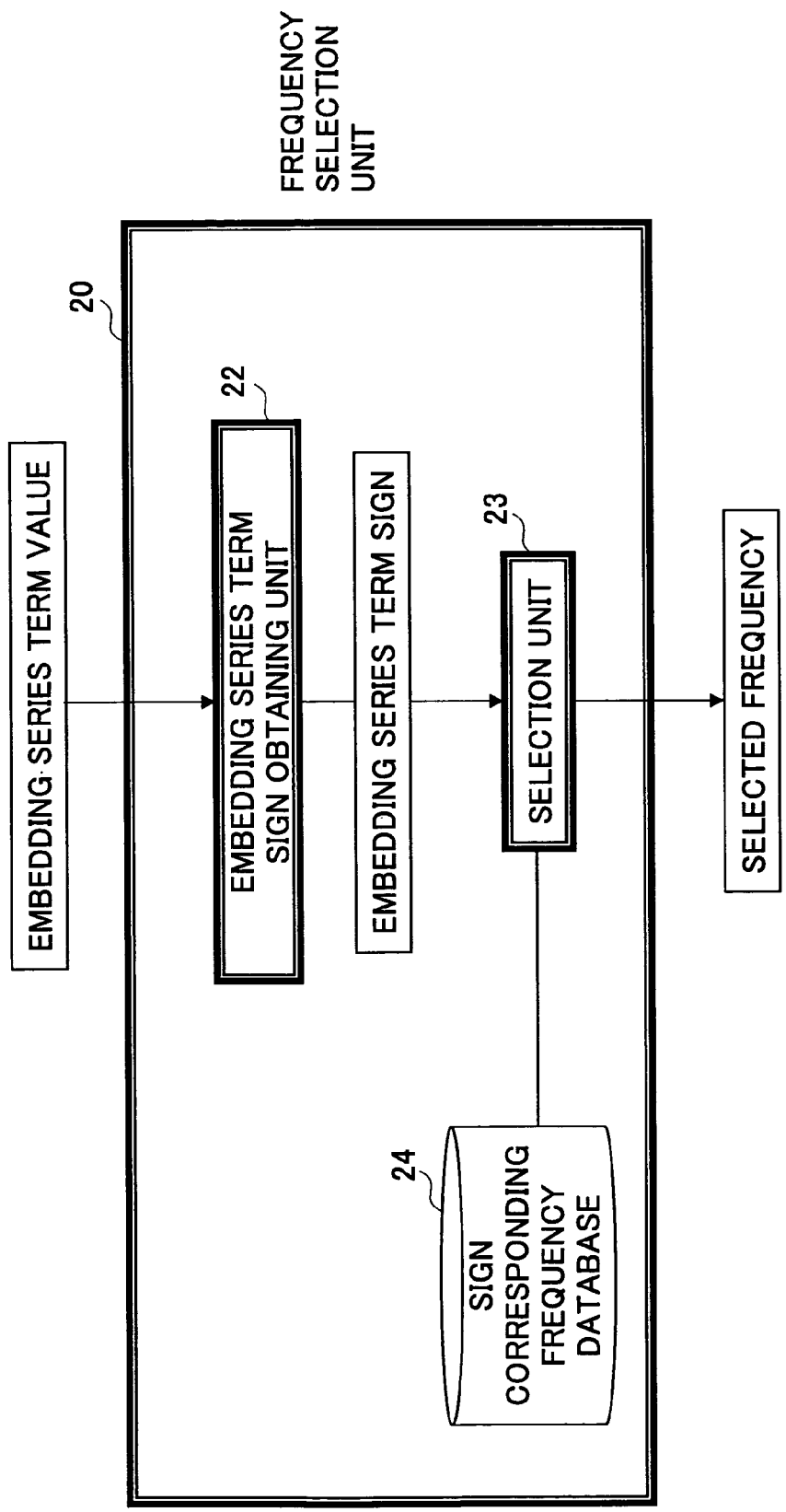
FIG. 10 is a block diagram of a frequency selection unit 20.
Figure 11:
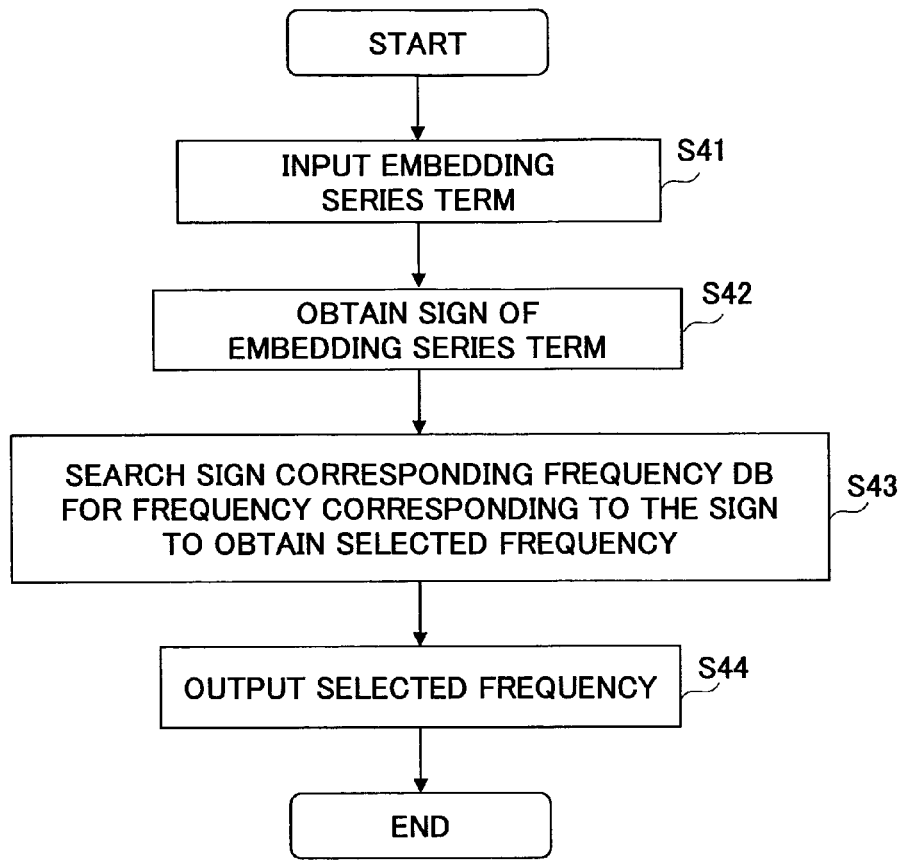
FIG. 11 shows a process flow of the frequency selection unit 20.

FIG. 10 shows a configuration of the frequency selection unit 20 and FIG. 11 shows a process flow of the unit. As shown in FIG. 10, the frequency selection unit 20 includes an embedding series term sign obtaining unit 22, a selection unit 23 and a sign corresponding frequency database 24.

Figure 12:
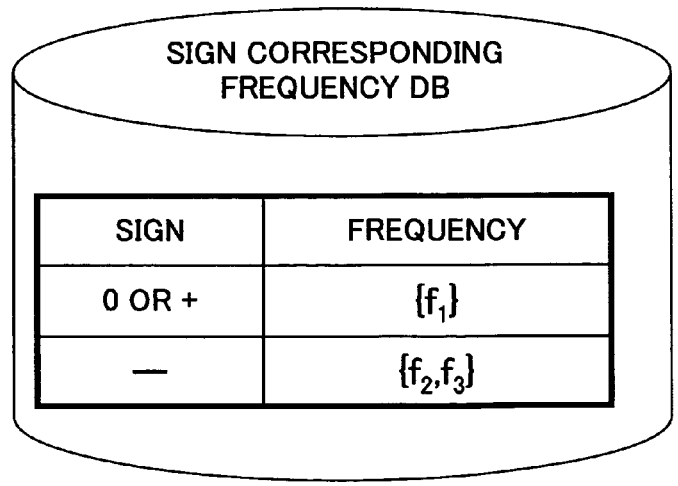
FIG. 12 is a diagram showing information in a sign corresponding frequency database 24.

As shown in FIG. 11, the frequency selection unit 20 receives the embedding series term value from the embedding term selection unit 19 (step 41) so that the embedding series term sign obtaining unit 22 obtains the sign of the embedding series term value (step 42). As the sign, one of three values (+, −, 0) can be obtained. Next, the selection unit 23 searches the sign corresponding frequency database 24 for the frequency corresponding to the embedded series item value sign so as to output the frequency as the selected frequency (step 43). FIG. 12 shows a configuration of the sign corresponding frequency database 24. In the sign corresponding frequency database 24, frequencies corresponding to each output of the embedding series term sign obtaining unit 22 are stored. The number of the frequency corresponding to one sign is not necessarily one. As in the case of sign "−" in FIG. 12, a group of plural frequencies may correspond to one sign.

In the specification and claims in this application, the meaning of "frequency" includes not only one frequency but also plural frequencies corresponding to one sign (or 0, or after-mentioned quantized value) like the case of sign "−".

In addition, it is assumed that "frequency" is a two-dimensional frequency representing a two-dimensional waveform pattern, and indicates a relative frequency with respect to a pixel size of the original image. For example, the frequency is normalized with the pixel size such that a frequency representing two wavelength waveform in the x direction for an X×Y original image is the same as a frequency representing two wavelength waveform in the x direction for an 2X×2Y original image.

Next, the frequency pattern superimposing unit 21 in the block-by-block embedding unit 14 is described in detail.

Figure 13:
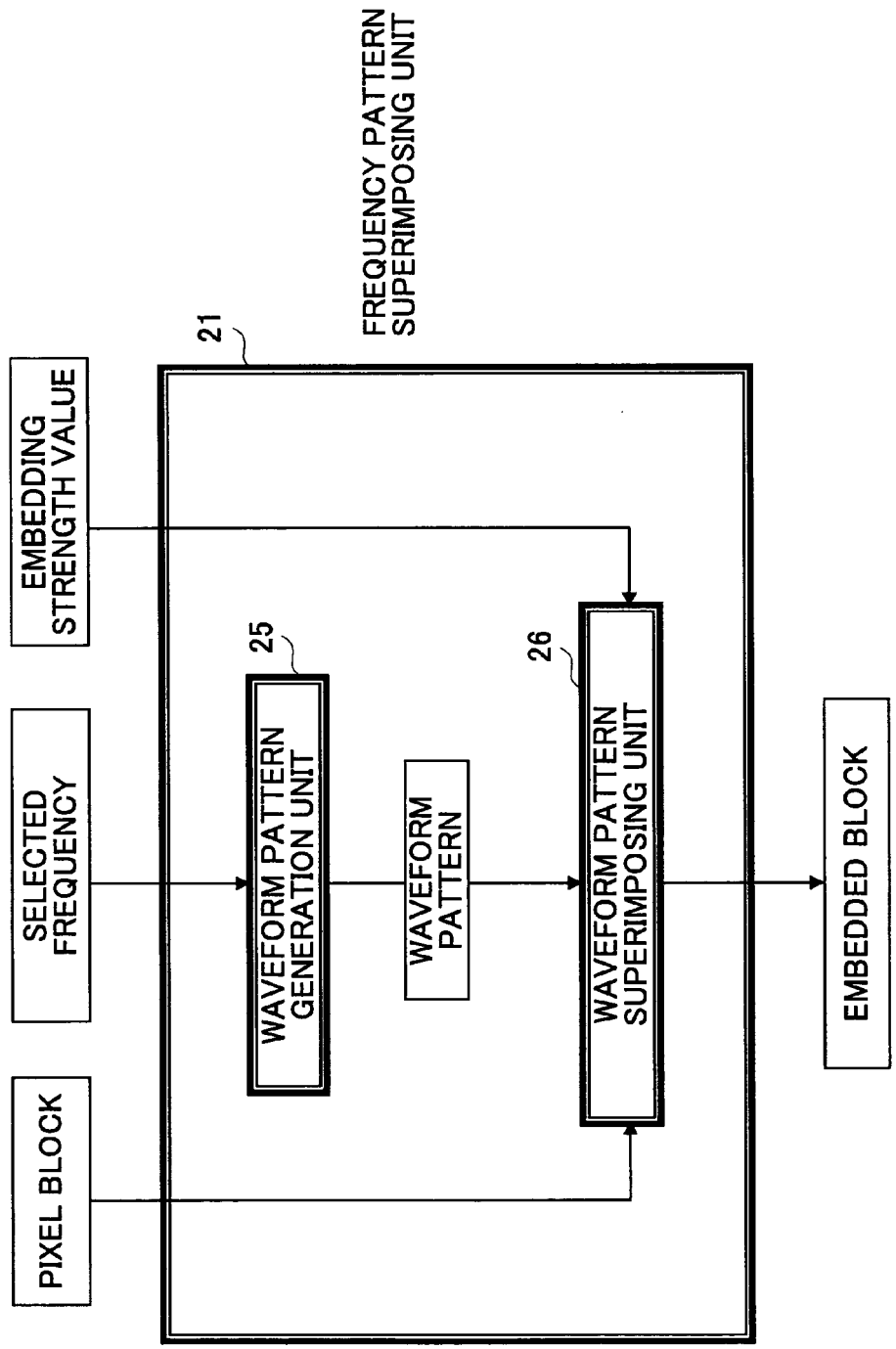
FIG. 13 is a block diagram of a frequency pattern superimposing unit 21.
Figure 14:
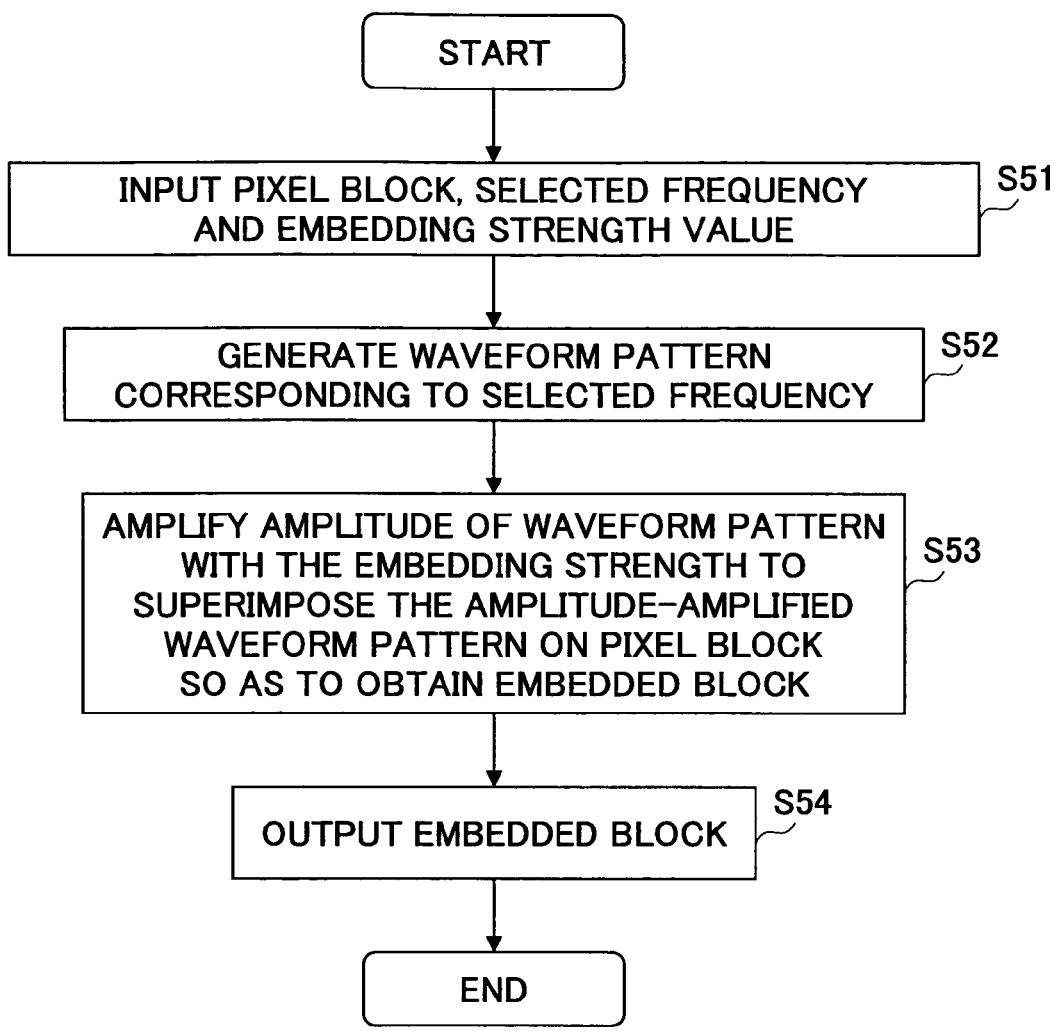
FIG. 14 shows a process flow of the frequency pattern superimposing unit 21.

FIG. 13 shows a configuration of the frequency pattern superimposing unit 21. FIG. 14 shows a process flow of the unit. As shown in FIG. 13, the frequency pattern superimposing unit 21 in the block-by-block embedding unit 14 includes a waveform pattern generation unit 25 and a waveform pattern superimposing unit 26.

Figure 15:
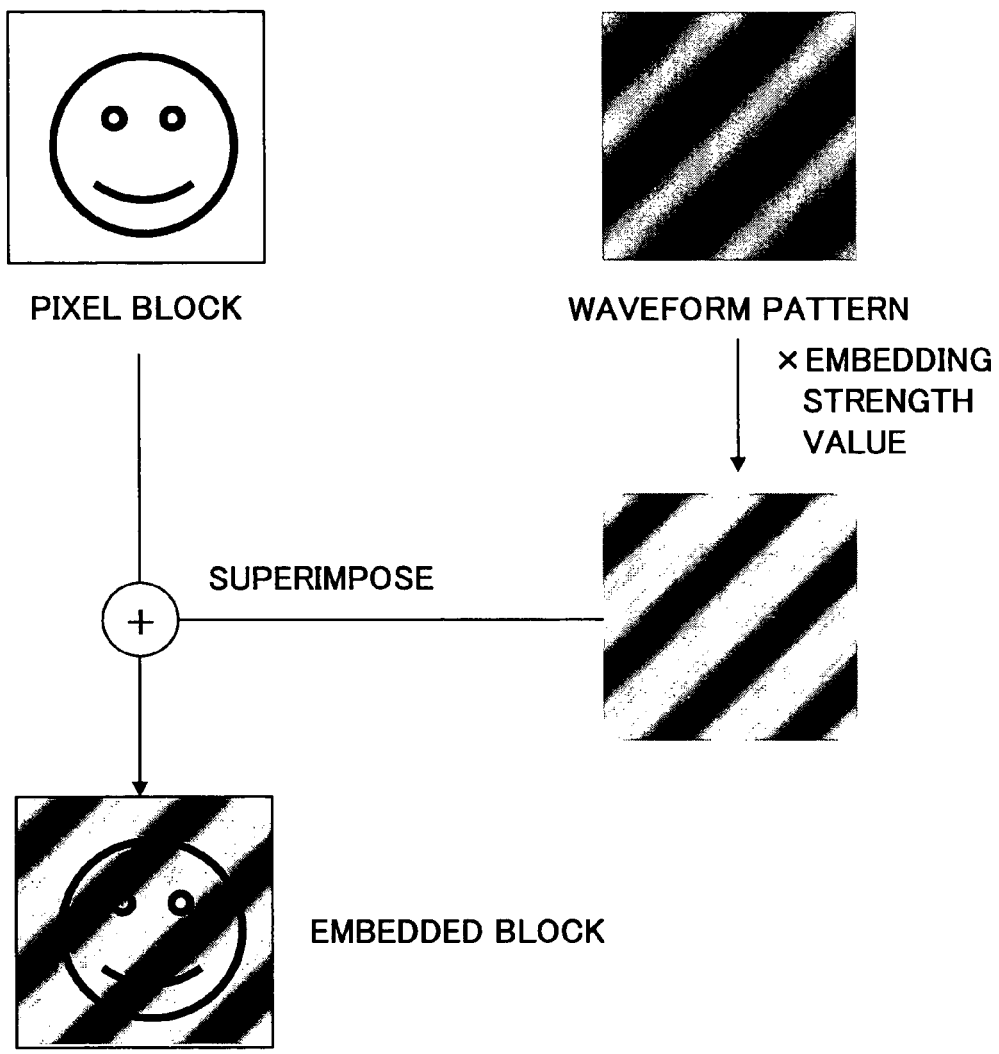
FIG. 15 is a diagram for explaining processes of the waveform pattern superimposing unit 26.

As shown in FIG. 14, the frequency pattern superimposing unit 21 receives a pixel block, a frequency selected by the frequency selection unit 20 and an embedding strength value (step 51). The waveform pattern generation unit 25 generates a waveform pattern corresponding to the selected frequency (step 52). Then, as shown in FIG. 15, the waveform pattern superimposing unit 26 amplifies the amplitude of the waveform pattern using the embedding strength value so as to superimpose the amplified waveform pattern on the pixel block (step 53), so that an embedded block in which the waveform pattern has been embedded is output (step 54).

The waveform pattern generated by the waveform pattern generation unit 25 is a two-dimensional pattern having a size the same as that of the pixel block. When plural frequencies are selected, corresponding waveform patterns are added to obtain a waveform pattern and the amplitude of the waveform pattern is normalized such that the energy of the waveform pattern becomes the same as that in the case using one selected frequency so that a waveform pattern used for superimposing is obtained. The superimposing process by the waveform pattern superimposing unit 26 is represented in the following:

Each pixel value of the embedded block is represented by $I'_{ij} = I_{ij} + s \times W_{ij}$ (0<=i<X, 0<=j<Y), wherein
 $\{I_{ij}\}$: pixel block (0<=i<X, 0<=j<Y: X×Y is pixel size of a block)
 $\{W_{ij}\}$: waveform pattern (0<=i<X, 0<=j<Y)
 s: embedded strength value.

When superimposing the waveform pattern on the image, in addition to strengthen the pattern using the embedding strength value, adaptive superimposing can be performed in which local complexity of the image is measured so that the amplitude of the waveform is strengthened if a part where the pixel block is to be superimposed is visually inconspicuous, on the other hand, the amplitude of the waveform is weakened if the part where the pixel block is to be superimposed is visually conspicuous like a method described in the Japanese Laid-Open Patent Application No. 2003-78756.

As mentioned above, the block-by-block embedding unit 14 sequentially generates the pixel blocks to obtain embedded pixel blocks for all blocks in the original image. After that, the image output unit 15 reconstitutes an image in which each embedded pixel block is placed at a position of a corresponding original pixel block so as to output the image as a digital watermark embedded image.

Figure 16:
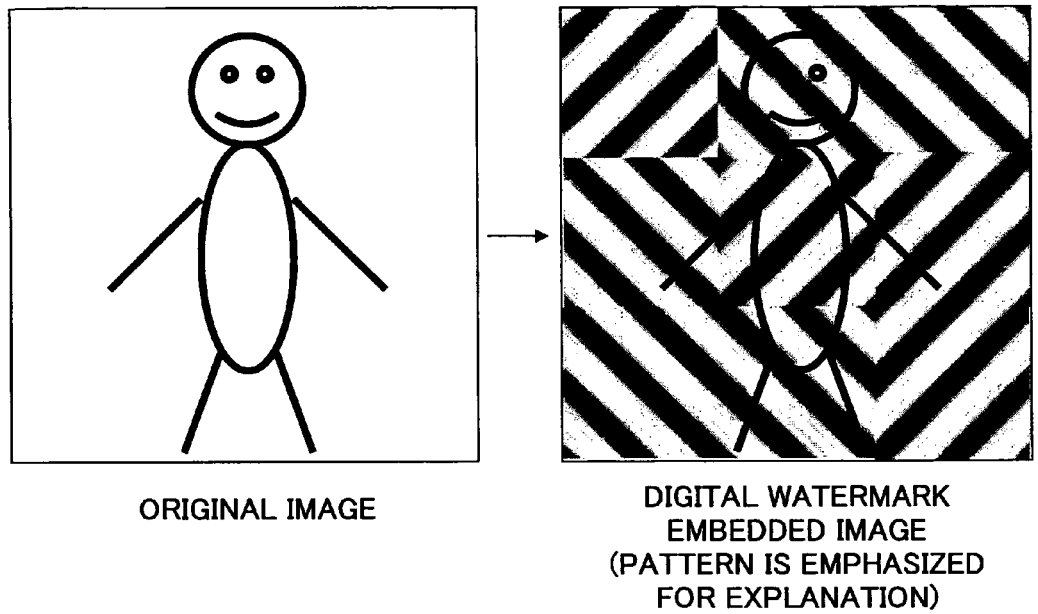
FIG. 16 shows an original image and a digital watermark embedded image.

FIG. 16 shows a figure for explaining the original image and the digital watermark embedded image. In the digital watermark embedded image, each waveform pattern superimposed on a block has an independent shape. In FIG. 16, although the waveform pattern is emphasized very much for purposes of illustration, the waveform pattern is actually superimposed with a visually imperceptible amplitude.

(Detection of Digital Watermark)

In the following, a case for trying to detect a digital watermark from an image is described, wherein the image which is an object from which the digital watermark is detected is obtained, as shown in the non-patent document 1, by printing the digital watermark image on a paper medium so as to supply the printed image using a camera and correcting the supplied image by performing geometrical conversion using a frame line and the like. Inputting the image printed on the paper medium using a camera is merely an example for image inputting. As a matter of course, the image can be input as electrical data without using the paper medium.

When the digital watermark embedded image is obtained using the above-mentioned method, the digital watermark detection object image is affected by some geometrical distortions such as translation and liner/non-linear distortion with respect to the original digital watermark embedded image due to an error based on accuracy of geometrical conversion correction. A digital watermark detection apparatus of the first embodiment can detect the digital watermark at high speed while permitting such geometrical distortion. In the following, the digital watermark detection apparatus of the first embodiment is described.

Figure 17:
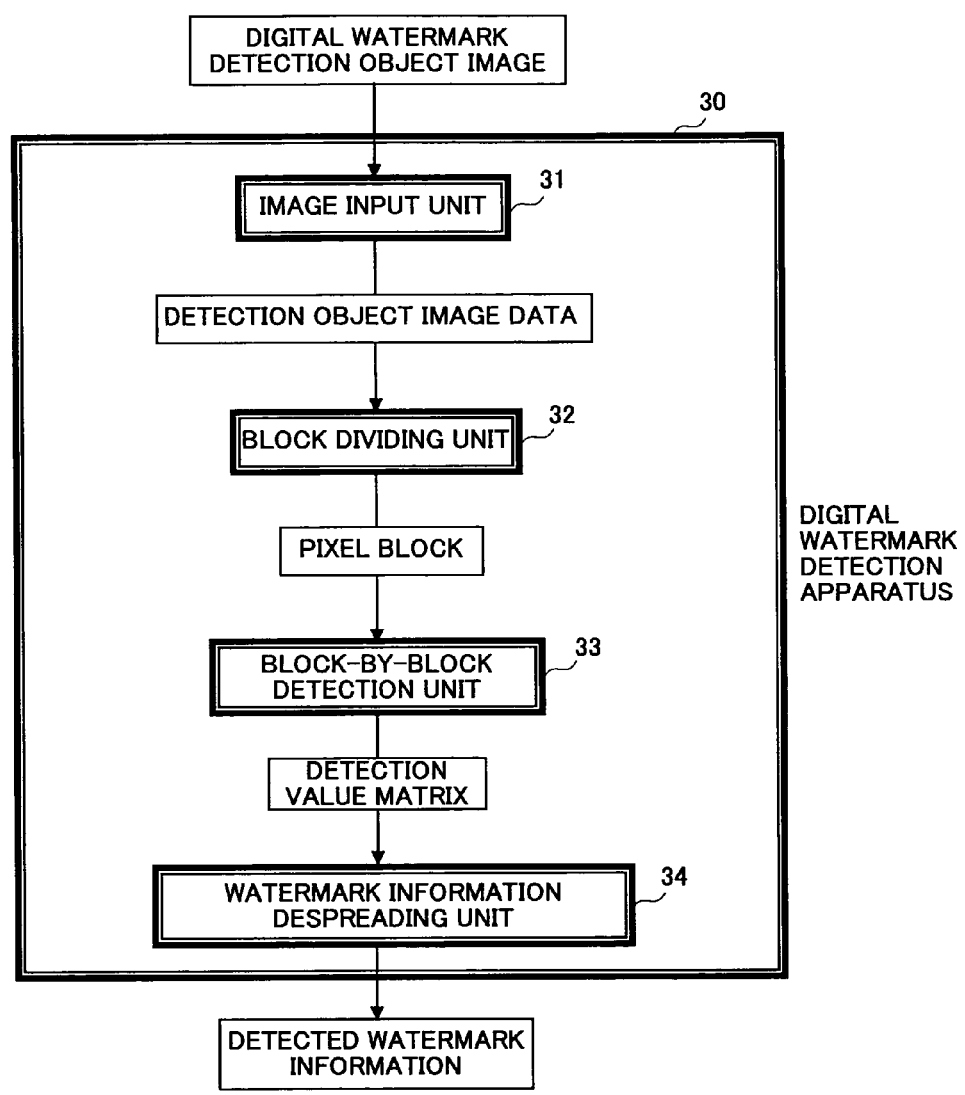
FIG. 17 is a block diagram of a digital watermark detection apparatus 30 in the first embodiment of the present invention.
Figure 18:
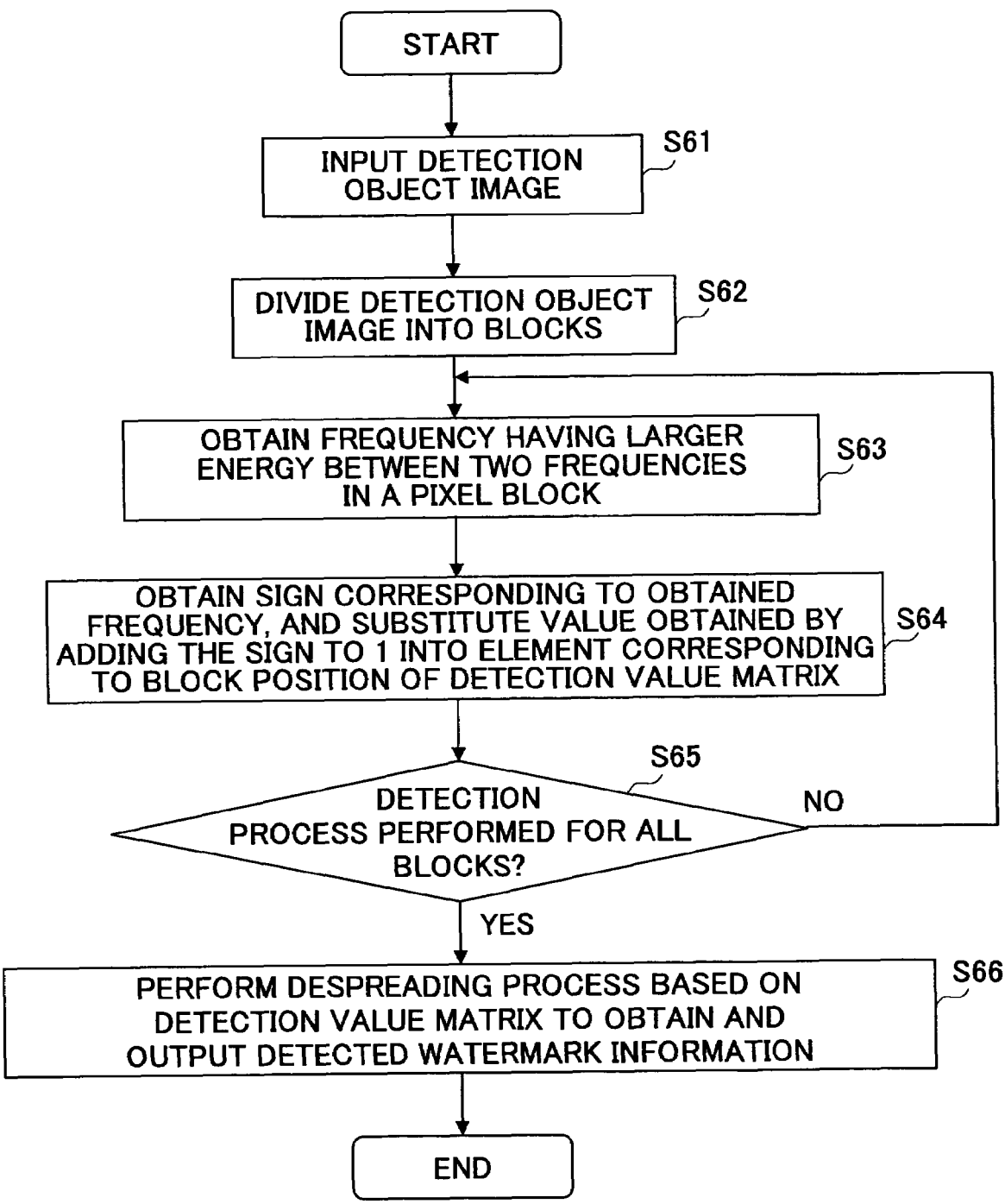
FIG. 18 is a figure showing a process flow of the digital watermark detection apparatus 30.

A configuration of the digital watermark detection apparatus 30 of the first embodiment in the present invention is shown in FIG. 17, and a process of the digital watermark detection apparatus 30 is shown in FIG. 18.

As shown in FIG. 17, the digital watermark detection apparatus 30 includes an image input unit 31, a block dividing unit 32, a block-by-block detection unit 33 and a watermark information despreading unit 34. As shown in FIG. 18, the digital watermark detection apparatus 30 obtains a digital watermark detection object image via the image input unit 31 (step 61). Then, the block dividing unit 32 divides the digital watermark detection object image into pixel blocks (step 62). Each pixel block is supplied to the block-by-block detection unit 33. The block-by-block detection unit 33 determines a frequency having a larger energy between two frequencies for a pixel block (step 63), determines a value obtained by adding a sign corresponding to the determined frequency to 1 as a detection value from the pixel block so as to substitute the detection value into an element corresponding to a block position in a detection value matrix (step 64). By performing the above-mentioned process for every pixel block, the detection value matrix is obtained (Yes in step 65). The watermark information despreading unit 34 outputs information obtained by despreading the elements of the detection value matrix as detected watermark information (step 66).

Next, each configuration unit of the digital watermark detection apparatus 30 is described in detail.

The process in the block dividing unit 32 of the digital watermark detection apparatus 30 is the same as that of the block dividing unit 12 of the digital watermark embedding apparatus 10. Therefore, the block-by-block detection unit 33 of the digital watermark detection apparatus 30 is described first.

Figure 19:
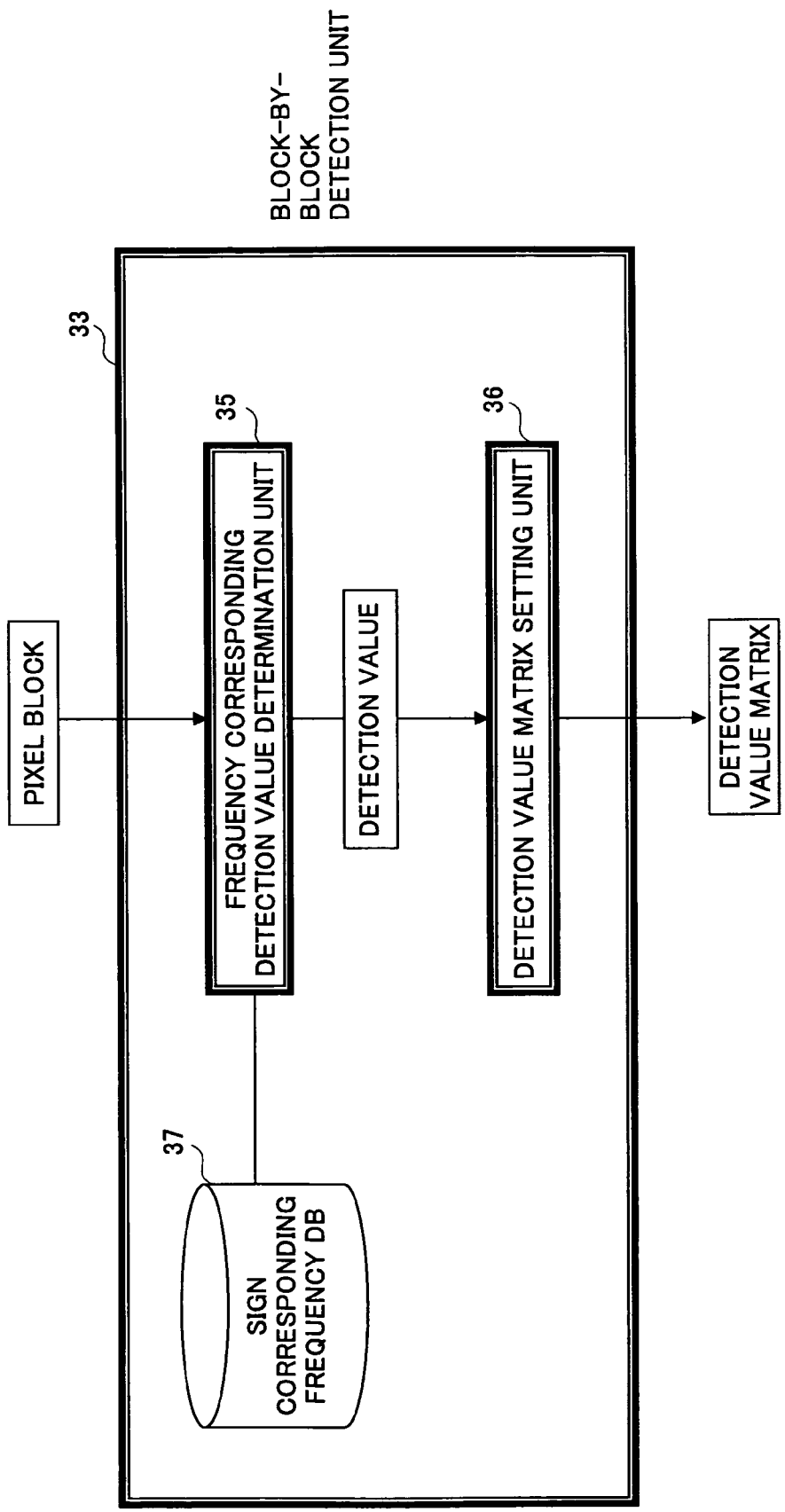
FIG. 19 is a block diagram of a block-by-block detection unit 33.
Figure 20:
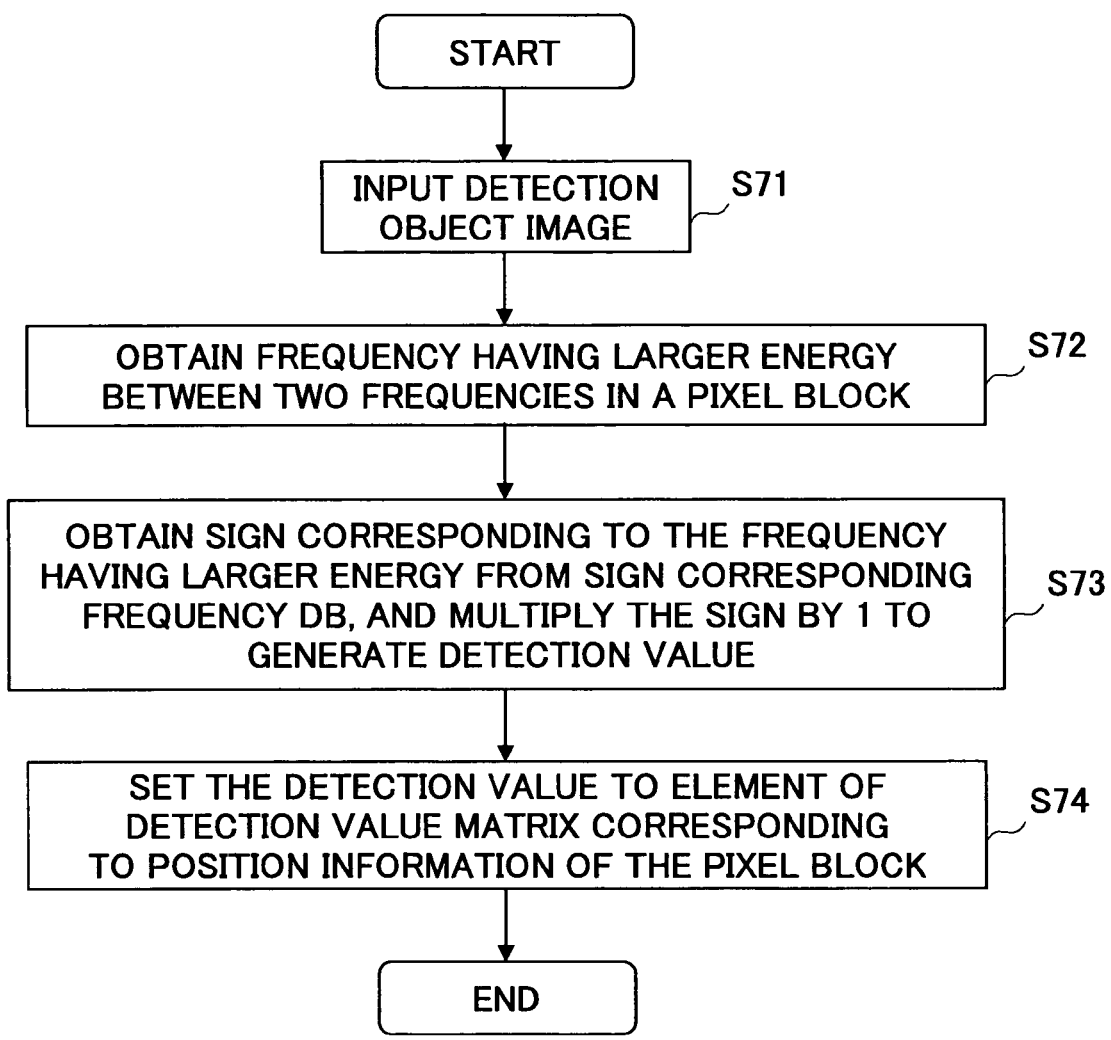
FIG. 20 is a figure showing a process flow of the block-by-block detection unit 33.

FIG. 19 shows a configuration of the block-by-block detection unit 33, and FIG. 20 shows a process flow of the unit. As shown in FIG. 19, the block-by-block detection 33 includes a frequency corresponding detection value determination unit 35, a detection value matrix setting unit 36 and a sign corresponding frequency database 37. The sign corresponding frequency database 37 is the same as the sign corresponding frequency database 24 of the digital watermark embedding apparatus 10.

As shown in FIG. 20, the block-by-block detection unit 33 receives a pixel block from the block dividing unit 32 (step 71). The frequency corresponding detection value determination unit 35 obtains energy of each frequency associated with each sign in the sign corresponding frequency database 37, that is, obtains power spectrum for each frequency. At the time, when plural frequencies are associated with one sign, total sum of energies of the frequencies is obtained.

In the whole of the specification and the claims in this application, the meaning of the term "energy of frequency" not only includes energy of one frequency but also includes total sum of energy of frequencies as mentioned above.

The sizes of the energies are compared between the two frequencies (corresponding to signs + and − respectively) to obtain a frequency having larger energy (step 72). Then, a sign (+, 0 or −) corresponding to the selected frequency is determined from the sign corresponding frequency database 37 so that a value obtained by adding the sign to 1 is output as the detection value (step 73). When the sign + or − together with 0 is associated with the frequency like this embodiment, + or − is selected and 0 is not selected as a sign corresponding to a frequency.

Then, the detection value matrix setting unit 36 sets the detection value as an element of the detection value matrix which element corresponds to position information of the pixel block (step 74). That is, in step 74, for the detection value matrix D={$d_{ij}$} that is a matrix having n rows and m columns, the detection value matrix setting unit 36 sets the detection value in an element $d_{m0n0}$ corresponding to position information (m0, n0) of the pixel block currently being processed.

Figure 21:
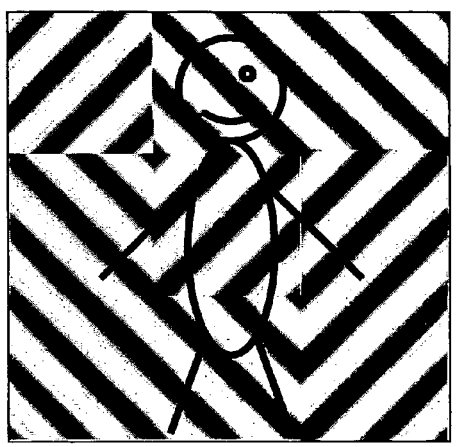
FIG. 21 is a figure showing examples of a digital watermark detection object image and a detection value matrix corresponding to it.

By repeating the above-mentioned process for every pixel block in the block-by-block detection unit 33, all elements of the detection value matrix are determined. FIG. 21 shows examples of a digital watermark detection object image and a final detection value matrix. When each frequency pattern that is superimposed at the time of embedding has enough large energy, a corresponding value: 1 or −1 is set in each element of the detection value matrix.

Next, the watermark information despreading unit 34 of the digital watermark detection apparatus 30 is described in detail.

Figure 22:
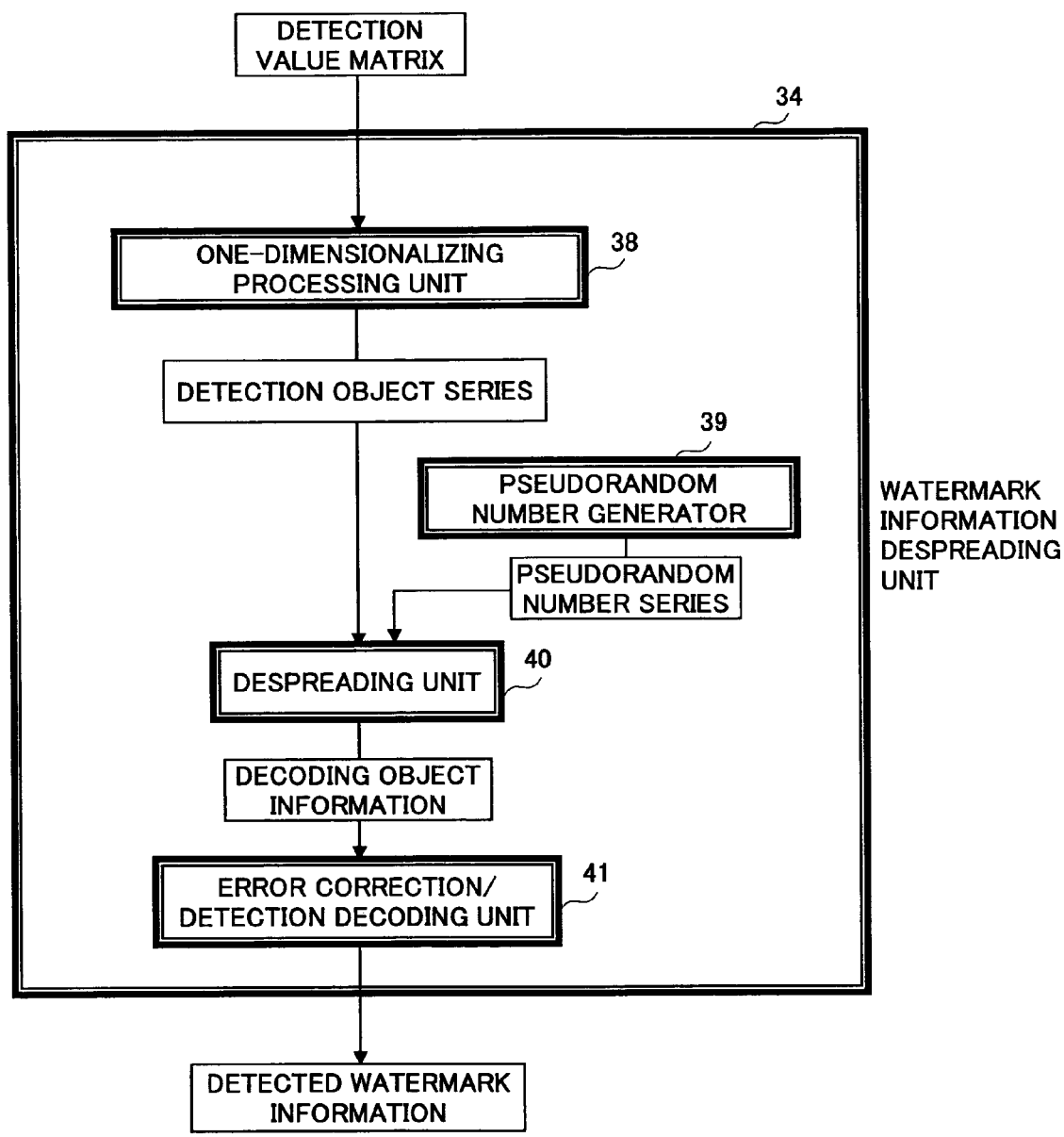
FIG. 22 is a block diagram of a watermark information despreading unit 34.
Figure 23:
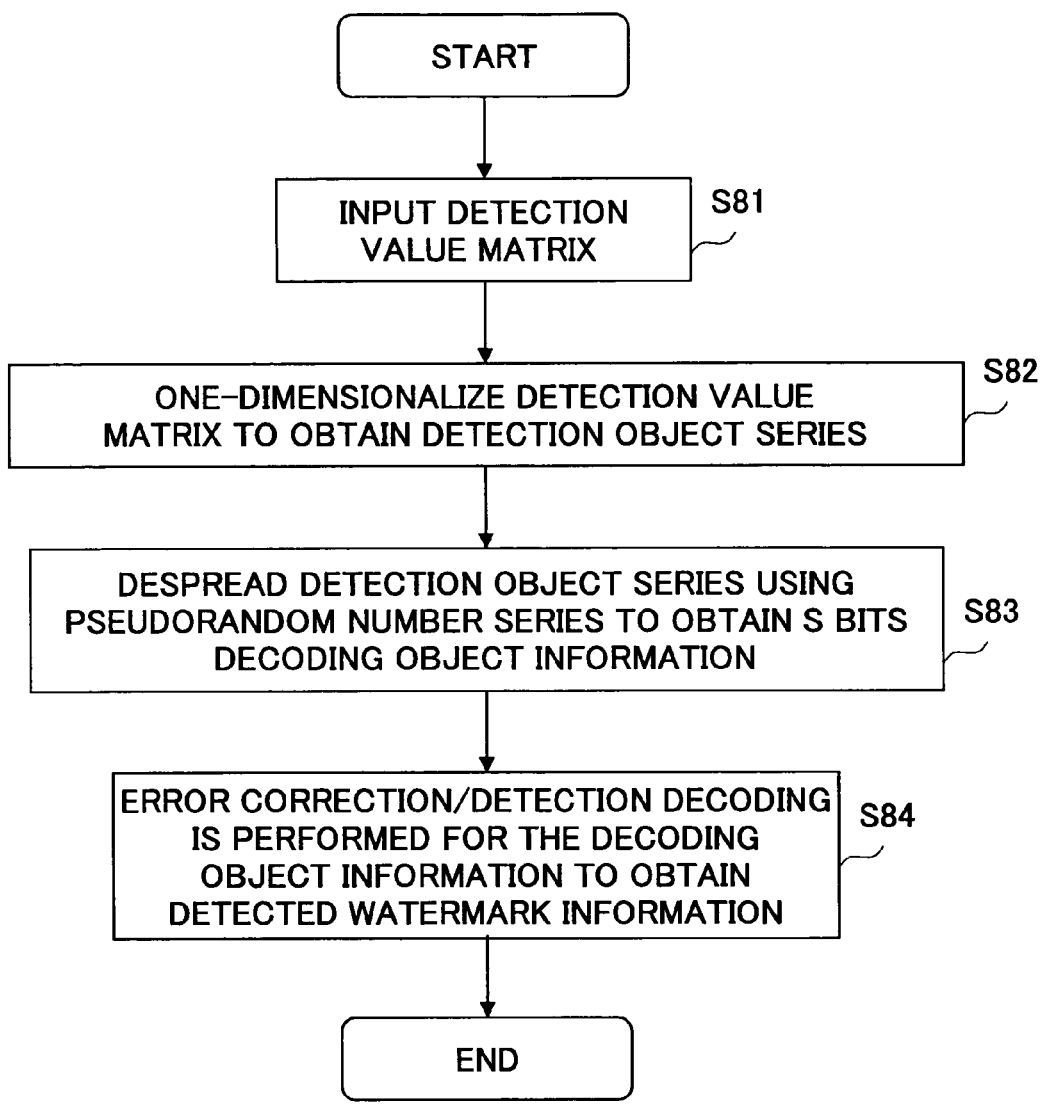
FIG. 23 is a figure showing a process flow of the watermark information despreading unit 34.

FIG. 22 shows a configuration of the watermark information despreading unit 34, and FIG. 23 shows a process flow of the unit. As shown in FIG. 22, the watermark information despreading unit 34 includes a one-dimensionalizing processing unit 38, a pseudorandom number generator 39, a despreading unit 40, and an error correction/detection decoding unit 41.

Figure 24:
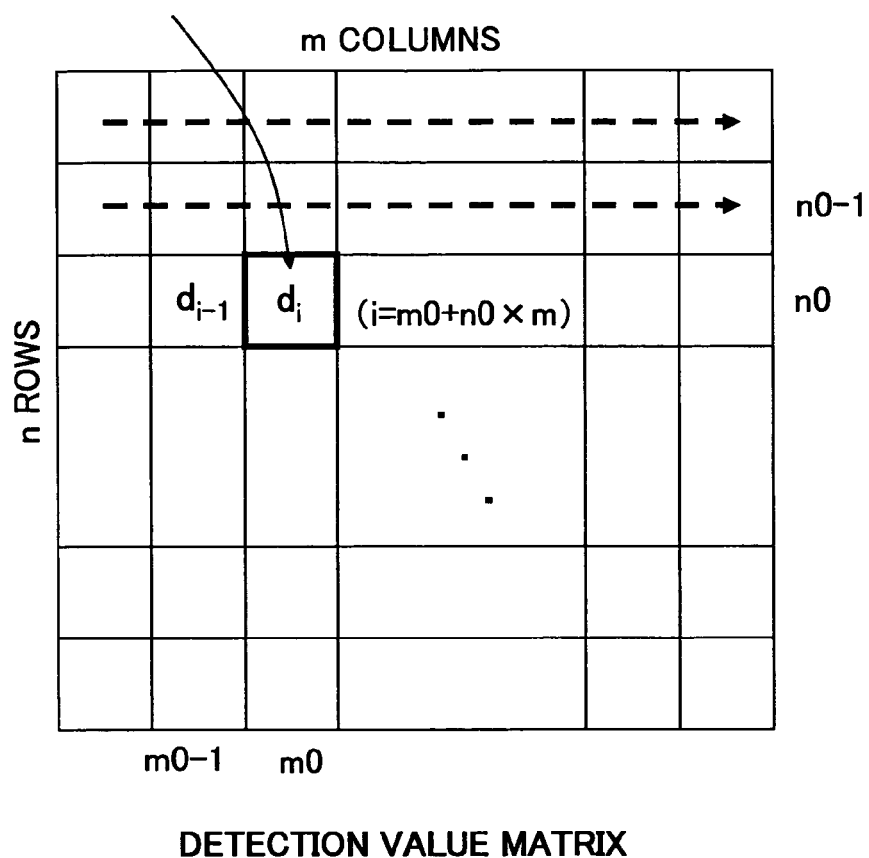
FIG. 24 is a figure for explaining the operation of an one-dimensionalizing processing unit 38.

As shown in FIG. 23, the watermark information despreading unit 34 receives the detection value matrix obtained by the block-by-block detection unit 33 (step 81). The one-dimensionalizing processing unit 38 converts the detection value matrix into a detection object series that is an one-dimensional series having a length of m×n so as to obtain the detection object series (step 82). This conversion procedure is based on a rule the same as one used in the embedding term selection unit 19 in the digital watermark embedding apparatus 10. For example, when the embedding term selection unit 19 selected embedding terms in accordance with the beforementioned rule, the one-dimensionalizing processing unit 38 sets an element (m0, n0) of the detection value matrix as a term $d_i$ (i=m0+n0×m (m is a total number of blocks in the x direction)) as shown in FIG. 24.

Next, the despreading unit 40 despreads the detection object series using pseudorandom number series that is generated using the pseudorandom number generator 39 so as to obtain decoding object information (step 83). The pseudorandom number generator 39 is the same as the pseudorandom number generator 1 of the digital watermark embedding apparatus 10. When a parameter input from the outside is used as an initial value for generating the pseudorandom number that is a key parameter for watermarking at the time of embedding watermark, the same initial value is provided to the pseudorandom number generator 39 to obtain the pseudorandom number series the same as the pseudorandom number series generated at the time of embedding.

Finally, the error correction/detection decoding unit 41 performs error correction/detection decoding for the decoding object information to obtain detected watermark information (step 84). At this time, when an error is detected in the decoding object information, the error is corrected if the error is correctable so that the detected watermark information is output. If an uncorrectable error is detected, digital watermark detection impossible is output.

As a concrete despreading method in the step 83, following methods corresponding to each spreading method at the time of embedding (following (A)-(C) correspond to spreading methods (A)-(C) at the time of embedding respectively) can be used:

(A) When the detection object series is $\{d_i\}$ (i=0~mn−1) and the pseudorandom number series is $\{r_i\}$ (i=0~mn−1), the decoding object information (S bits) $\{c_k\}$ (k=0~S−1) is obtained in the following way, wherein $Cor_k$ means a correlation value of a k-th bit in the decoding object information:

$Cor_k$ is obtained by $$Cor_k = \Sigma_{(i=0 \sim mn-1) \cap (i \% S = k)}(d_i \times r_i) \ (k=0 \sim S-1)$$

and the bit value is determined in the following way:

$$Cor_k \geq 0 \rightarrow c_k = \text{``1''}$$

$$Cor_k < 0 \rightarrow c_k = \text{``0''}$$

wherein $r_i$ is a random number series in which $r_i$=1 or −1. In addition, x % y is a surplus when dividing x by y. Further, $\Sigma_{(i=0 \sim mn-1) \cap (i \% S = k)}$ represents total sum for i by which a surplus when dividing i by S is k.

(B) When the detection object series is $\{d_i\}$ (i=0~mn−1) and two types of pseudorandom number series are generated which are $\{r1_i\}$ (i=0~mn−1) and $\{r2_i\}$ (i=0~mn−1) respectively, the decoding object information (S bits) $\{c_k\}$ (k=0~S−1) is obtained in the following way. First, an array $\{p_i\}$ used for performing permutation is generated in the same way for embedding.

Next, $Cor_k$ is obtained by $$Cor_k = \Sigma_{(i=0 \sim mn-1) \cap (pi \% S = k)}(d_{pi} \times r2_{pi}) \ (k=0 \sim S-1)$$

and the bit value is determined in the following way:

$$Cor_k \geq 0 \rightarrow c_k = \text{``1''}$$

$$Cor_k < 0 \rightarrow c_k = \text{``0''}$$

wherein $r2_i$ is a random number series in which $r_i$=1 or −1. In addition, x % y is a surplus when dividing x by y.

(C) When the detection object series is $\{d_i\}$ (i=0~mn−1) and the pseudorandom number series is $\{r_i\}$ (i=0~mn−1), the decoding object information (S bits) $\{c_k\}$ (k=0~S−1) is obtained in the following way.

$Cor_k$ is obtained by $$Cor_k = \Sigma_{(i=0 \sim mn-1)}(d_i \times r_{(i+k) \% mn}) \ (k=0 \sim S-1)$$

and the bit value is determined in the following way:

$$Cor_k \geq 0 \rightarrow c_k = \text{``1''}$$

$$Cor_k < 0 \rightarrow c_k = \text{``0''}$$

wherein $r_i$ is a random number series in which $r_i$=1 or −1. In addition, x % y is a surplus when dividing x by y.

(Effects of the First Embodiment)

According to this embodiment, since the watermark information is superimposed on the original image as the waveform pattern corresponding to a specific frequency for each pixel block, robust detection can be realized even when cut out positions of the pixel blocks are shifted for some extent due to occurrence of some geometric distortion in the digital watermark detection object image when detection is performed since the frequency having the larger energy in the two frequencies is stable to some extent.

In additional, in the detection process, only calculation for obtaining power spectrums for some frequencies for each small block is necessary, and any process that requires large computational complexity such as large sized two-dimensional orthogonal transformation is not necessary, so that the detection process can be realized at high speed.

Second Embodiment

Next, a second embodiment of the present invention is described.

Between the first embodiment and the second embodiment, the method for embedding the embedding series into pixel blocks in the digital watermark embedding apparatus 10 is different. In addition, associated with the difference of the embedding method, the method for detecting the watermark information in the digital watermark detection apparatus 30 is different. More particularly, the process in the block-by-block embedding unit and the process in the block-by-block detection unit are different between the first embodiment and the second embodiment. Processes other than the processes different between the first embodiment and the second embodiment described below are the same as those of the first embodiment.

(Digital Watermark Embedding)

Figure 25:
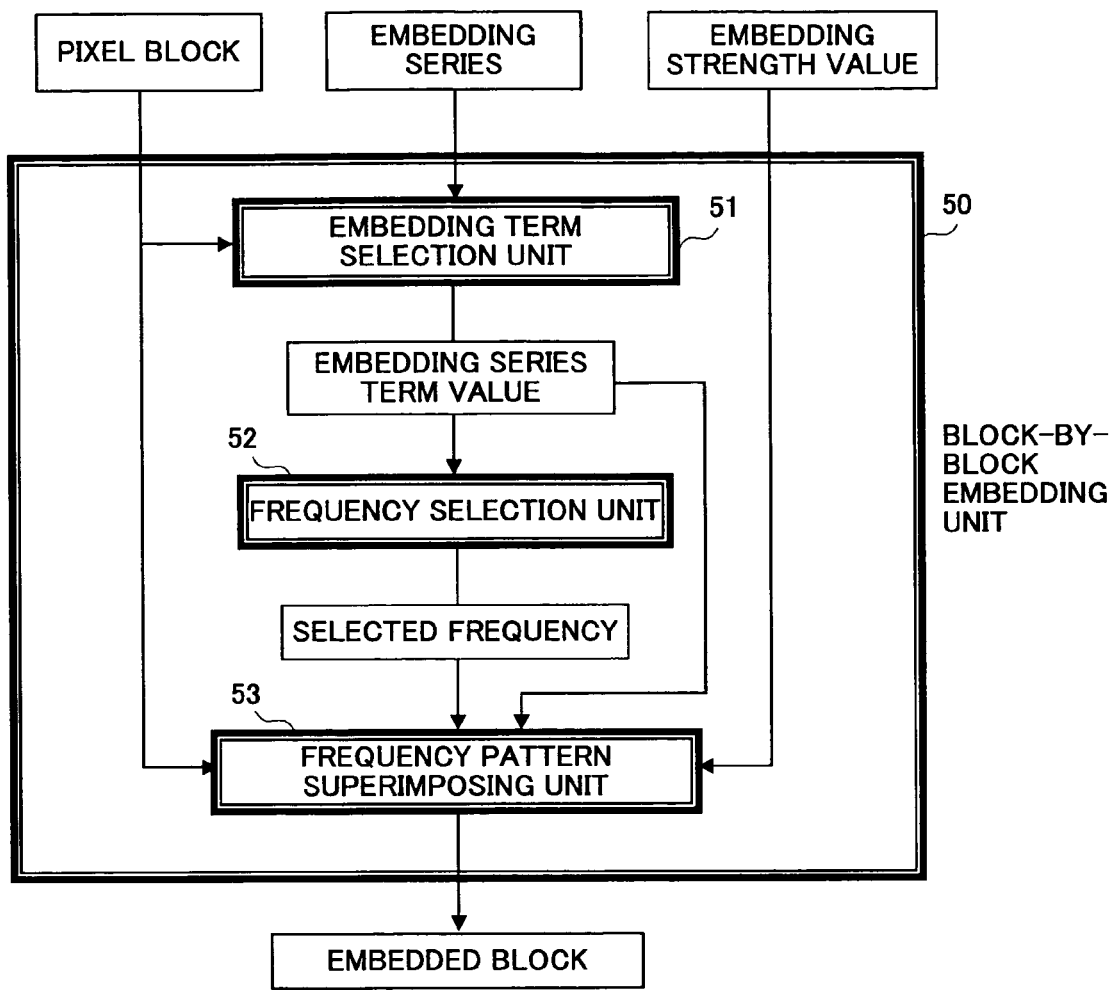
FIG. 25 is a block diagram of a block-by-block embedding unit 50 in the digital watermark embedding apparatus 10 of the second embodiment of the present invention.
Figure 26:
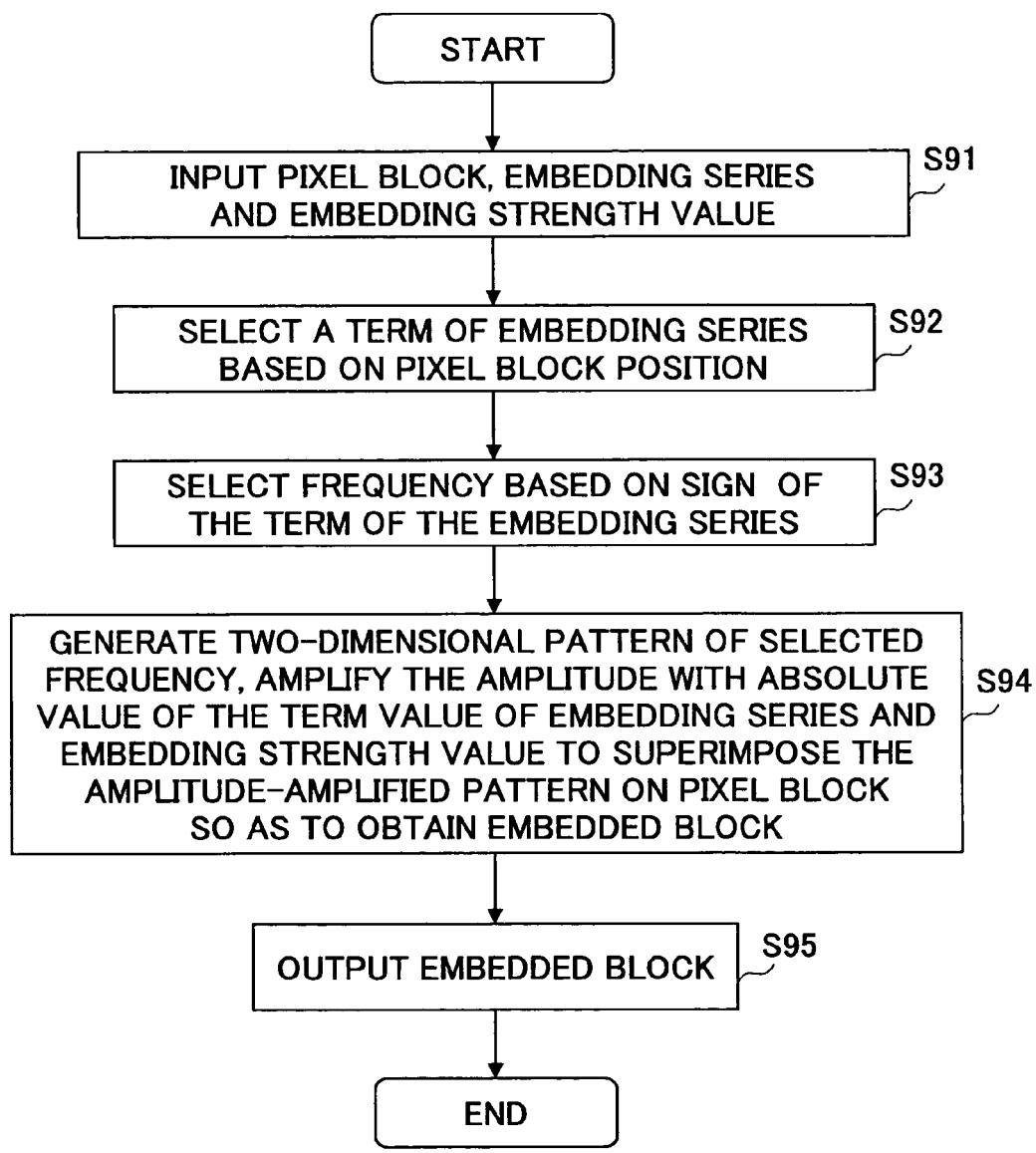
FIG. 26 is a figure showing a process flow of the block-by-block embedding unit 50.

FIG. 25 shows a configuration of a block-by-block embedding unit 50 in the digital watermark embedding apparatus 10 of the second embodiment of the present invention. FIG. 26 shows a flow of the process.

As shown in FIG. 25, the block-by-block embedding unit 50 includes an embedding term selection unit 51, a frequency selection unit 52, and a frequency pattern superimposing unit 53.

As shown in FIG. 26, like the first embodiment, the block-by-block embedding unit 50 receives the pixel block, the embedding series and the embedding strength value (step 91), and the embedding term selection unit 51 selects one term from the embedding series based on position information of the pixel block (step 92). The embedding term selection unit 51 selects a term of the embedding series having one-to-one correspondence with the block position such that, as shown in FIG. 9 like the first embodiment, when the position information of the pixel block is (m0, n0), a term $e_i$ of the embedding series wherein i=m0+n0×m (m is a total number of blocks in the x direction) is selected, for example.

Next, the frequency selection unit 52 selects a frequency based on a sign of the term of the embedding series (step 93). Then, the frequency pattern superimposing unit 53 generates a two-dimensional waveform pattern corresponding to the selected frequency so as to amplify amplitude of the frequency pattern with an absolute value of the term value of the embedding series and with the embedding strength value and superimpose the amplified frequency pattern on a corresponding pixel block to obtain an embedded block (step 94) and output it (step 95).

In the following, the frequency selection unit 52 and the frequency pattern superimposing unit 53 are described in detail.

Figure 27:
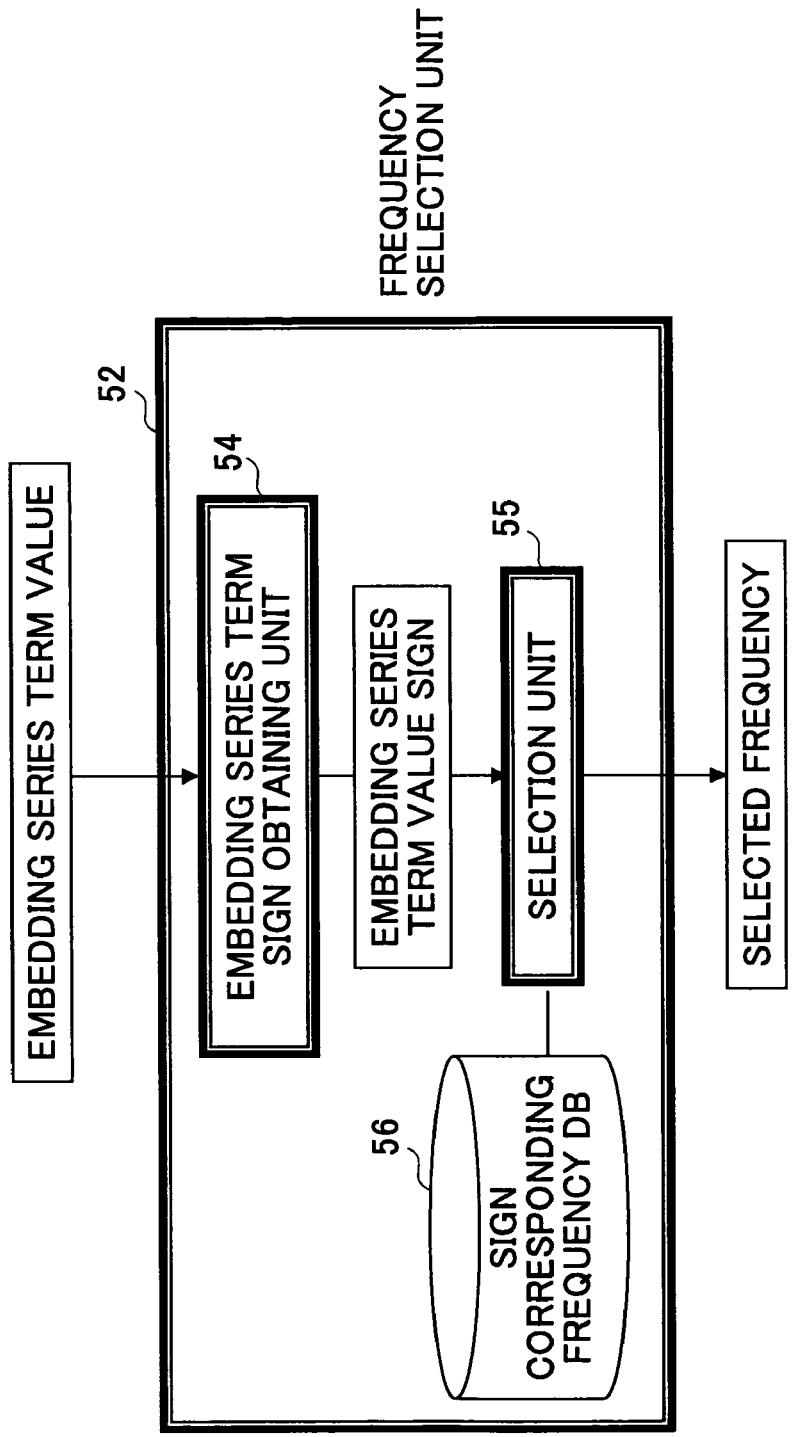
FIG. 27 is a block diagram of a frequency selection unit 52.
Figure 28:
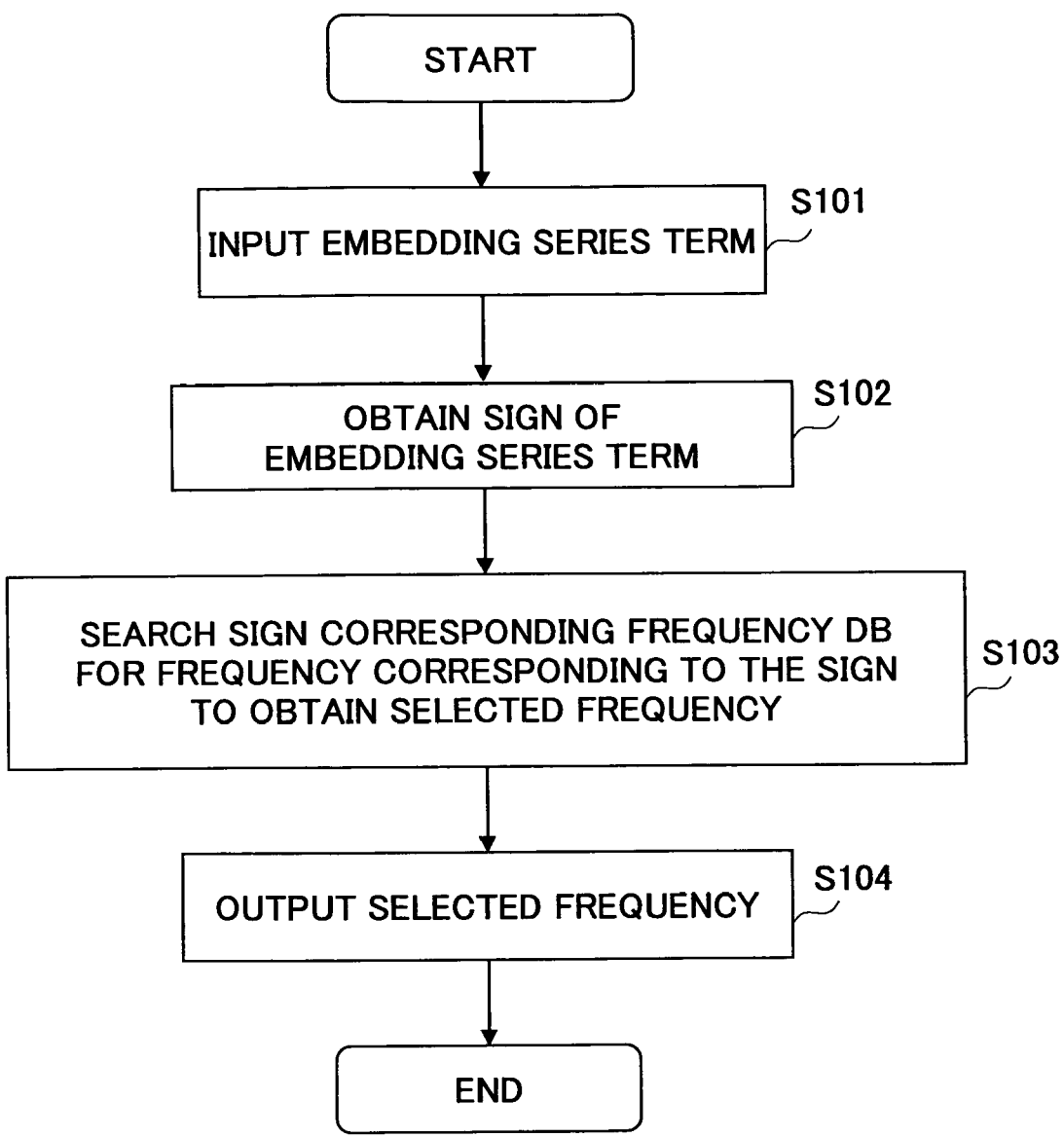
FIG. 28 is a figure showing a process flow of the frequency selection unit 52.

FIG. 27 shows a configuration of the frequency selection unit 52, and FIG. 28 shows a process flow of the unit. As shown in FIG. 27, the frequency selection unit 52 includes an embedding series term sign obtaining unit 54, a selection unit 55 and a sign corresponding frequency database 56.

As shown in FIG. 28, when the frequency selection unit 52 receives the embedding term value (step 101), the embedding series term sign obtaining unit 54 obtains a sign of the embedding series term value (step 102). The sign is any one of three values (+, −, 0). Next, the selection unit 55 searches the sign corresponding frequency database 56 for a frequency corresponding to the sign of the embedding series term value so as to output the frequency as a selected frequency (step 103). The sign corresponding frequency database 56 has a configuration the same as one shown in FIG. 12.

Figure 29:
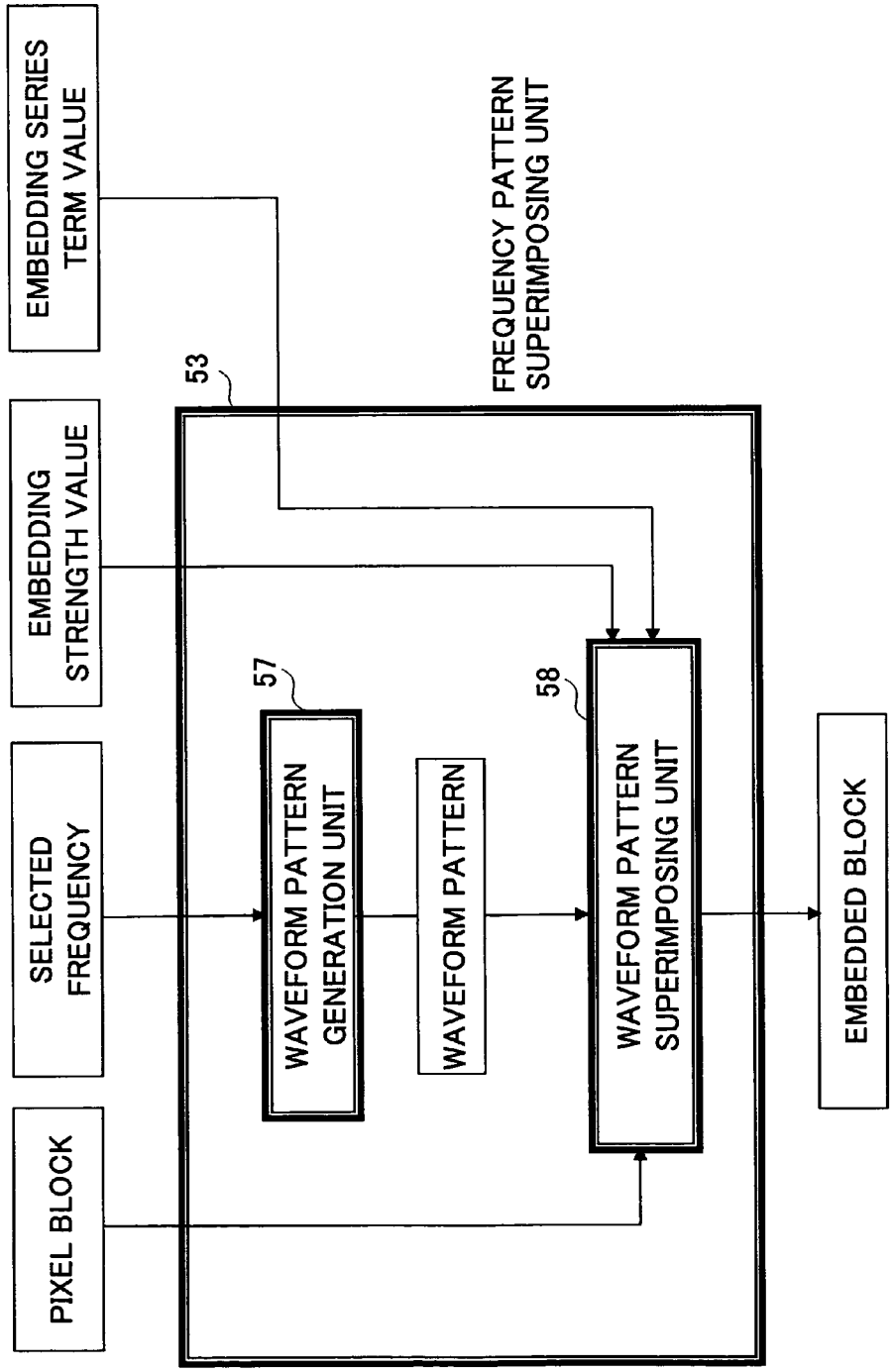
FIG. 29 is a block diagram of a frequency pattern superimposing unit 53.
Figure 30:
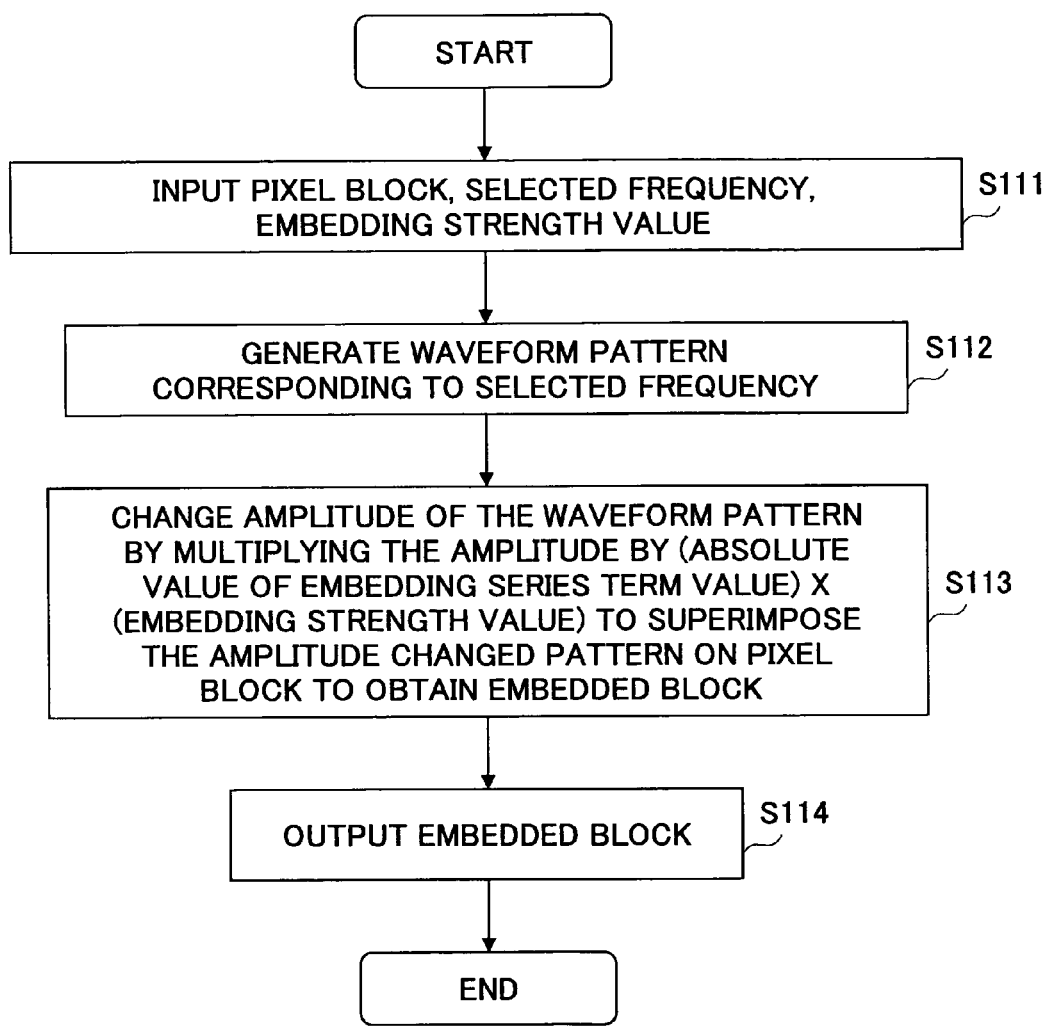
FIG. 30 is a figure showing a process flow of the frequency pattern superimposing unit 53.

Next, FIG. 29 shows a configuration of the frequency pattern superimposing unit 53, and FIG. 30 shows a process flow of the unit. As shown in FIG. 29, the frequency pattern superimposing unit 53 includes a waveform pattern generation unit 57 and a waveform pattern superimposing unit 58.

Figure 31:
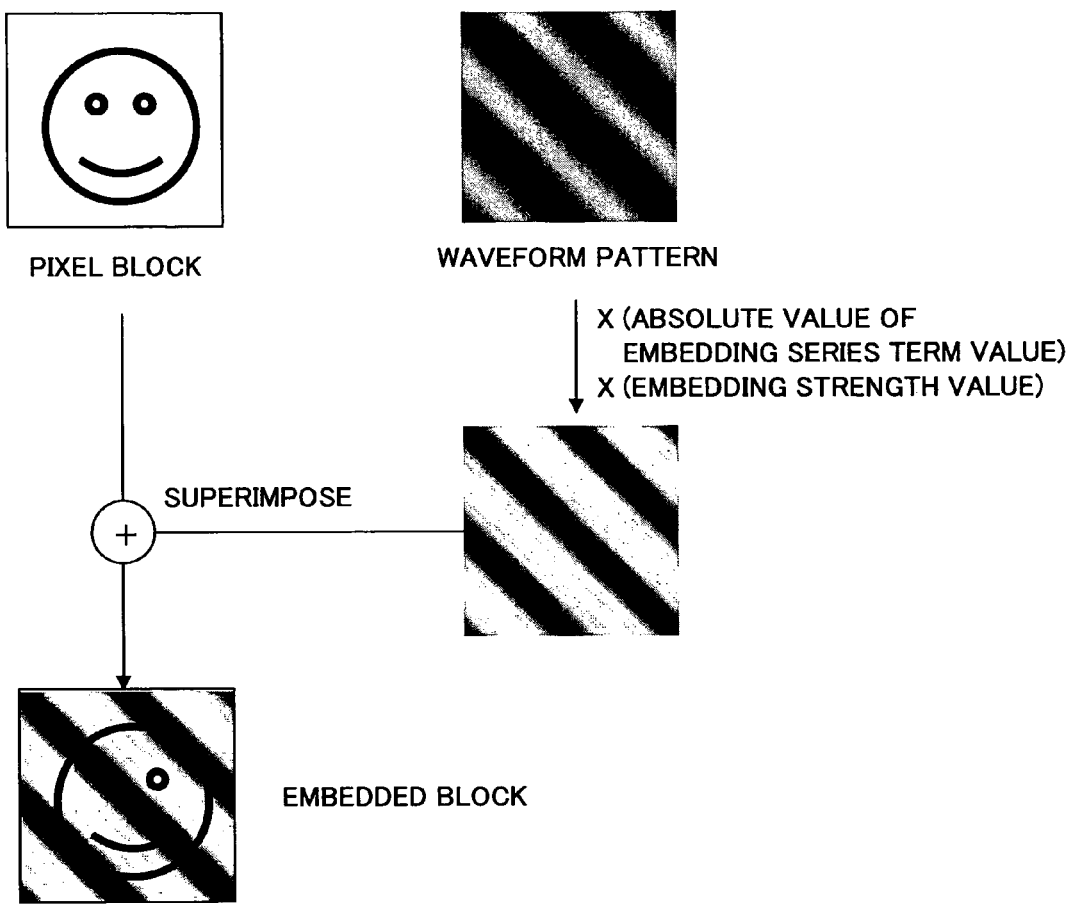
FIG. 31 is a figure for explaining the operation of a waveform pattern superimposing unit 58.

As shown in FIG. 30, the frequency pattern superimposing unit 53 receives a pixel block, the selected frequency, the embedding strength value and an embedding series term value (step 111). The waveform pattern generation unit 57 generates a waveform pattern corresponding to the selected frequency (step 112). The waveform pattern is a two-dimensional pattern having a size the same as that of the pixel block. When plural frequencies are selected, corresponding waveform patterns are added to obtain a waveform pattern and the amplitude of the obtained waveform pattern is normalized such that the energy of the waveform pattern becomes the same as that in the case using one selected frequency so that a waveform pattern used for superimposing is obtained. Next, as shown in FIG. 31, the waveform pattern superimposing unit 58 amplifies the amplitude of the waveform pattern using the absolute value of the embedding series term value and the embedding strength value so as to superimpose the amplified waveform pattern on the pixel block.

This process can be represented in the following:

Each pixel value of the embedded block is represented by $I'_{ij}=I_{ij}+|e_k|\times s\times W_{ij}$ ($0<=i<X, 0<=j<Y$), wherein {$I_{ij}$}: pixel block ($0<=i<X, 0<=j<Y$: X×Y is pixel size of a block)

{$W_{ij}$}: waveform pattern ($0<=i<X, 0<=j<Y$)

s: embedding strength value $e_k$: embedding series term value, wherein |•| is a symbol indicating an absolute value.

Like the first embodiment, when superimposing the waveform pattern on the image, in addition to strengthen the pattern using the embedding strength value, adaptive superimposing can be performed in which local complexity of the image is measured so that the amplitude of the waveform is strengthened if a part in the image where the pixel block is to be superimposed is visually inconspicuous, on the other hand, the amplitude of the waveform is weakened if a part in the image where the pixel block is to be superimposed is visually conspicuous like a method described in the Japanese Laid-Open Patent Application No. 2003-78756.

(Detection of Digital Watermark)

Next, a block-by-block detection unit 60 in the digital watermark detection apparatus 30 in the second embodiment of the present is described.

Figure 32:
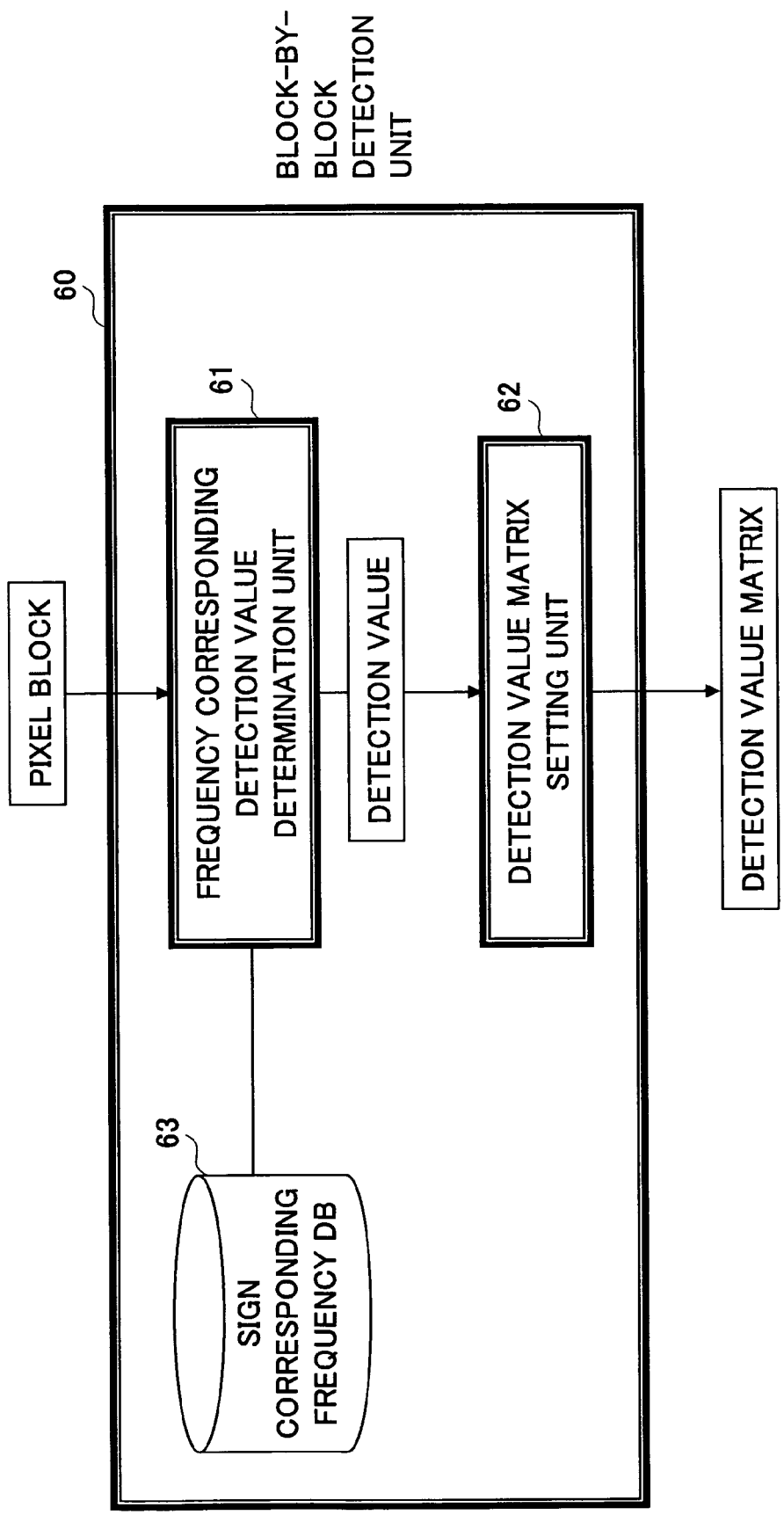
FIG. 32 is a block diagram of a block-by-block detection unit 60 in the digital watermark detection apparatus 30 of the second embodiment of the present invention.
Figure 33:
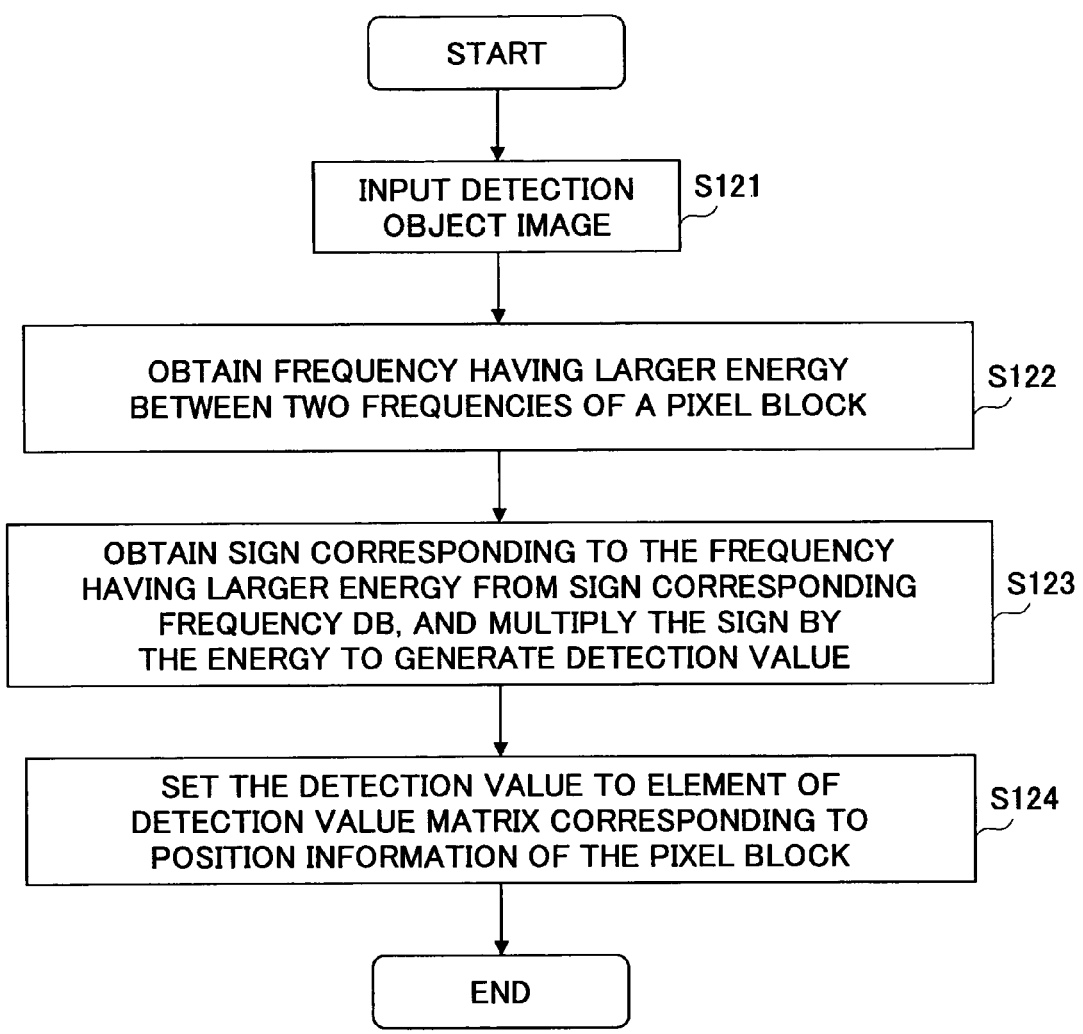
FIG. 33 is a figure showing a process flow of the block-by-block detection unit 60.

FIG. 32 shows a configuration of the block-by-block detection unit 60, and FIG. 33 shows a process flow of the unit. As shown in FIG. 32, the block-by-block detection unit 60 includes a frequency corresponding detection value determination unit 61, a detection value matrix setting unit 62 and a sign corresponding frequency database 63. The sign corresponding frequency database 63 is the same as the sign corresponding frequency database 56 of the digital watermark embedding apparatus 10.

As shown in FIG. 33, the block-by-block detection unit 60 receives a pixel block from the block dividing unit 32 (step 121). The frequency corresponding detection value determination unit 61 obtains energy of each frequency associated with each sign in the sign corresponding frequency database 63, that is, obtains power spectrum for each frequency. At that time, when plural frequencies are associated with one sign, total sum of energies of the frequencies is obtained. In two energies of the frequencies (corresponding to signs + and − respectively), a frequency having larger energy is obtained (step 122). Then, a sign (0 and + or −) corresponding to the selected frequency is determined from the sign corresponding frequency database 63 so that a value obtained by multiplying the sign by the energy is output as the detection value (step 123). When the sign + or − together with 0 is associated with the frequency like this embodiment, + or − is selected and 0 is not selected as a sign corresponding to a frequency.

Next, for the detection value matrix D={$d_{ij}$} that is a matrix having n rows and m columns, the detection value matrix setting unit 62 sets the detection value in an element $d_{m0n0}$ corresponding to position information (m0, n0) of the pixel block currently being processed (step 124).

Figure 34:
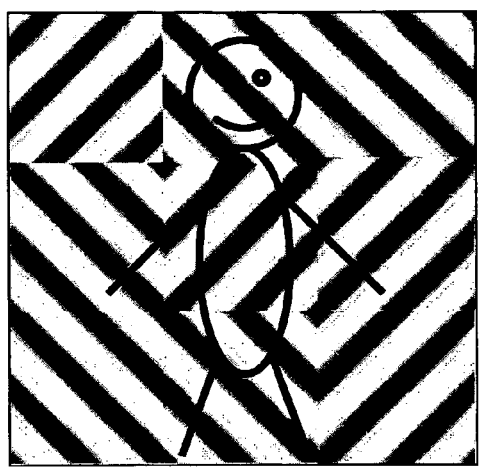
FIG. 34 is a figure showing examples of a digital watermark detection object image and a detection value matrix corresponding to it.

By repeating the above-mentioned process for every pixel block, all elements of the detection value matrix are determined. FIG. 34 shows examples of a digital watermark detection object image and a final detection value matrix. For each element of the detection value matrix, a sign is determined corresponding to a frequency pattern superimposed on a corresponding pixel block, and the energy of the frequency, that is, an amplitude of the waveform corresponds to the absolute value.

After performing these processes, in the same way as the first embodiment, by performing despreading process based on the detection value matrix, the detected watermark information is obtained.

(Effects of the Second Embodiment)

According to this embodiment, compared with the first embodiment, the watermark information is spread to obtain a value of the embedding series and the value is directly multiplied to the amplitude of the frequency pattern so that the amplified frequency pattern is superimposed on the pixel block, and at the time of detection, the frequency energy, that is, the amplitude is used. Therefore, behavior of despreading calculation, that is, behavior of correlation calculation is improved at the time of detection so that image quality and detection performance can be improved.

Third Embodiment

Next, a third embodiment of the present invention is described.

Between the third embodiment, and the first and second embodiments, the method for embedding the embedding series into pixel blocks in the digital watermark embedding apparatus 10 is different. In addition, associated with the difference of the embedding method, the method for detecting the watermark information in the digital watermark detection apparatus 30 is different. More particularly, the process in the block-by-block embedding unit and the process in the block-by-block detection unit are different between the third embodiment, and the first and second embodiments. Processes other than processes different between the third embodiment, and the first and second embodiment described below are the same as those of the first embodiment.

(Digital Watermark Embedding)

Figure 35:
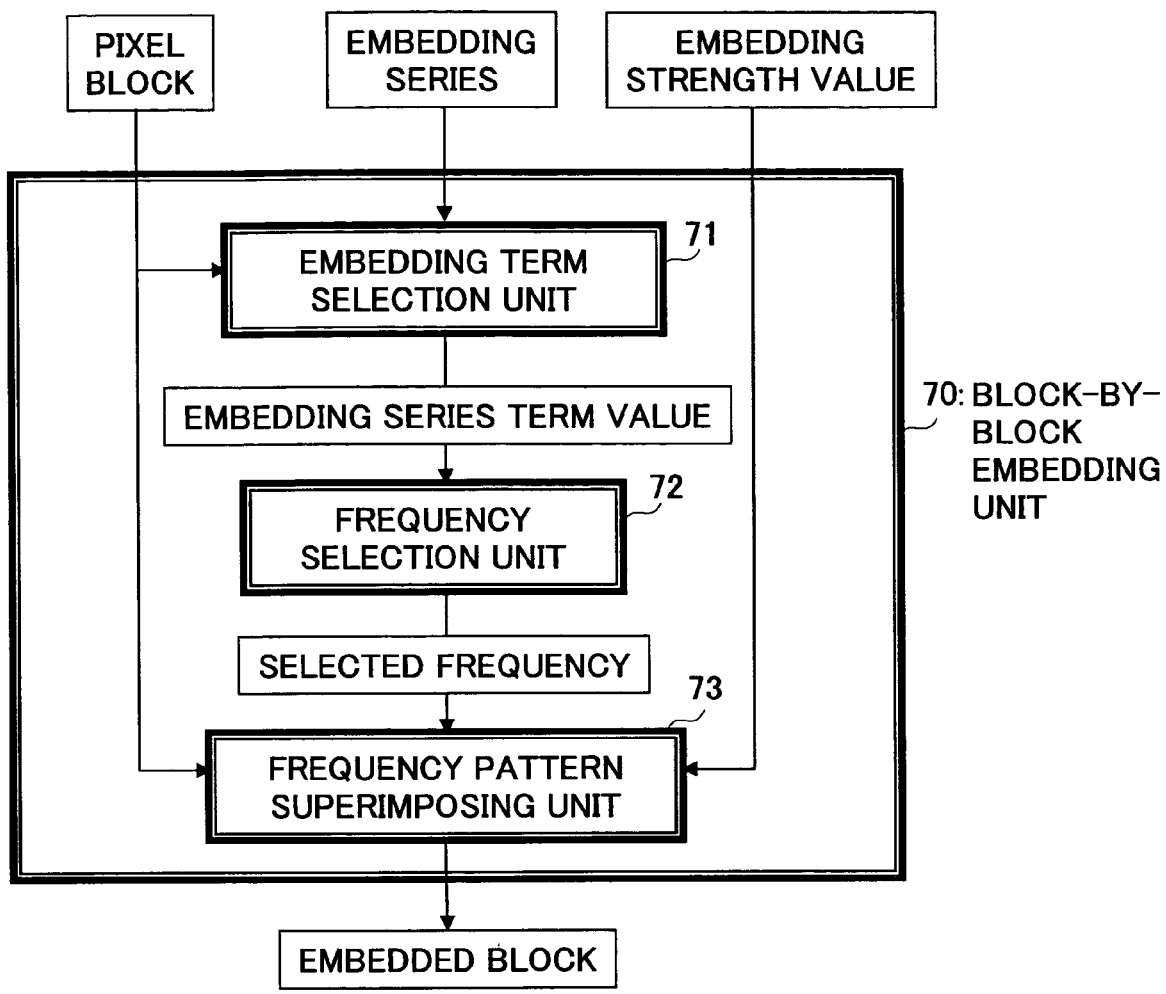
FIG. 35 is a block diagram of a block-by-block embedding unit 70 in the third embodiment of the present invention.
Figure 36:
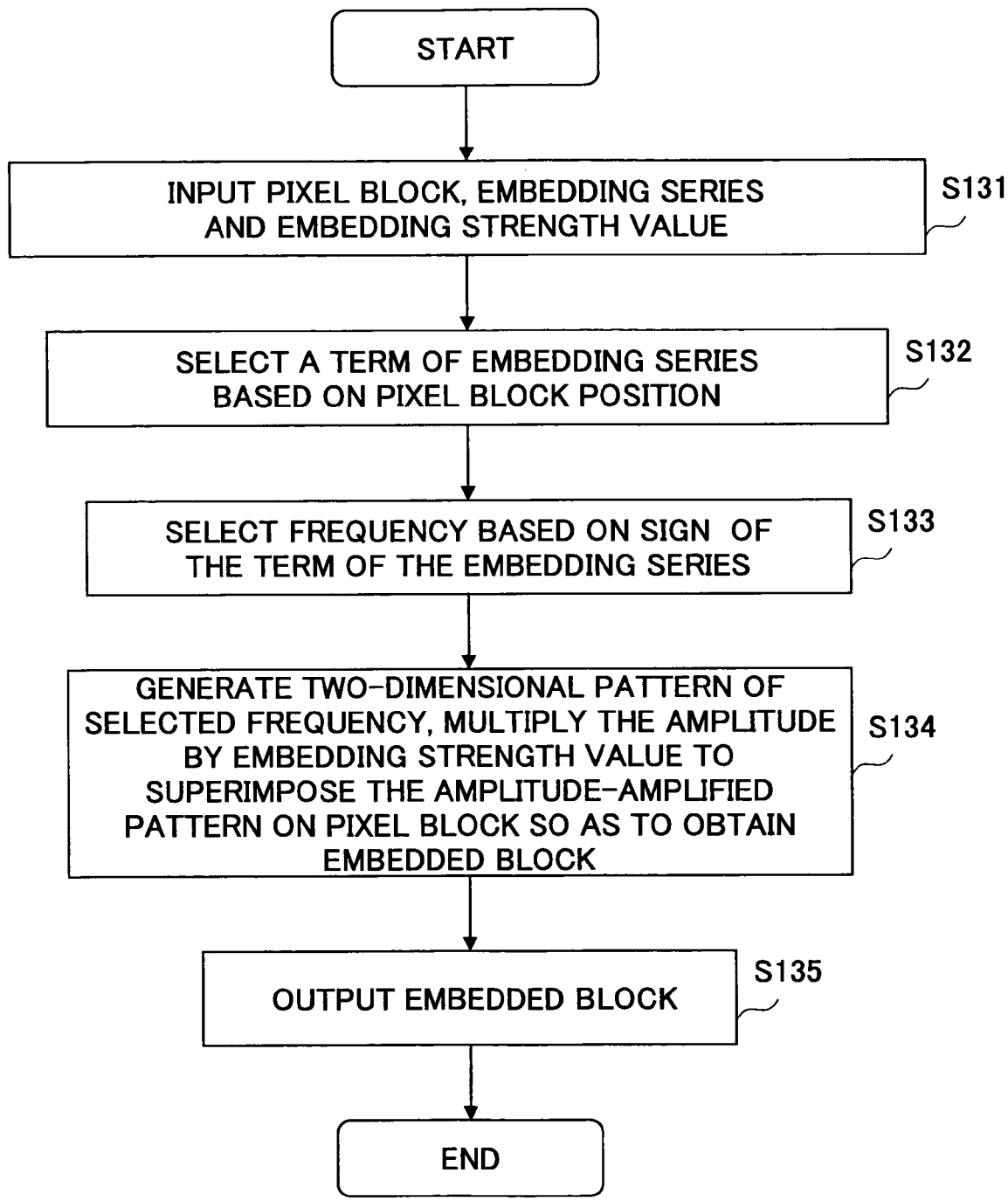
FIG. 36 is a figure showing a process flow of the block-by-block embedding unit 70.

FIG. 35 shows a configuration of a block-by-block embedding unit 70 of the third embodiment. FIG. 36 shows a process flow of the unit. As shown in FIG. 35, the block-by-block embedding unit 70 includes an embedding term selection unit 71, a frequency selection unit 72, and a frequency pattern superimposing unit 73. In the following, the operation of the block-by-block embedding unit 70 is described in detail including operations of each unit.

As shown in FIG. 36, when the block-by-block embedding unit 70 receives the pixel block, the embedding series and the embedding strength value (step 131), the embedding term selection unit 71 selects one term from the embedding series based on position information of the pixel block in the same way as the first embodiment (step 132).

Next, the frequency selection unit 72 selects a frequency based on the value of the term of the embedding series (step 133). Then, the frequency pattern superimposing unit 73 generates a two-dimensional waveform pattern corresponding to the selected frequency so as to amplify the amplitude of the frequency pattern by multiplying the amplitude by the embedding strength value and superimpose the amplified frequency pattern on a corresponding pixel block to obtain an embedded block (step 134) and output it (step 135). The block-by-block embedding unit 70 performs the above-mentioned process for every pixel block.

In the following, processes in the frequency selection unit 72 and the frequency pattern superimposing unit 73 in the block-by-block embedding unit 70 are described in detail.

First, the frequency selection unit 72 is described in detail.

Figure 37:
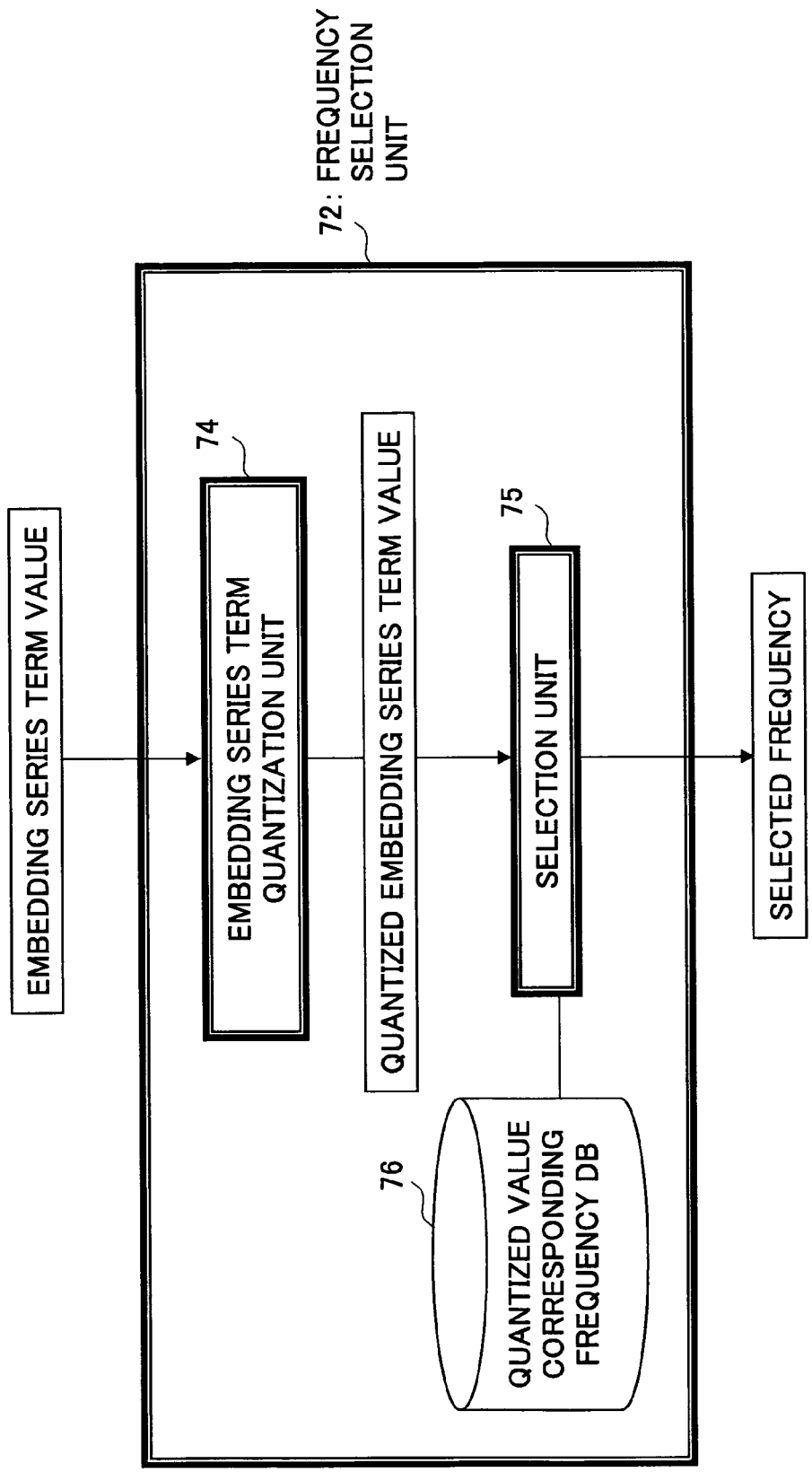
FIG. 37 is a block diagram of a frequency selection unit 72.
Figure 38:
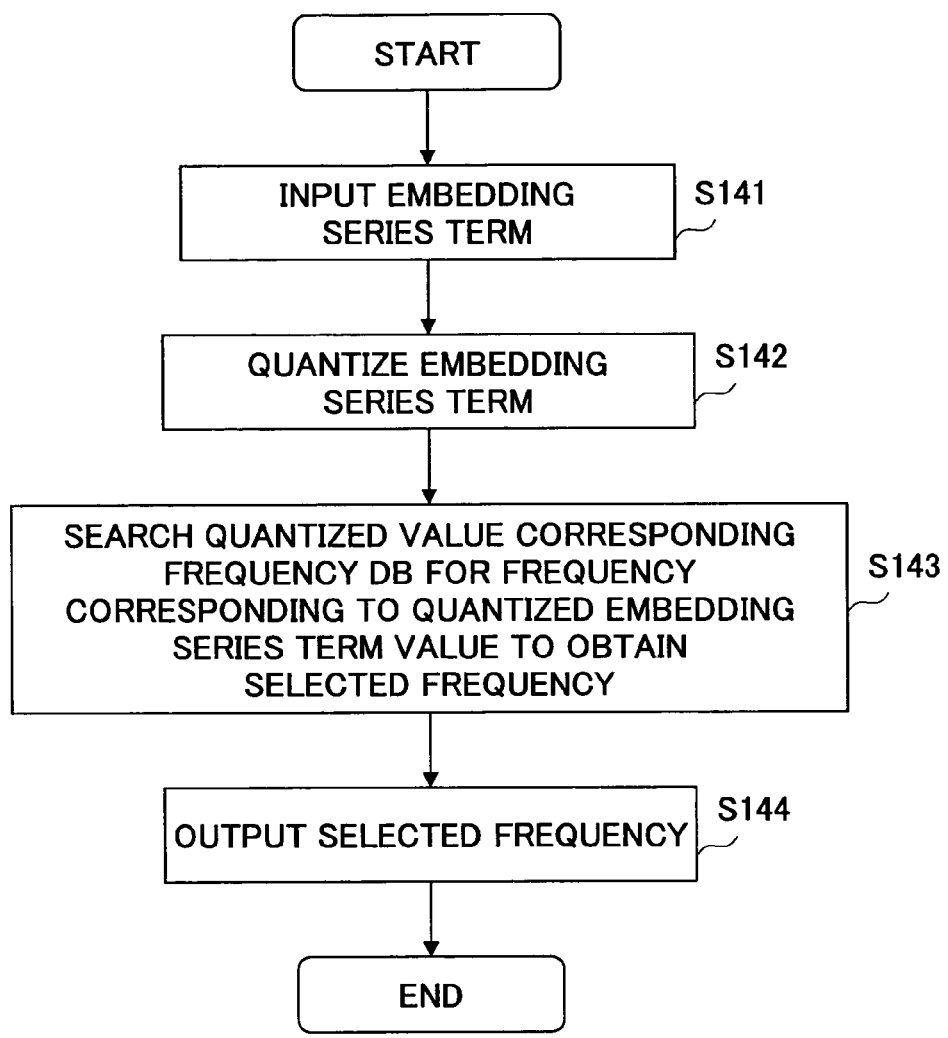
FIG. 38 is a figure showing a process flow of the frequency selection unit 72.

FIG. 37 shows a configuration of the frequency selection unit 72, and FIG. 38 shows a flow of the process. As shown in FIG. 37, the frequency selection unit 72 includes an embedding series term quantization unit 74, a selection unit 75 and a quantization corresponding frequency database 76.

As shown in FIG. 38, the frequency selection unit 72 receives the embedding term value from the embedding series term selection unit 71 (step 141). The embedding series term quantization unit 74 quantizes the embedding series term value so as to obtain a quantized embedding series term value (step 142). Then, the selection unit 75 searches a quantized value corresponding frequency database 76 for a frequency corresponding to the quantized embedding series term value so as to obtain the selected frequency (step 143) and output it (step 144).

As quantization methods performed in the embedding series term quantization unit 74, there are methods shown in FIG. 39. Quantization methods shown in (a)-(c) in FIG. 39 are respectively performed according to following calculation:

(a) Binarizing

When x is the embedding series term value, x is binarized as follows:

$x<0 \to -1$ $x>=0 \to 1$ (b) Quantizing to Three Values

When x is the embedding series term value, x is quantized to three values as follows:

$x<0 \to -1$ $x=0 \to 0$ $x>0 \to 1$ (c) Quantizing to n Values

When x is the embedding series term value, x is quantized to n values as follows:

$x<-nq/2 \to -n/2$ $-nq/2 \leq x < (n/2-1)q$ $\lfloor x/q \rfloor$ ($\lfloor x \rfloor$ indicates a largest integar that does not exceed x)

$x>(n/2-1)q \to n/2-1$ [equation 2]

Instead of using equal width quantization shown in (c), unequal width quantization can be used.

Figure 40:
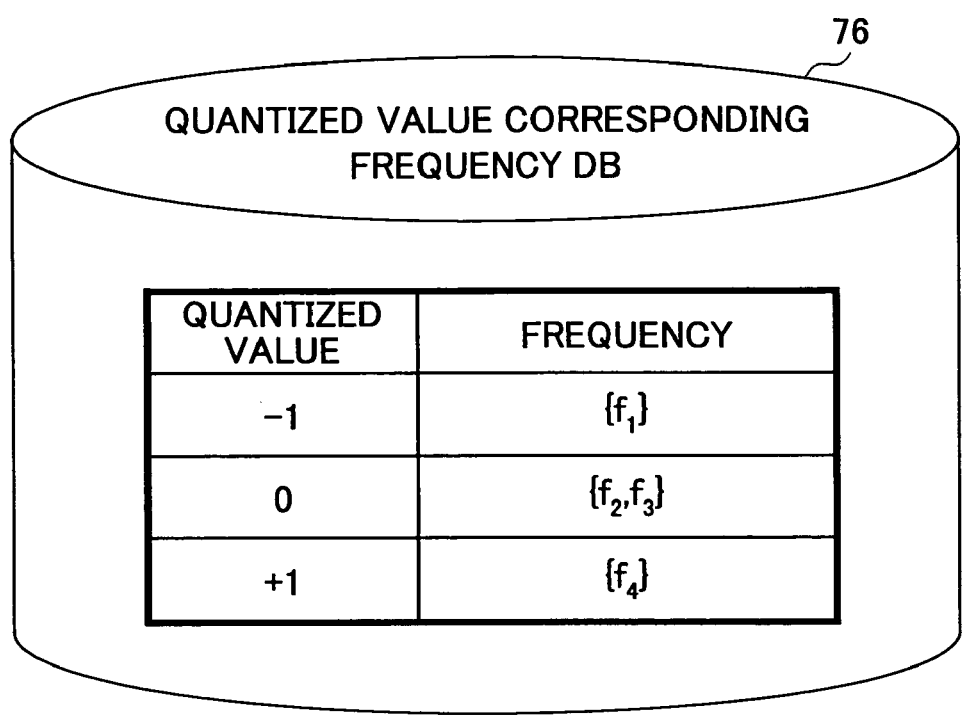
FIG. 40 is a figure showing information of a quantized value corresponding frequency database 76.

FIG. 40 shows a configuration of the quantized value corresponding frequency database 76 to which the selection unit 75 refers in step 143. This example corresponds to the case of quantization to three values. As shown in FIG. 40, in the quantized value corresponding frequency database 76, frequencies corresponding to each output of the embedding sequence term quantization unit 74 are stored beforehand. As in the case of quantized value of 0 in FIG. 40, a group of plural frequencies may correspond to one quantized value. It is assumed that "frequency" is a two-dimensional frequency representing a two-dimensional waveform pattern, and indicates a relative frequency with respect to a pixel size of the original image. The frequency is normalized with the pixel size such that a frequency representing two wavelength waveform in the x direction for an X×Y original image is the same as a frequency representing two wavelength waveform in the x direction for an 2X×2Y original image, for example.

The operation of the frequency pattern superimposing unit 73 in the block-by-block embedding unit 70 is the same as that in the first embodiment or the second embodiment. That is, the amplitude of the selected frequency pattern is amplified with the embedding strength value, or the amplitude of the selected frequency pattern is amplified with the absolute value of the embedding series term value and the embedding strength value when quantization to binary values or quantization to three values are used.

(Detection of Digital Watermark)

Figure 41:
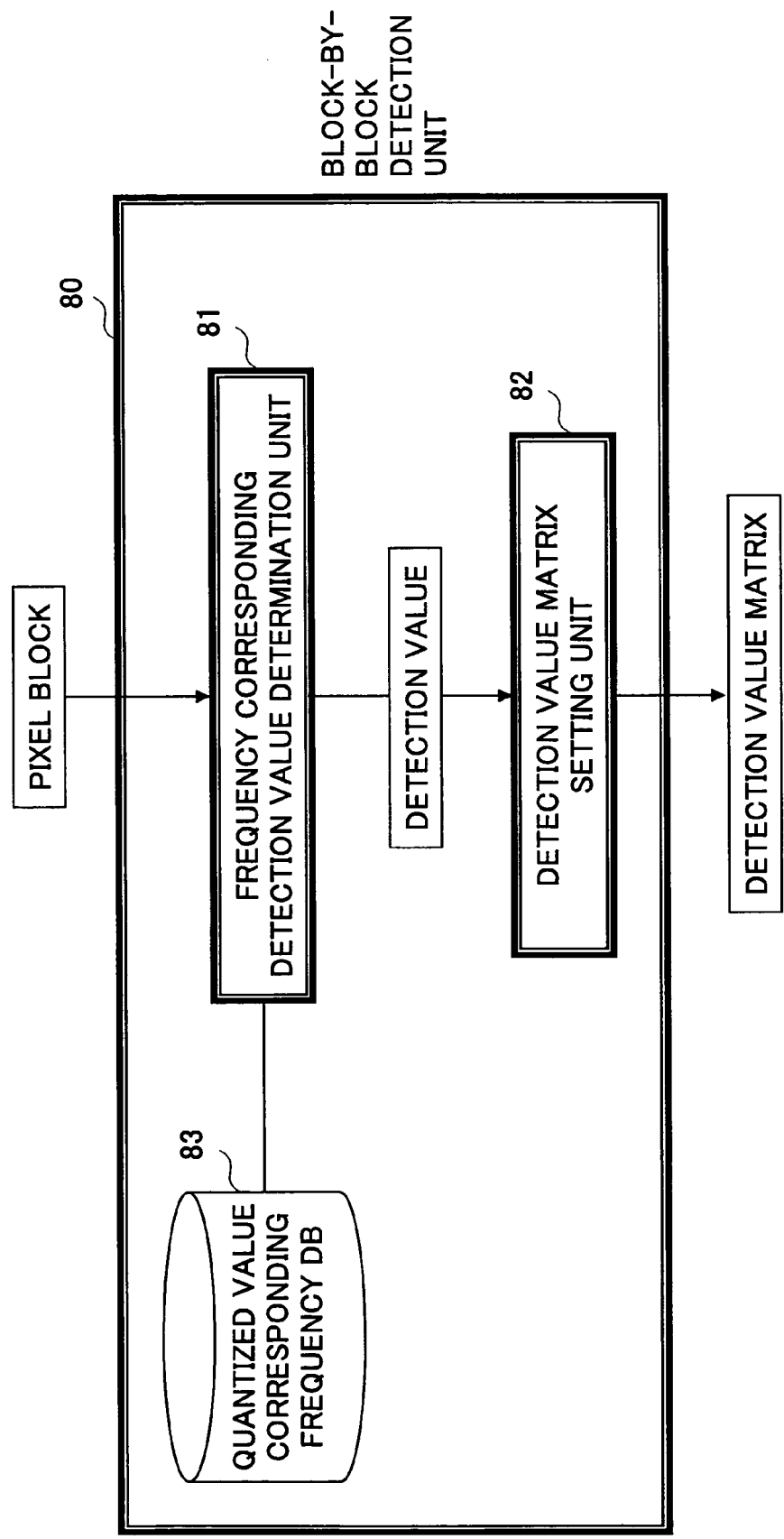
FIG. 41 is a block diagram of a block-by-block detection unit 80 of the third embodiment of the present invention.
Figure 42:
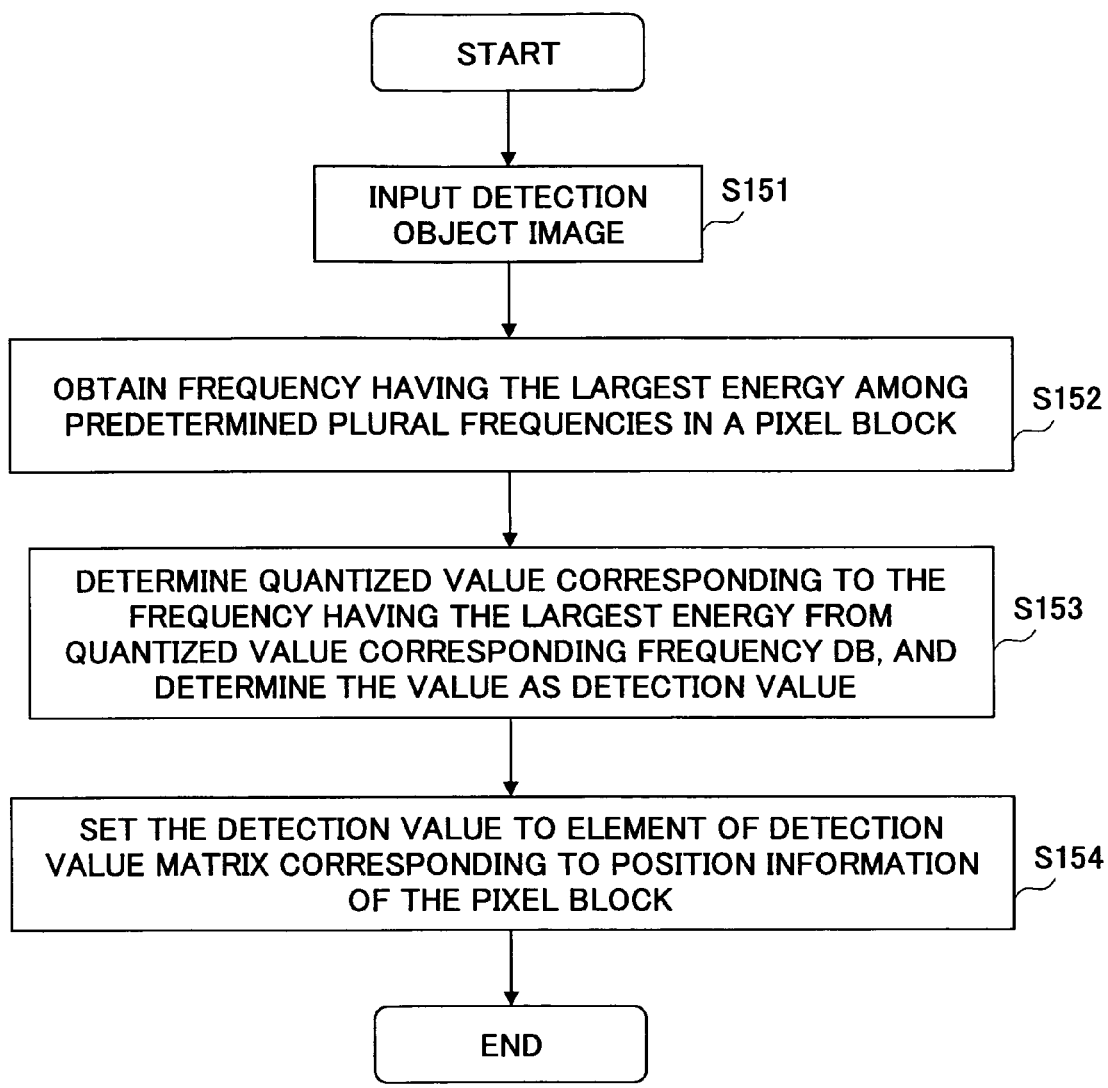
FIG. 42 is a figure showing a process flow of the block-by-block detection unit 80.

FIG. 41 shows a configuration of the block-by-block detection unit 80 of the third embodiment, and FIG. 42 shows a process flow of the unit. As shown in FIG. 41, the block-by-block detection unit 80 includes a frequency corresponding detection value determination unit 81, a detection value matrix setting unit 82 and a quantized value corresponding frequency database 83. The quantized value corresponding frequency database 83 is the same as the quantized value corresponding frequency database 76 of the digital watermark embedding apparatus 10 of the third embodiment.

As shown in FIG. 42, the block-by-block detection unit 80 receives a pixel block from the block dividing unit 32 (step 151). The frequency corresponding detection value determination unit 81 obtains, for the pixel block, energy of each frequency associated with each quantized value in the quantized value corresponding frequency database 83, that is, obtains power spectrum for each frequency. At that time, when plural frequencies are associated with one quantized value, total sum of energies of each frequency corresponding to the quantized value is obtained. Among energies of the frequencies obtained in the above-mentioned way, a frequency having the largest energy is obtained (step 152). Then, a quantized value corresponding to the frequency having the largest energy is determined from the quantized value corresponding frequency database 83 so that the value is output as a detection value corresponding to the pixel block (step 153). Then, the detection value matrix setting unit 82 sets the detection value in an element in the detection value matrix corresponding to position information of the pixel block (step 154). That is, in step 154, for the detection value matrix $D=\{d_{ij}\}$ that is a matrix having n rows and m columns, the detection value matrix setting unit 82 sets the detection value in an element $d_{m0n0}$ corresponding to position information (m0, n0) of the pixel block currently being processed.

By repeating the above-mentioned process for every pixel block in the block-by-block detection unit 80, all elements of the detection value matrix are determined. Examples of a digital watermark detection object image and a final detection value matrix are the same as those shown in FIG. 21.

Configuration of other parts in the digital watermark detection apparatus 30 in the third embodiment is the same as that described in the first embodiment or the second embodiment.

(Effects of the Third Embodiment)

According to this embodiment, since the watermark information is superimposed on the original image as a waveform pattern corresponding to a specific frequency for each pixel block, robust detection can be realized even when cut out positions of the pixel blocks are shifted for some extent due to occurrence of some geometric distortion in the digital watermark detection object image when detection is performed since the frequency having the largest energy in the plural frequencies is stable to some extent.

In additional, in the detection process, only calculation for obtaining power spectrums for some frequencies for each small block is necessary, and any process that requires large computational complexity such as large sized two-dimensional orthogonal transformation is not necessary, so that the detection process can be realized at high speed.

The digital watermark detection apparatus of the second embodiment can perform detection process also for a digital watermark embedded image in which binary quantization or three value quantization shown in the third embodiment is used. In this case, when blocks enabling stable detection and blocks causing unstable detection are mixed such as when watermark is embedded by adaptively changing the embedding strength according to local complexity, since detection can be performed in which more weight is placed on detection values detected from stable blocks, detection performance can be improved compared with the third embodiment.

Fourth Embodiment

Next, the fourth embodiment of the present invention is described. The fourth embodiment relates to detection of digital watermark embedded using the method described in the first embodiment or the second embodiment. In the fourth embodiment of the present invention, units other than units describe below are the same as those described in the first embodiment or the second embodiment.

Figure 43:
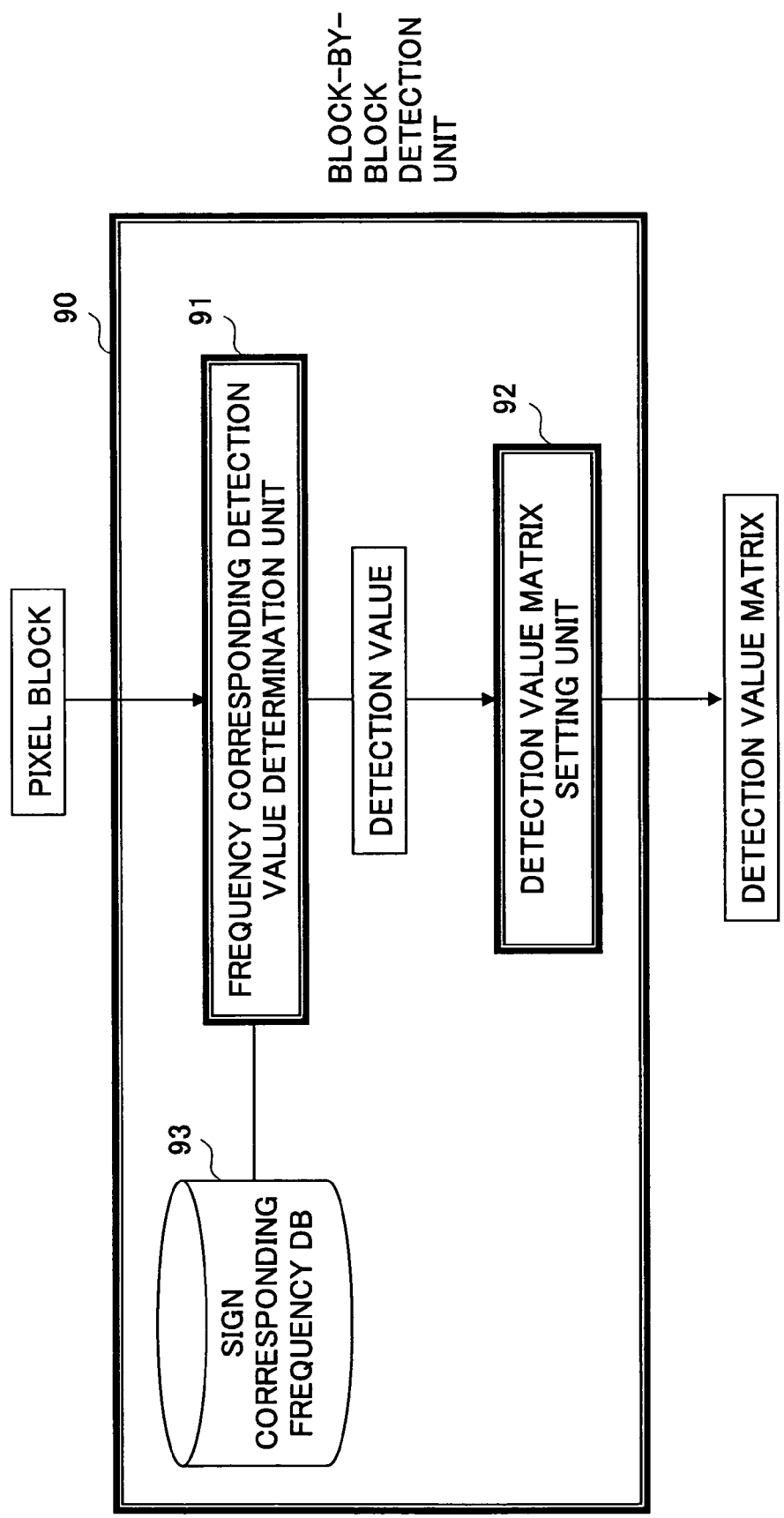
FIG. 43 is a block diagram of a block-by-block detection unit 90 of a fourth embodiment of the present invention.
Figure 44:
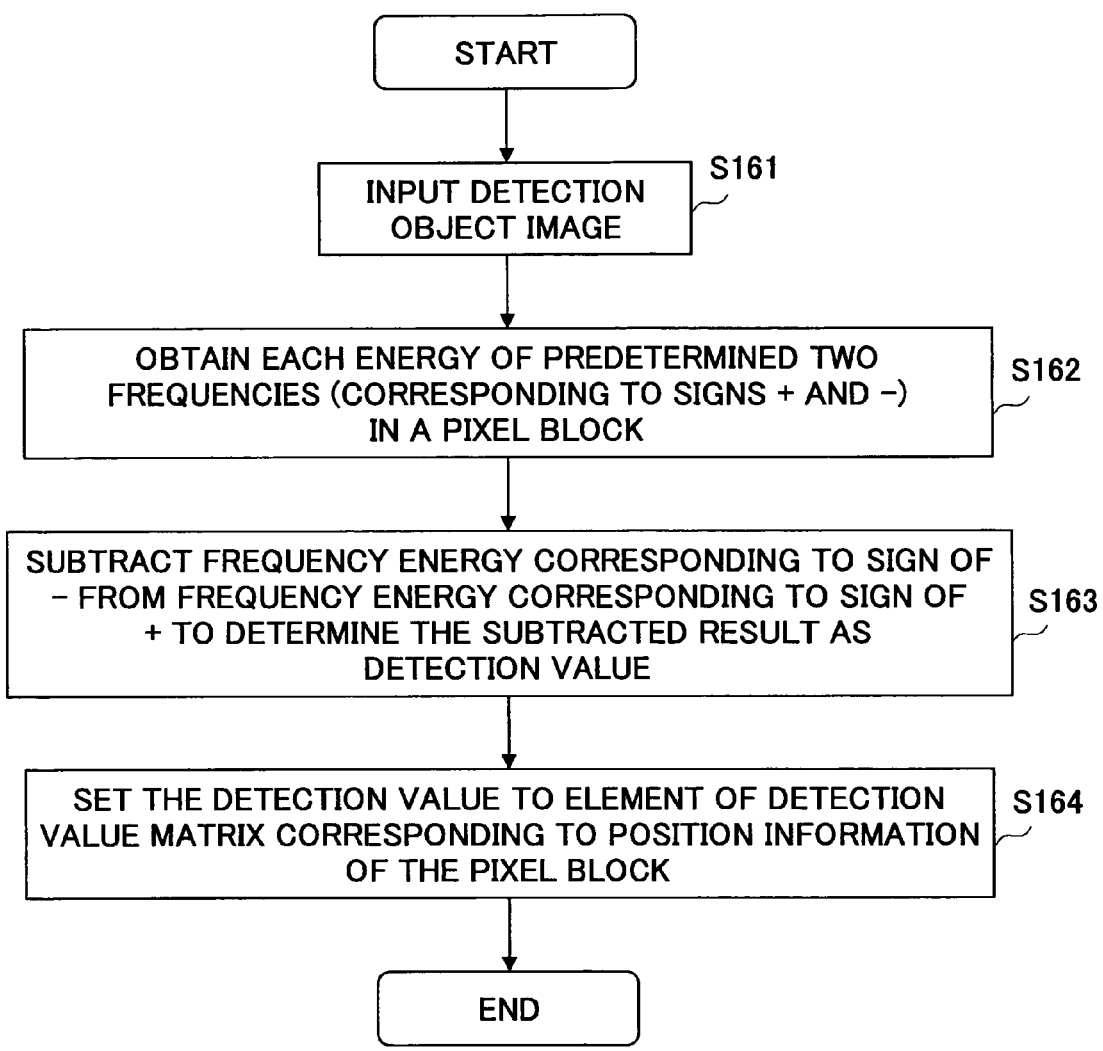
FIG. 44 is a figure showing a process flow of the block-by-block detection unit 90.

FIG. 43 shows a configuration of the block-by-block detection unit 90 of the fourth embodiment of the present invention, and FIG. 44 shows a process flow of the unit. As shown in FIG. 43, the block-by-block detection unit 90 includes a frequency corresponding detection value determination unit 91, a detection value matrix setting unit 92 and a sign corresponding frequency database 93. As shown in FIG. 43, the block-by-block detection unit 90 receives a pixel block (step 161). The frequency corresponding detection value determination unit 91 obtains energy of each frequency associated with each sign in the sign corresponding frequency database 37, that is, obtains power spectrums for each frequency (step 162), wherein the sign corresponding frequency database 93 is the same as the sign corresponding frequency database in the digital watermark embedding apparatus 10. At the time, when plural frequencies are associated with one sign, total sum of energies of the frequencies is obtained. For two energies of the frequencies (corresponding to signs + and − respectively) obtained in the above-mentioned way, an energy value of a frequency corresponding to the sign "−" is subtracted from an energy value of a frequency corresponding to the sign "+" so as to output the subtracted result as a detection value (step 163).

Next, for the detection value matrix $D=\{d_{ij}\}$ that is a matrix having n rows and m columns, the detection value matrix determination unit 92 sets the detection value in an element $d_{m0n0}$ corresponding to position information (m0, n0) of the pixel block currently being processed (step 164).

By repeating the above-mentioned process for every pixel block, all elements of the detection value matrix are determined. Examples of a digital watermark detection object image and a final detection value matrix are the same as those shown in FIG. 34. The sign of each element of the detection value matrix is determined according to a frequency pattern superimposed on the corresponding pixel block, and the absolute value corresponds to a value obtained by subtracting, from the energy of the frequency, the energy of another frequency.

Figure 45:
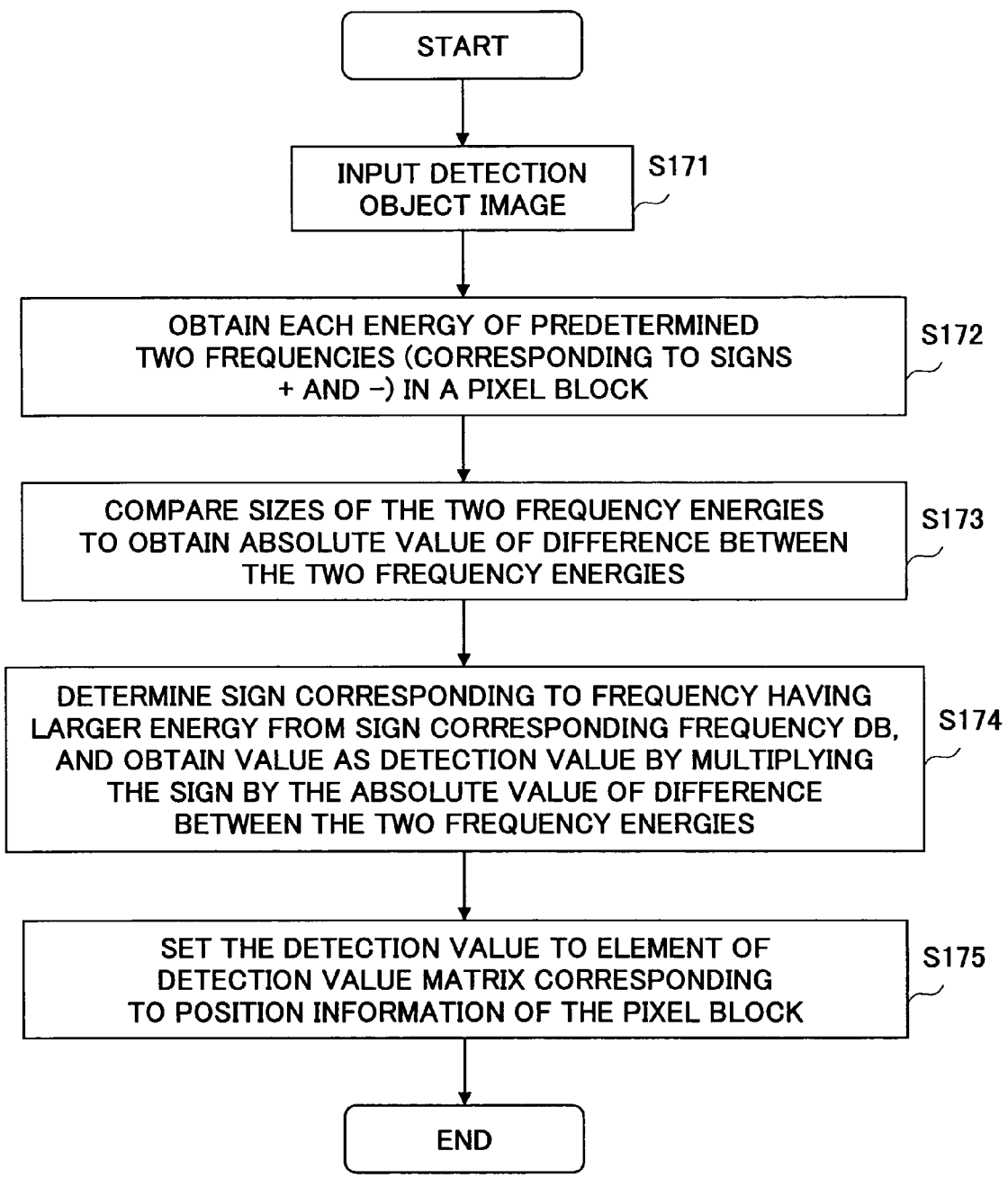
FIG. 45 is a figure showing another example of a process flow of the block-by-block detection unit 90.

Instead of the above-mentioned processes, following processes can be performed. In this case, as shown in FIG. 45, sizes are compared between the two energies of the frequencies (corresponding to signs of + and − respectively) so that an absolute value of the difference between the larger energy and the smaller energy is obtained (step 173). Then, a sign (+ or −) corresponding to the frequency having the larger energy is determined from the sign corresponding frequency database 93 so that a value is obtained as the detection value by multiplying the sign by the difference of the frequency energies (step 174).

(Effects of the Fourth Embodiment)

According to this embodiment, compared with the first and second embodiments, by using the difference between two energies of the frequencies used for embedding when determining the detection value, there are following effects.

When the original image includes a part having a pattern similar to a frequency pattern corresponding to one frequency in two frequencies used for embedding and when a frequency waveform pattern different from the pattern of the part is superimposed in the part, a reversed sign of a sign embedded as a detection value is set with a large absolute value in the case of the second embodiment. Thus, large noise occurs when despreading is performed. On the other hand, according to the present embodiment, since an absolute value of the difference between two frequency energies is used, the noise energy can be reduced relatively so that more stable digital watermark detection can be realized.

Fifth Embodiment

Next, the fifth embodiment of the present invention is described. In the following, parts different from the first to fourth embodiments are mainly described. That is, configurations described in the first to fourth embodiments can be used as necessary as configurations other than parts described below in the fifth embodiment of the present invention.

Figure 46:
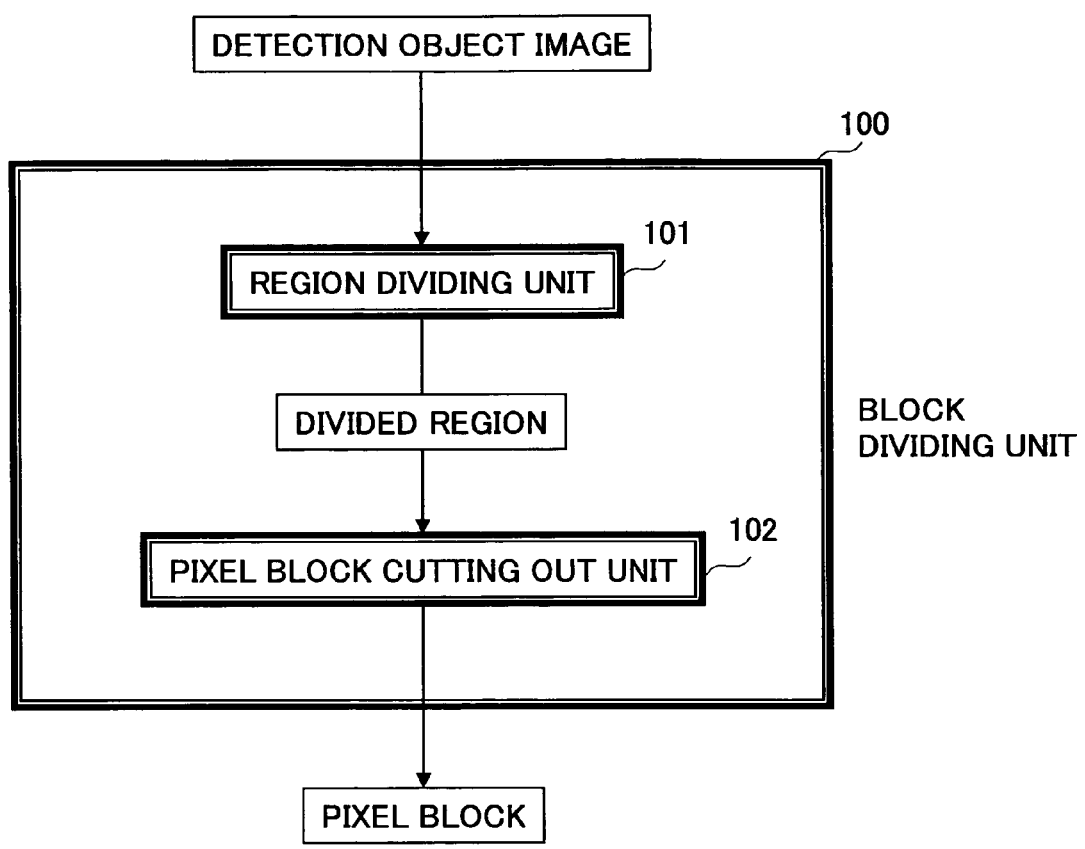
FIG. 46 is a block diagram of a block dividing unit 100 in the digital watermark detection apparatus of a fifth embodiment of the present invention.
Figure 47:
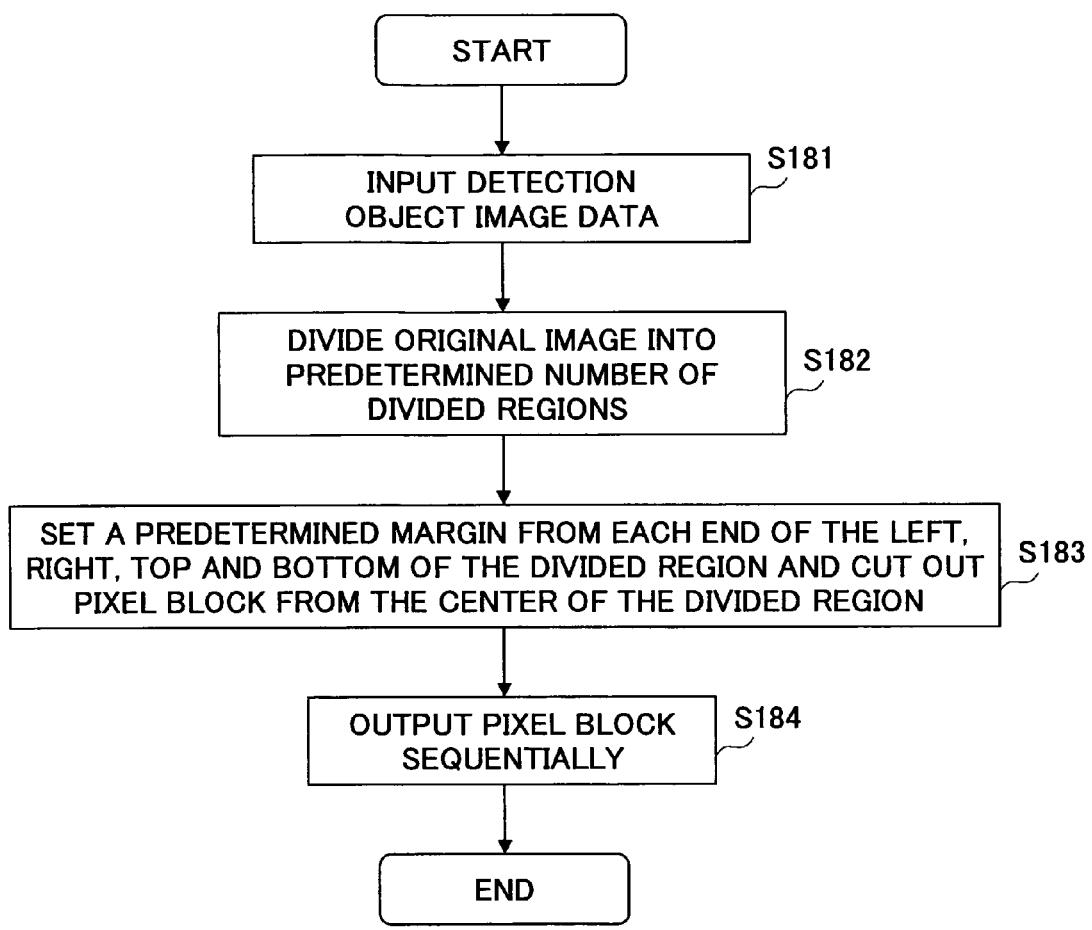
FIG. 47 is a figure showing a process flow of the block dividing unit 100.

FIG. 46 shows a configuration of a block dividing unit 100 in the digital watermark detection apparatus of the fifth embodiment of the present invention, and FIG. 47 shows a process flow of the unit. As shown in FIG. 46, the block dividing unit 100 includes a region dividing unit 101 and a pixel block cutting out unit 102.

Figure 48:
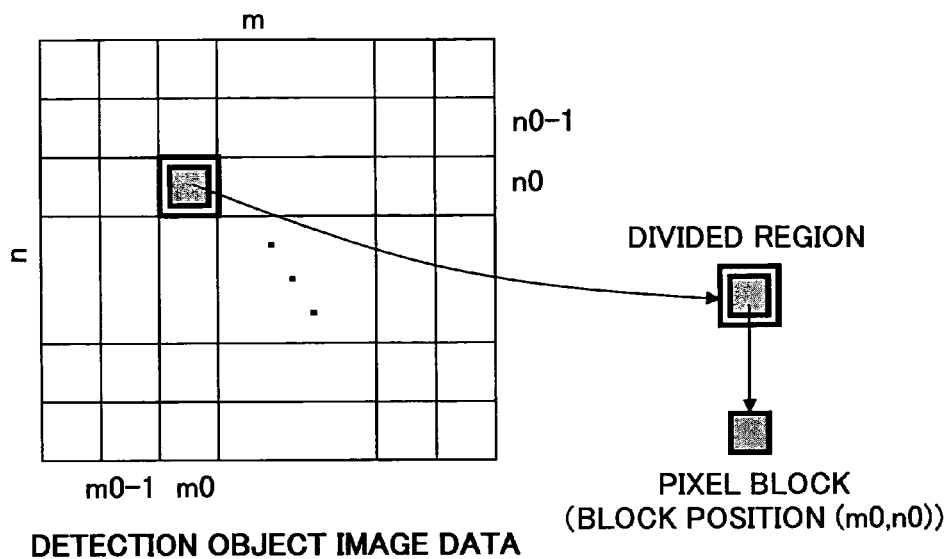
FIG. 48 is a figure for explaining the operation of the block dividing unit 100.

The process flow of the block dividing unit 100 is described with reference to FIG. 47. The block dividing unit 100 receives a detection object image from the image input unit in the digital watermark detection apparatus 10 (step 181), so that the region dividing unit 101 divides the detection object image into divided regions the number (m×n) of which is predetermined (step 182). Next, as shown in FIG. 48, the pixel block cutting out unit 102 sets a predetermined margin from each end of the left, right, top and bottom of a divided region and cuts out a pixel block from the center of the divided region except for the margin (step 183) so as to output each pixel block sequentially (step 184), wherein 10 percent of a length of a side of the divided region is set as the margin for each of the left, right, top and bottom, for example. In each pixel block that is output, position information of the pixel block on the detection object image is added, more precisely, position information of the divided region on the detection object image is added.

(Effects of the Fifth Embodiment)

Figure 49:
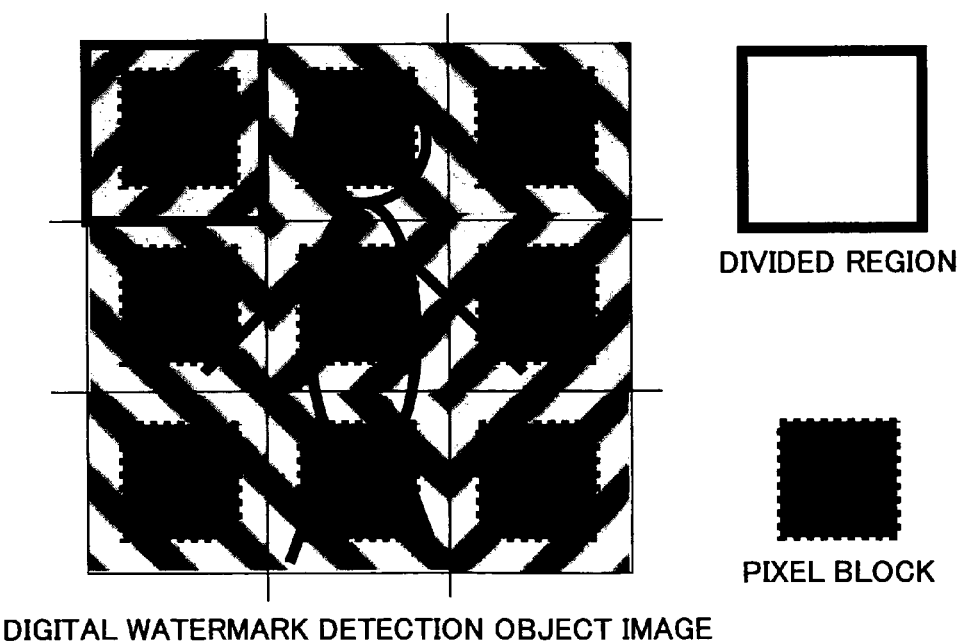
FIG. 49 is a figure for explaining effects of the fifth embodiment.

The effects of the fifth embodiment is described with reference to FIG. 49. As shown in FIG. 49, according to this embodiment, a pixel block used when performing detection is a region in the inside of the divided region. Accordingly, even when cut out position of the pixel block is shifted to some extent due to occurrence of some geometric distortion in the digital watermark detection object image, a probability that a cut out pixel block straddles a border between original pixel blocks becomes low. That is, since pixel blocks on which another frequency pattern is superimposed are not included, detection can be performed more robustly for geometrical distortion to some extent compared with the first to fourth embodiments.

In addition, since the size of the pixel block becomes relatively small compared with the first to fourth embodiments, computational complexity for detection processes can be decreased so that detection can be realized at higher speed.

Sixth Embodiment

Next, the sixth embodiment of the present invention is described. In the following, parts different from the first to fifth embodiments are mainly described. That is, configurations described in the first to fifth embodiments can be used as necessary as corresponding configurations other than parts described below in the sixth embodiment of the present invention.

Figure 50:
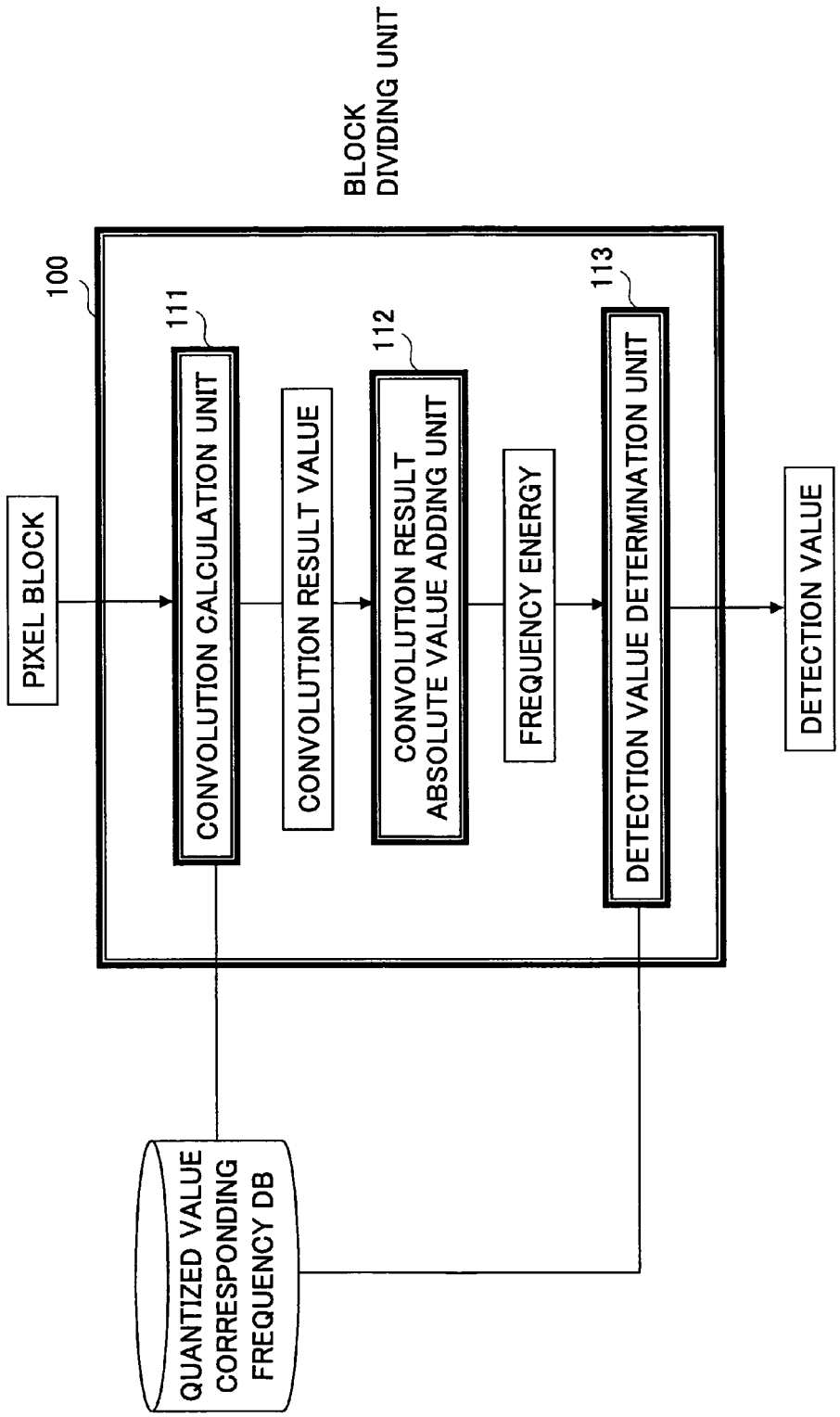
FIG. 50 is a block diagram of a frequency corresponding detection value determination unit 110 in the block-by-block detection unit in the digital watermark detection apparatus of a sixth embodiment of the present invention.
Figure 51:
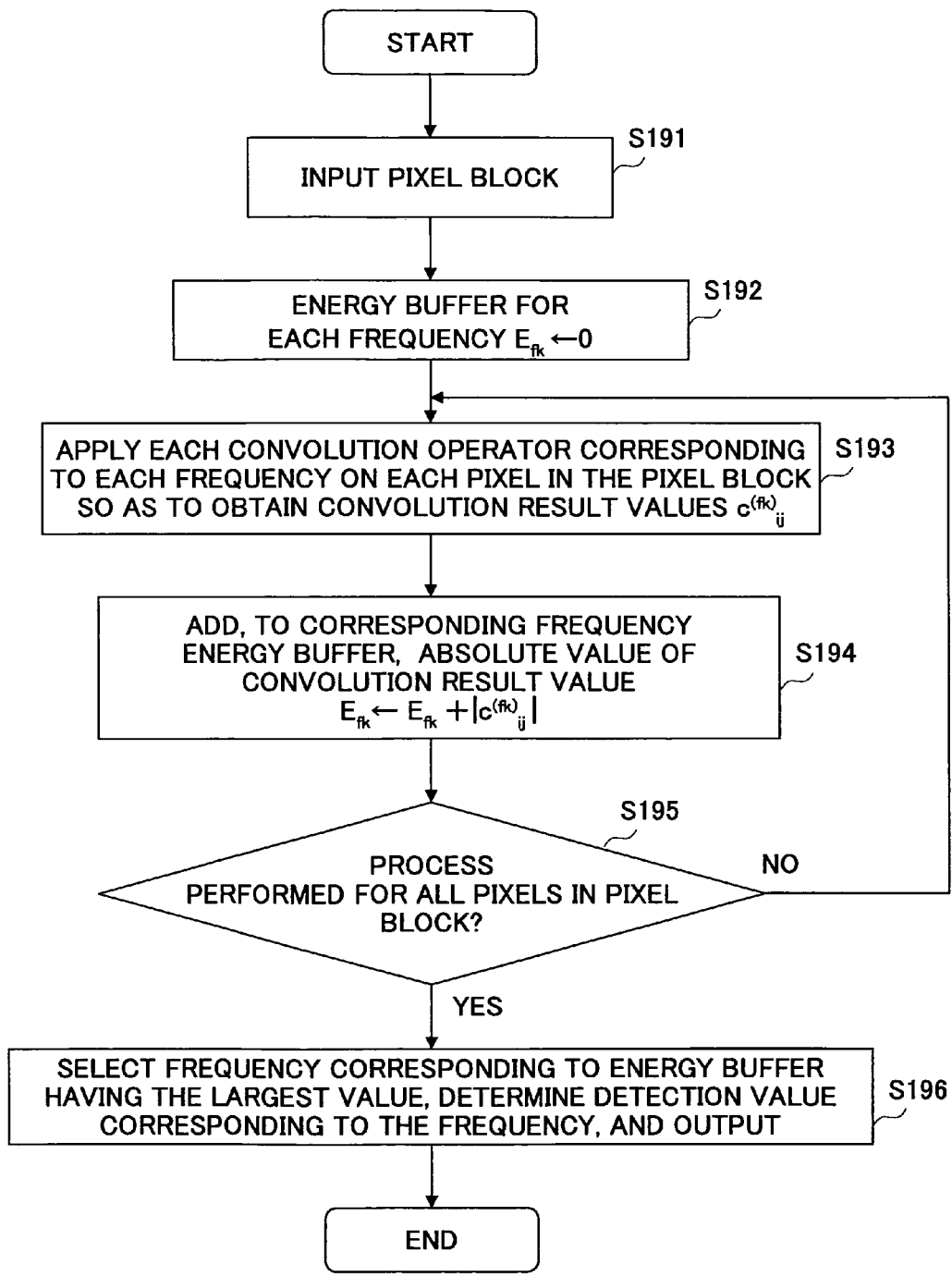
FIG. 51 is a figure showing a process flow of the frequency corresponding detection value determination unit 110.

FIG. 50 shows a configuration of a frequency corresponding detection value determination unit 110 in the block-by-block detection unit in the digital watermark detection apparatus of the sixth embodiment of the present invention, and FIG. 51 shows a process flow.

As shown in FIG. 50, the frequency corresponding detection value determination unit 110 of the sixth embodiment includes a convolution calculation unit 111, a convolution result absolute value adding unit 112 and a detection value determination unit 113. In addition, frequency corresponding detection value determination unit 110 includes convolution operators corresponding to each frequency registered in the quantized value corresponding frequency database (or sign corresponding frequency database). In the following, process flow is described with reference to FIG. 51.

The frequency corresponding detection value determination unit 110 receives a pixel block from the block dividing unit in the digital watermark detection apparatus (step 191). First, an energy buffer $E_{fk}$ for each frequency is initialized to 0 (step 192). Next, the convolution calculation unit 111 applies convolution operators corresponding to each frequency on each pixel in the pixel block so as to obtain convolution result values (step 193). FIG. 52 shows examples of the convolution operators.

Then, the convolution result absolute value adding unit 112 adds an absolute value of the convolution result value corresponding to a corresponding energy buffer for each frequency for a pixel (step 194). This process is performed for every pixel in the pixel block (step 195). From the result, the detection value determination unit 113 selects a frequency corresponding to an energy buffer having the largest value, and determines a detection value corresponding to the frequency by referring to the quantized value corresponding frequency database (or sign corresponding frequency database) and outputs the detection value (step 196).

As to a pixel block, the added value of the absolute values obtained for each frequency can be used as the energy value corresponding to each frequency in the fourth embodiment, for example. Therefore, subtracting the energy value of a frequency corresponding to the sign "−" from the energy value of a frequency corresponding to the sign "+" in the fourth embodiment corresponds to subtracting the added value of absolute values corresponding to a frequency corresponding to the sign "−" from the added value of absolute values corresponding to a frequency corresponding to the sign "+".

(Effects of the Sixth Embodiment)

According to this embodiment, as shown in FIG. 52, a value equivalent to the frequency energy is obtained by applying a relatively small convolution operator for each frequency. This process corresponds to a directional derivative process corresponding to a frequency. Generally, for obtaining an energy of a frequency according to a definition formula, calculation of $e^{i\theta}$ is necessary, that is, it is necessary to perform processes, such as trigonometric function process, requiring large computational complexity. On the other hand, according to this embodiment, since only the simple convolution calculation that is based on integer values is necessary, computational complexity is reduced so that the detection process can be realized at higher speed compared with a case where the frequency energy is obtained according to the definition formula.

Seventh Embodiment

Next, the seventh embodiment of the present invention is described. In the following, parts different from the first to sixth embodiments are mainly described. That is, configurations described in the first to sixth embodiments can be used as necessary as corresponding configurations other than parts described below in the seventh embodiment of the present invention.

Figure 53:
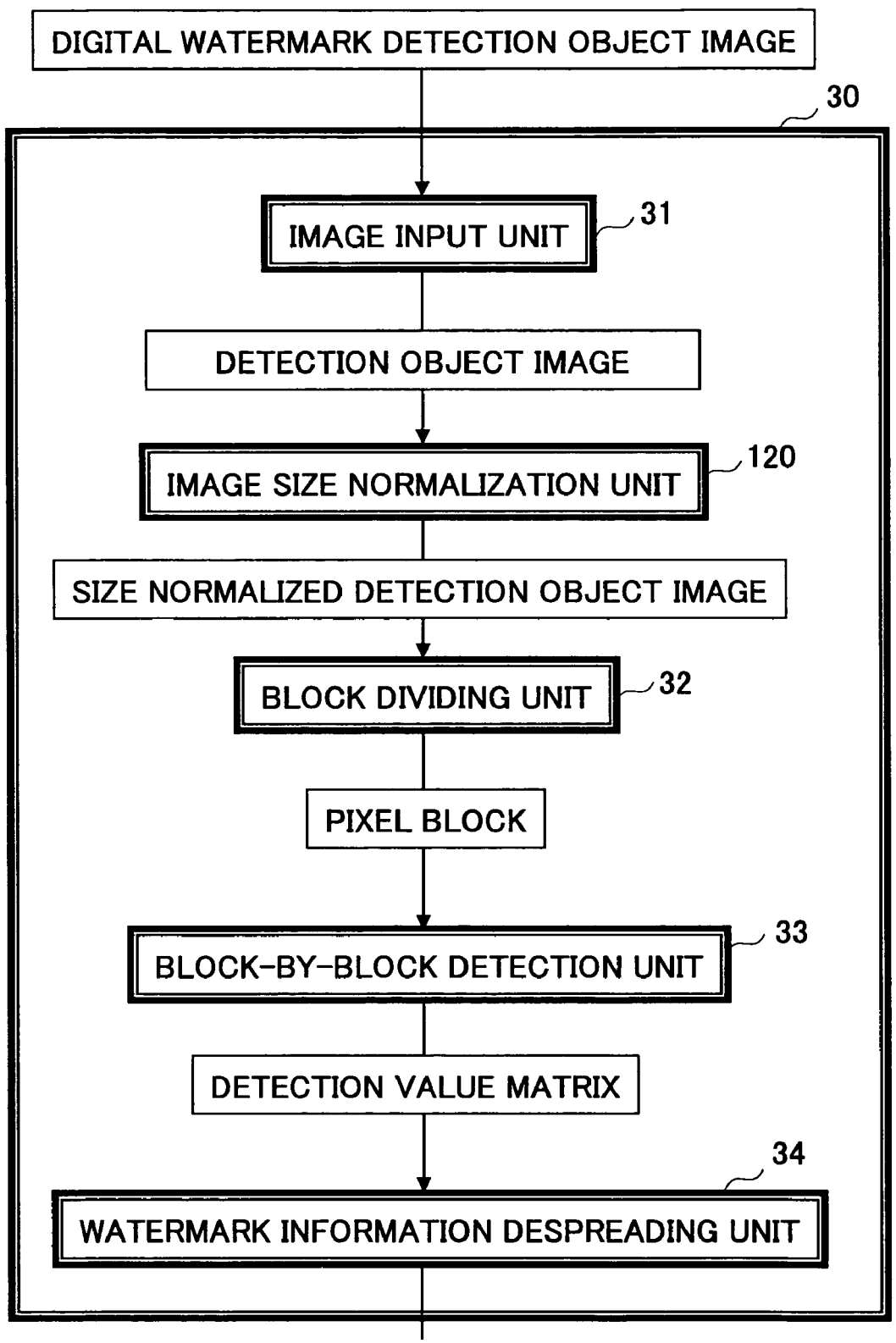
FIG. 53 is a block diagram of a digital watermark detection apparatus 30 in a seventh embodiment of the present invention.
Figure 54:
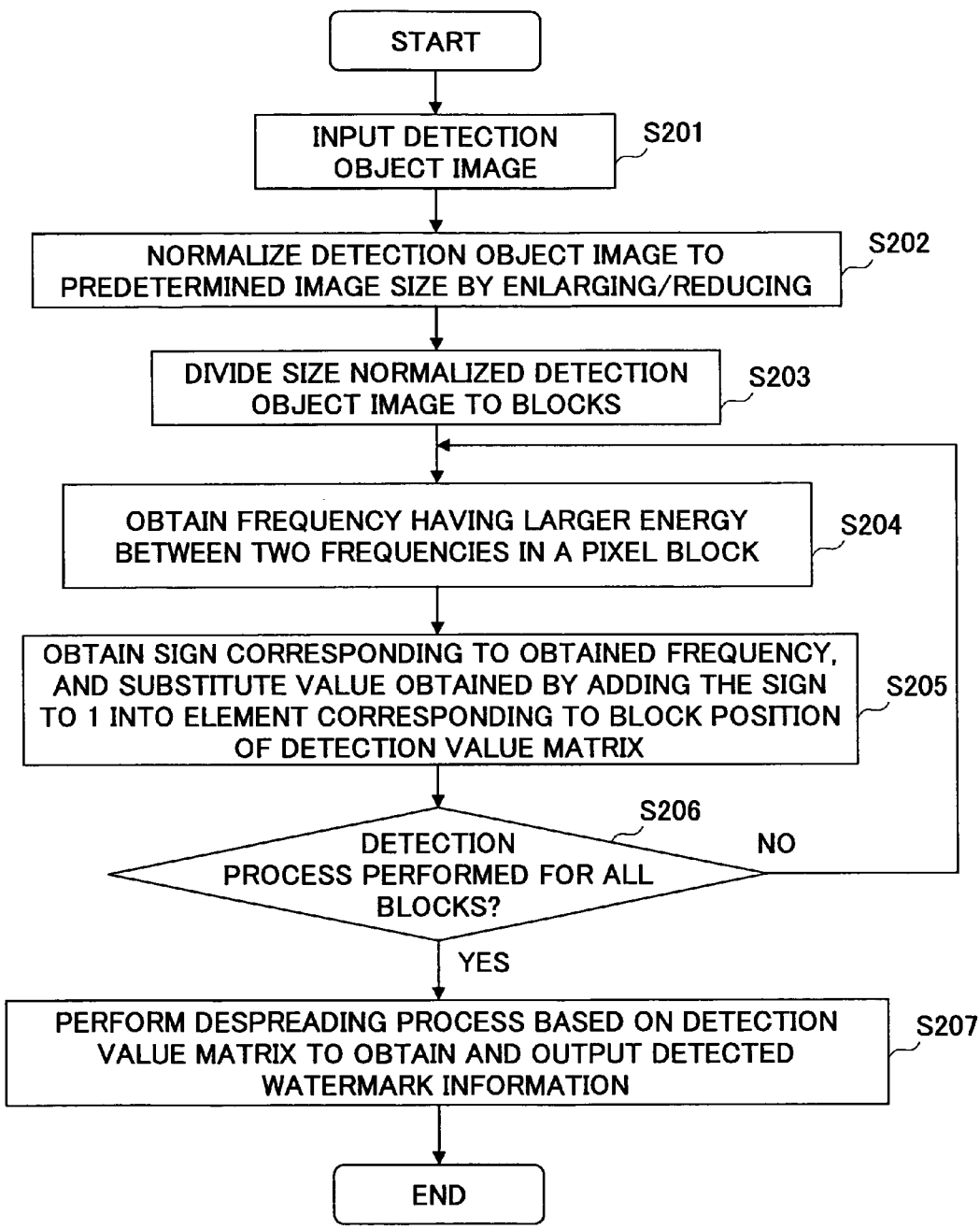
FIG. 54 is a figure showing a process flow of the digital watermark detection apparatus 30 in the seventh embodiment of the present invention.

FIG. 53 shows a configuration of the digital watermark detection apparatus 30 in the seventh embodiment of the present invention, and FIG. 54 shows a process flow of the digital watermark detection apparatus 30. In this embodiment, an image size normalization unit 120 is provided between the image input unit 31 and the block dividing unit 32. The process flow in the digital watermark detection apparatus 10 of this embodiment is described with reference to FIG. 54.

As shown in FIG. 54, after the digital watermark detection apparatus 30 receives the detection object image (step 201), the digital watermark detection apparatus 30 enlarges/reduces the detection object image such that the size of the detection object image becomes a predetermined image size having a predetermined number of pixels so as to generate a size normalized detection object image in which the image size has been normalized, so that size normalized detection object image is input in the next block dividing unit 32. Processes after that are the same as those in the first embodiment and the like.

(Effects of Seventh Embodiment)

According to this embodiment, the actual digital watermark detection process is performed after the size of the detection object image is normalized. Generally, as long as the normalized image size is not extremely large, computational complexity in the digital watermark detection process is greater than that in the enlarging/reducing process of the image. There is no problem in the calculation process if the normalizing size is equal to or greater than a size in which there is no problem in detection (size in which the frequency pattern is not crushed). Thus, generally, there are many cases where reducing process is performed for an input image (because, if enlargement is necessary, the frequency pattern is already crushed so that detection is impossible). Therefore, by performing the normalization process, the greater the size of the input image is, the more computational complexity is reduced, so that the detection process can be realized at higher speed compared with a case where normalization is not performed.

Further, as described in the sixth embodiment, when the convolution calculation is used for obtaining the frequency energy, by normalizing the image size, wavelength of the frequency pattern is determined. Thus, as shown in FIG. 55, a convolution operator in which wavelength after normalized is considered can be used instead of the convolution operator corresponding to simple directional derivative. Thus, since the frequency energy can be measured with higher precision, detection can be realized more robustly.

Eighth Embodiment

Next, the eighth embodiment of the present invention is described. In the following, parts different from the first to seventh embodiments are mainly described. That is, configurations described in the first to seventh embodiments can be used as necessary as corresponding configurations other than parts described below in the eighth embodiment of the present invention. In the following description, a case where the present embodiment is applied to the seventh embodiment is described.

Figure 56:
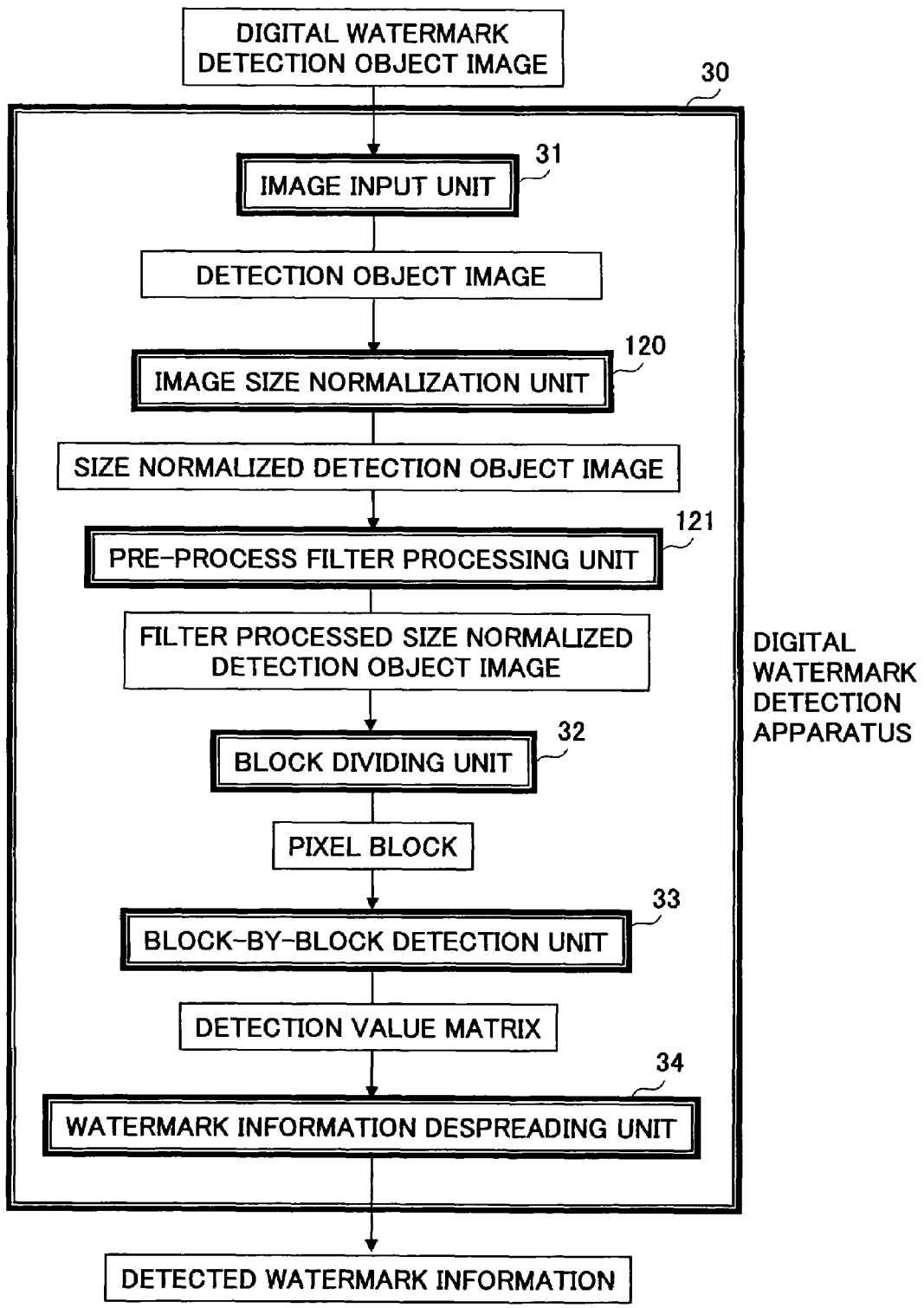
FIG. 56 is a block diagram of a digital watermark detection apparatus 30 in a eighth embodiment of the present invention.
Figure 57:
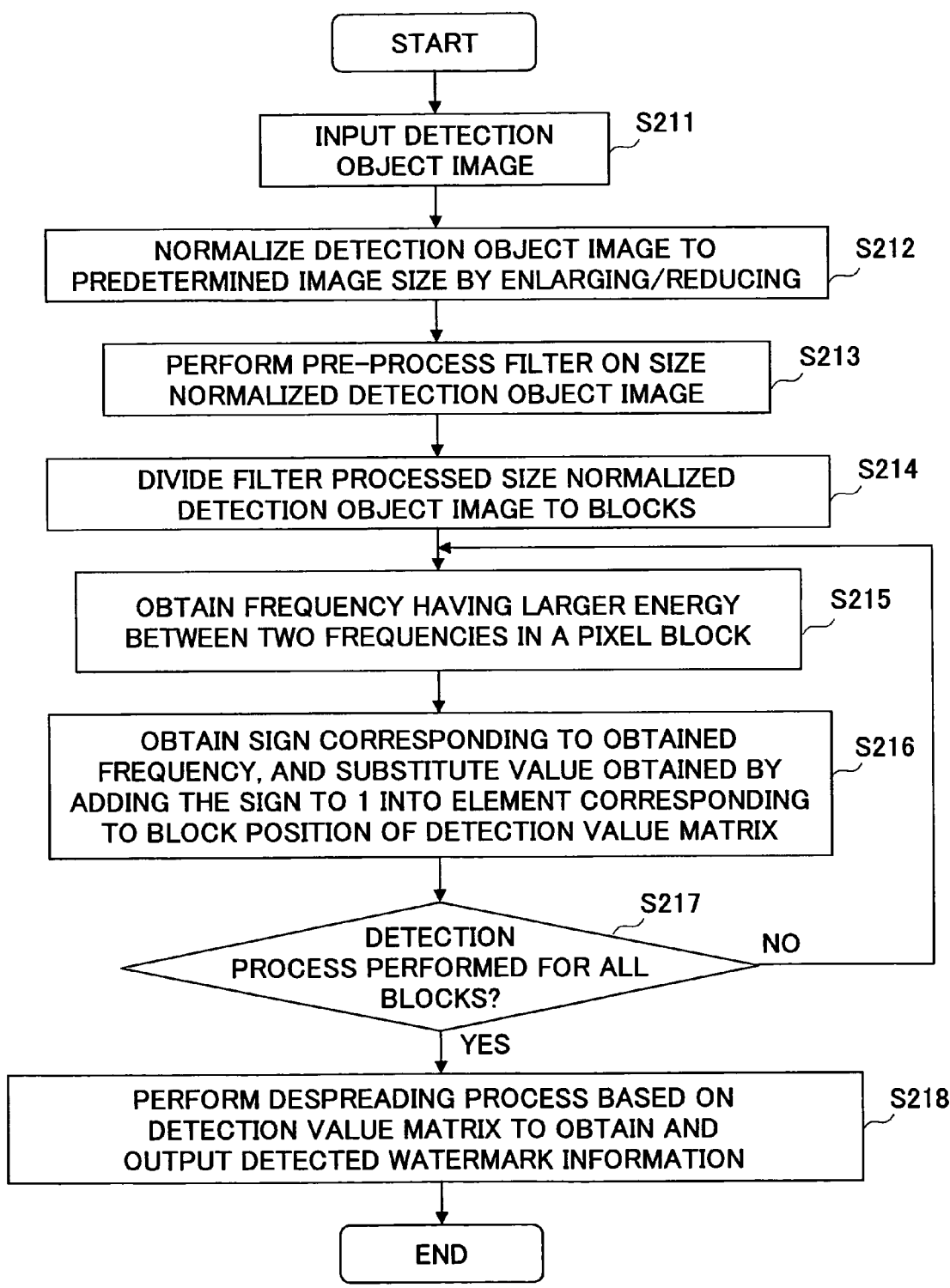
FIG. 57 is a figure showing a process flow of the digital watermark detection apparatus 30 in the eighth embodiment of the present invention.

FIG. 56 shows a configuration of the digital watermark detection apparatus 30 in the eighth embodiment of the present invention, and FIG. 57 shows a process flow. As shown in FIG. 56, the digital watermark detection apparatus 30 of this embodiment includes a pre-process filter processing unit 121 between the image size normalization unit 120 and the block dividing unit 32.

In this embodiment, as shown in FIG. 57, the pre-process filter processing unit 121 performs pre-process filter processing on a size normalized detection object image output from the image size normalization unit 120 (step 213). Then, the block dividing unit 32 divides the size normalized detection object image on which filter processing has been performed into blocks (step 214).

Figure 58:
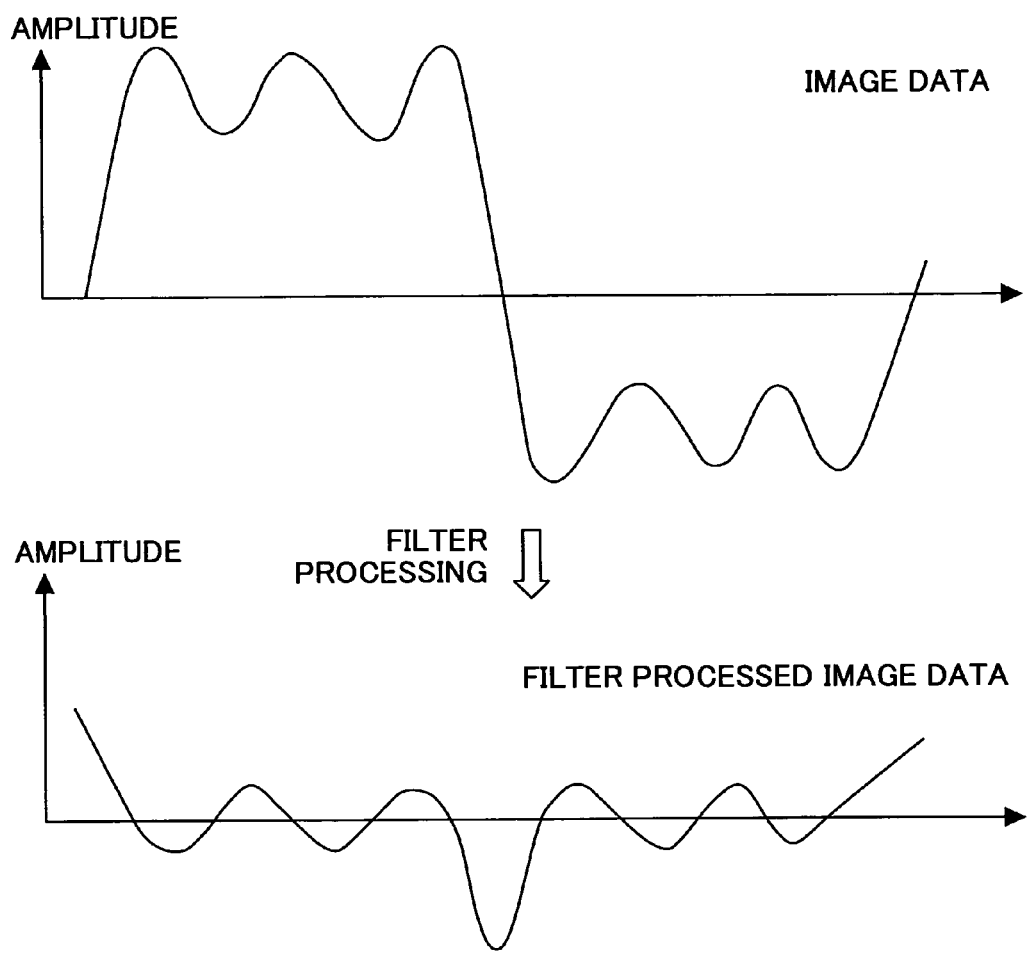
FIG. 58 is a figure for explaining a pre-process filter processing.

As a filter for the pre-process filter processing, it is desirable to use a band-pass filter that passes a frequency of the frequency pattern used for embedding. According to band-pass process by the band-pass filter, a low-frequency component is reduced as shown in FIG. 58, for example. Since a pattern of the original image data includes large amount of low-frequency components, effects by the pattern of the original image data against the frequency pattern can be reduced. As the pre-process filter processing unit, a differentiating circuit for differentiating the waveform of the image signal data can be used.

Figure 59:
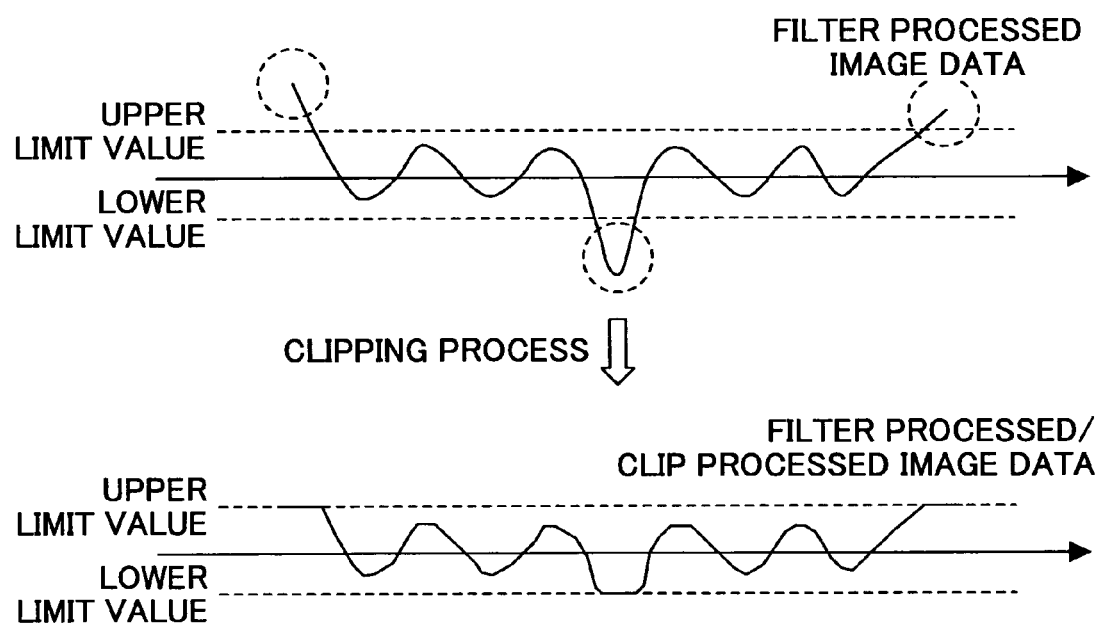
FIG. 59 is a figure for explaining a clipping process.

By performing clipping process in addition to the filter process, detection performance can be further improved. As shown in FIG. 59, for example, the clipping process is to perform a rounding process on signal parts that exceed a predetermined upper limit value or a predetermined lower limit value in the signal waveform in an filter processed image. As a result, a signal having a weak amplitude is relatively strengthened. Therefore, the level of the filter processed signal can be reduced within a setting value so that detection sensitivity of the frequency pattern can be increased.

For applying this embodiment to the first to sixth embodiments, the size normalization process unit is not included and the pass band of the band-pass filter in the pre-process filter processing unit is relatively determined according to an input image size.

(Effects of the Eighth Embodiment)

According to this embodiment, the size of the detection object image is normalized and the pre-process filtering is performed on the size normalized detection object image. Thus, the effects of the pattern of the original image data against the frequency pattern can be reduced as mentioned above so that S/N ratio in which digital watermark is regarded as a signal and the original image is regarded as a noise can be improved. Accordingly, detection can be realized more robustly.

Ninth Embodiment

Next, as to the ninth embodiment of the present invention, parts different from the first to eighth embodiments are mainly described. That is, configurations described in the first to eighth embodiments can be used as necessary as corresponding configurations other than parts described below in the ninth embodiment of the present invention.

In the following description, it is assumed that the number of divided blocks is n for each of vertical and horizontal directions, only two types of frequencies are used, and a pattern obtained by rotating a frequency pattern by 90° becomes another frequency pattern as shown in FIG. 16. In addition, it is assumed that, when performing the size normalization process, a normalizing size having an aspect ratio is specified such that each divided block becomes square.

Figure 60:
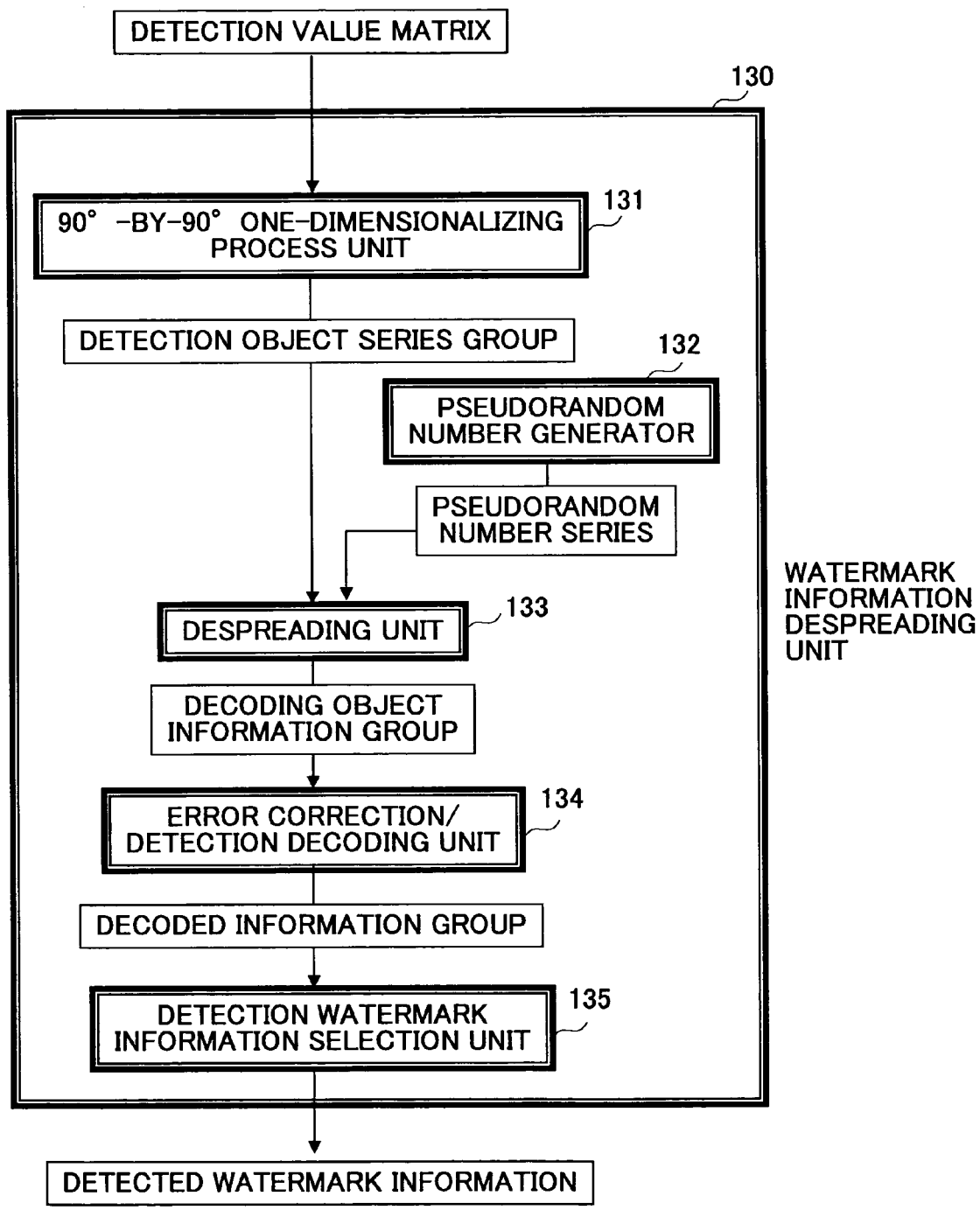
FIG. 60 is a block diagram of a watermark information despreading unit 130 of a digital watermark detection apparatus in a ninth embodiment of the present invention.
Figure 61:
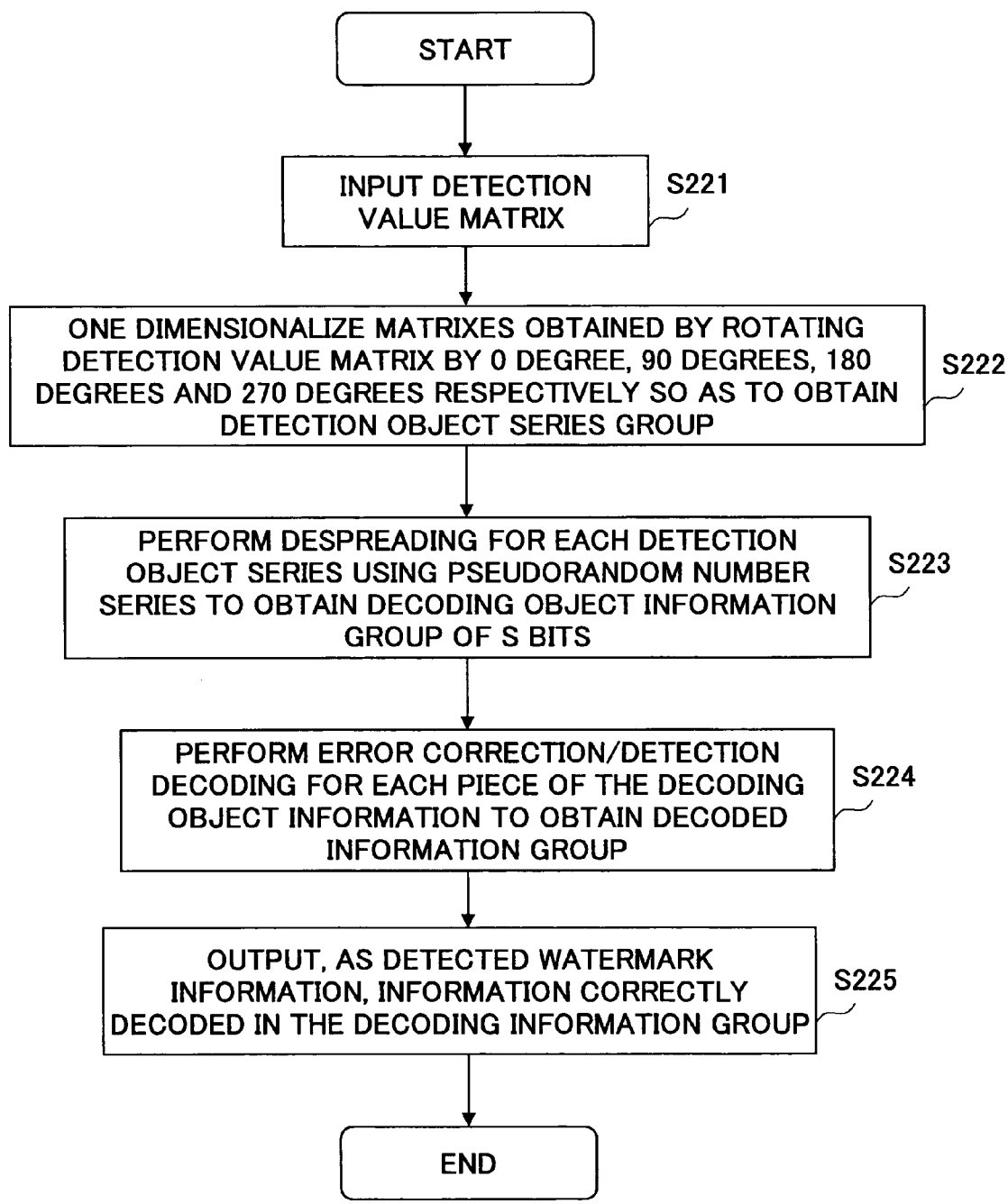
FIG. 61 is a figure showing a process flow of the watermark information despreading unit 130.

In the ninth embodiment, the watermark information despreading unit 130 in the digital watermark detection apparatus includes a function specific for this embodiment. FIG. 60 shows a configuration of the watermark information despreading unit 130 of this embodiment, and FIG. 61 shows a process flow.

As shown in FIG. 60, the watermark information despreading unit 130 of this embodiment is different from the watermark information despreading unit 34 in the first embodiment shown in FIG. 22 and the like in that the watermark information despreading unit 130 includes 90°-by-90° one-dimensionalizing process unit 131 instead of the one-dimensionalizing process unit 38 and further includes a detection watermark information selection unit 135. The process flow of the watermark information despreading unit 130 of this embodiment is described with reference to FIG. 61.

Figure 62:
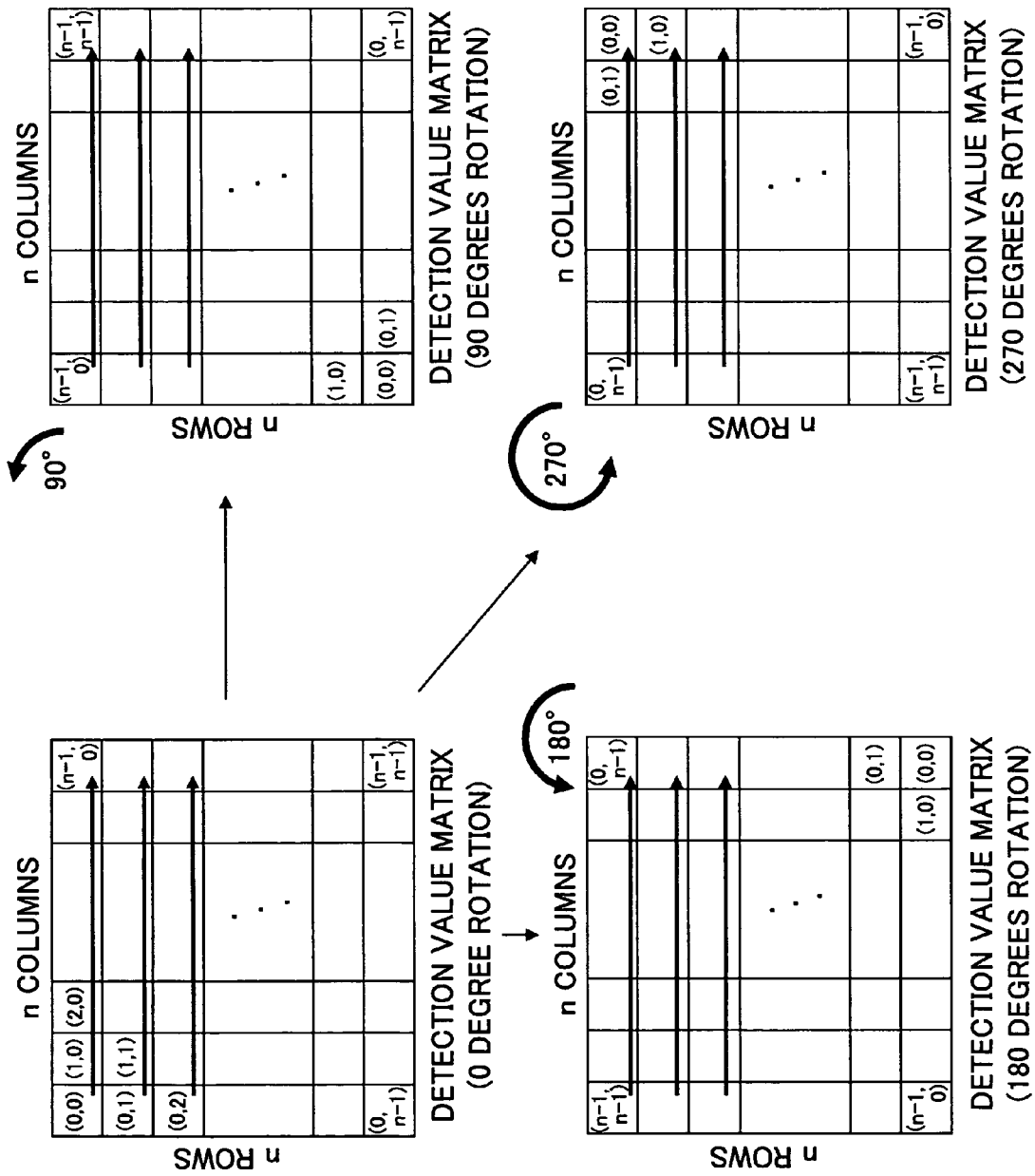
FIG. 62 is a figure (1) for explaining the operation of a 90°-by-90° one-dimensionalizing process unit 131.

The watermark information despreading unit 130 receives the detection value matrix (step 221). The 90°-by-90° one-dimensionalizing process unit 131 generates detection object series from each of matrixes rotated by 0 degree, 90 degrees, 180 degrees and 270 degrees respectively from the detection value matrix as shown in FIG. 62 in the same way as the first embodiment so as to output four detection object series as a detection object series group (step 222). At this time, as to each of the detection object series obtained from detection value matrixes rotated by 90 degrees and 270 degrees, each value of the terms of the detection object series obtained by the one-dimensionalizing process is converted such that the value becomes another value corresponding to another frequency pattern that is different from the frequency pattern corresponding to the value. For example, as the first embodiment, when a sign of the detection value is associated with a frequency, each sign of all terms in the detection value series is reversed. As to the detection object series obtained from the detection value matrixes rotated by 0 degree and 180 degrees, no conversion is necessary.

Figure 63:
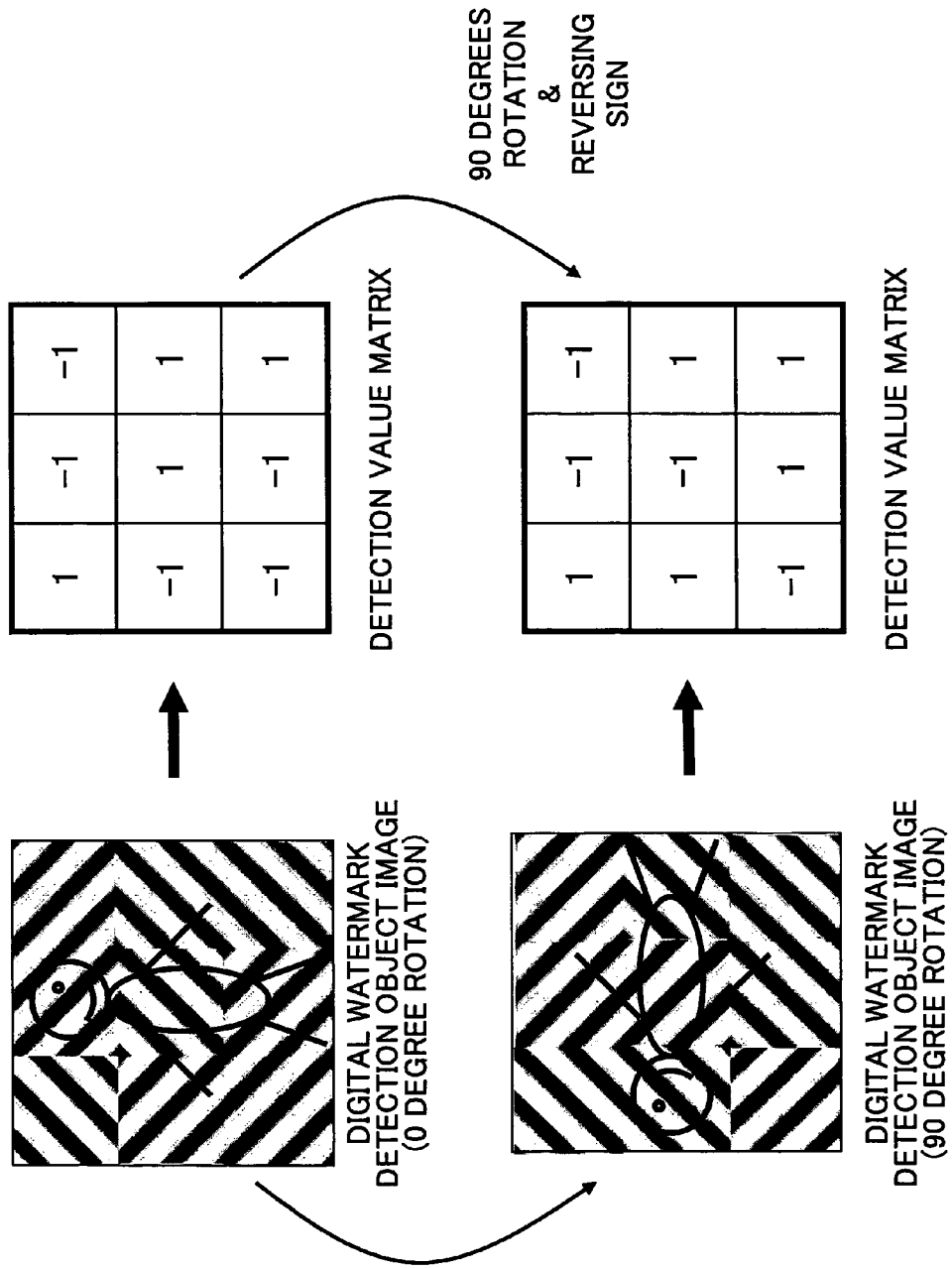
FIG. 63 is a figure (2) for explaining the operation of a 90°-by-90° one-dimensionalizing process unit 131.

The reason for converting the value of the term of the detection object series is as follows. As shown in FIG. 63, in a detection value matrix corresponding to a case when a digital watermark embedded image is input into the digital watermark detection apparatus 30 as an image rotated by 90 degrees, placement of each element is rotated by 90 degrees and the sign of each element is reversed with respect to a detection value matrix obtained an image without no rotation.

First, the reason for the fact that the placement is rotated by 90 degrees is that the placement of blocks is rotated by 90 degrees due to the rotation of the image by 90 degrees. Next, the reason for the fact that the sign of each element value is reversed is that the frequency pattern superimposed on each block is rotated by 90 degrees due to the rotation of the image by 90 degrees so that the pattern is regarded as another pattern that is not used for embedding. For performing detection from a digital watermark detection object image rotated by 90 degrees, by preparing a detection value matrix rotated by −90 degrees, that is, rotated by 270 degrees in the above-mentioned way, the detection value matrix rotated by 270 degrees in which each sign is reversed is the same as a detection value matrix obtained from a digital watermark detection object image with no rotation.

Next, in step 223 in FIG. 61, the despreading unit 133 performs despreading for each detection object series in the detection object series group so as to generate four pieces of decoding object information and output the information as a decoding object information group.

Next, the error correction/detection decoding unit 134 performs an error correction/detection decoding process for each piece of the decoding object information of the decoding object information group (step 224). Then, when there is a piece of the decoding object information including correctable error in the four pieces, the detection watermark information selection unit 135 performs correction on the piece of the decoding object information so as to output the corrected information as detected watermark information. If uncorrectable error is found in all of the four pieces, the detection watermark information selection unit 135 outputs digital watermark detection impossible (step 225).

(Effects of Ninth Embodiment)

According to this embodiment, by rotating values in the detection value matrix by 90° by 90° and by reversing the sign (for 90 degree rotation and 270 degree rotation), detection of digital watermark becomes possible even when rotation of 90° by 90° is performed. If detection is tried four times by simply rotating the input image 90° by 90°, processes including block dividing of the image and frequency energy measurement process in the block should be fully repeated four times. On the other hand, according to this embodiment, the block dividing process and the frequency energy measurement process are performed only once for obtaining the detection value matrix. After performing the processes, operation of the detection value matrix is only performed. Generally, computational complexity of image processing is larger than computational complexity of calculation process such as matrix process since the number of samples in the image processing is very large, on the other hand, the number of samples of the matrix process is relatively small (this fact is apparent by considering a case where the digital watermark detection object image includes 256×256 pixels and the detection value matrix is a 16×16 matrix). Accordingly, digital watermark detection for rotation of image by 90 degrees can be realized with efficient processes.

Although only 90° by 90° rotation is described in this embodiment, mirror image transform (right and left are reversed like an image reflected by a mirror) in addition to the 90° by 90° rotation of the image can be easily addressed. More particularly, 8 kinds of checks (four kinds of rotation angles × two kinds of mirror image transform presence or absence) need to be done including a case in which mirror image transform is performed for placement of elements of the detection value matrix and signs of each element value are reversed. Although two examples in which frequency patterns are rotated by 90 degrees each other are shown in this embodiment, more frequency patterns can be addresses by measuring frequency energy of each pattern rotated by 90 degrees when obtaining the detection value matrix.

Further, like the first-sixth embodiments, even in a case where the size normalizing process is not performed for the detection object image or in a case where the vertical dividing number and the horizontal dividing number for dividing the image into blocks are different like a case when the image is divided into m×n, the same effects of this embodiment can be obtained by dividing the image into n×m blocks when 90 degree or 270 degree rotation is addressed.

Tenth Embodiment

Next, as to the tenth embodiment of the present invention, parts different from the first to ninth embodiments are mainly described. That is, configurations described in the first to ninth embodiments can be used, as necessary, as corresponding configurations other than parts described below in the tenth embodiment of the present invention.

Figure 64:
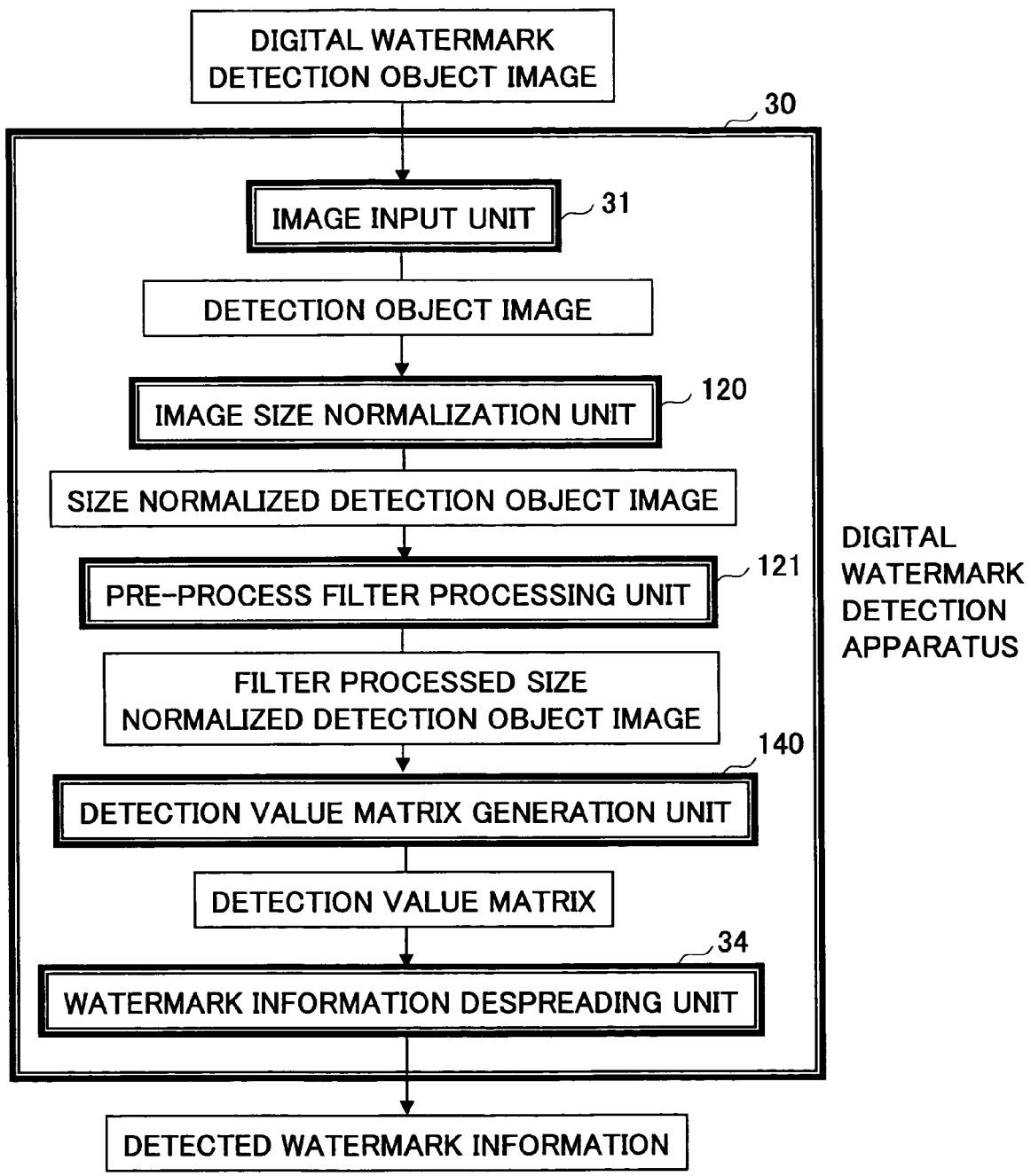
FIG. 64 is a block diagram of a digital watermark detection apparatus 30 of a tenth embodiment of the present invention.
Figure 65:
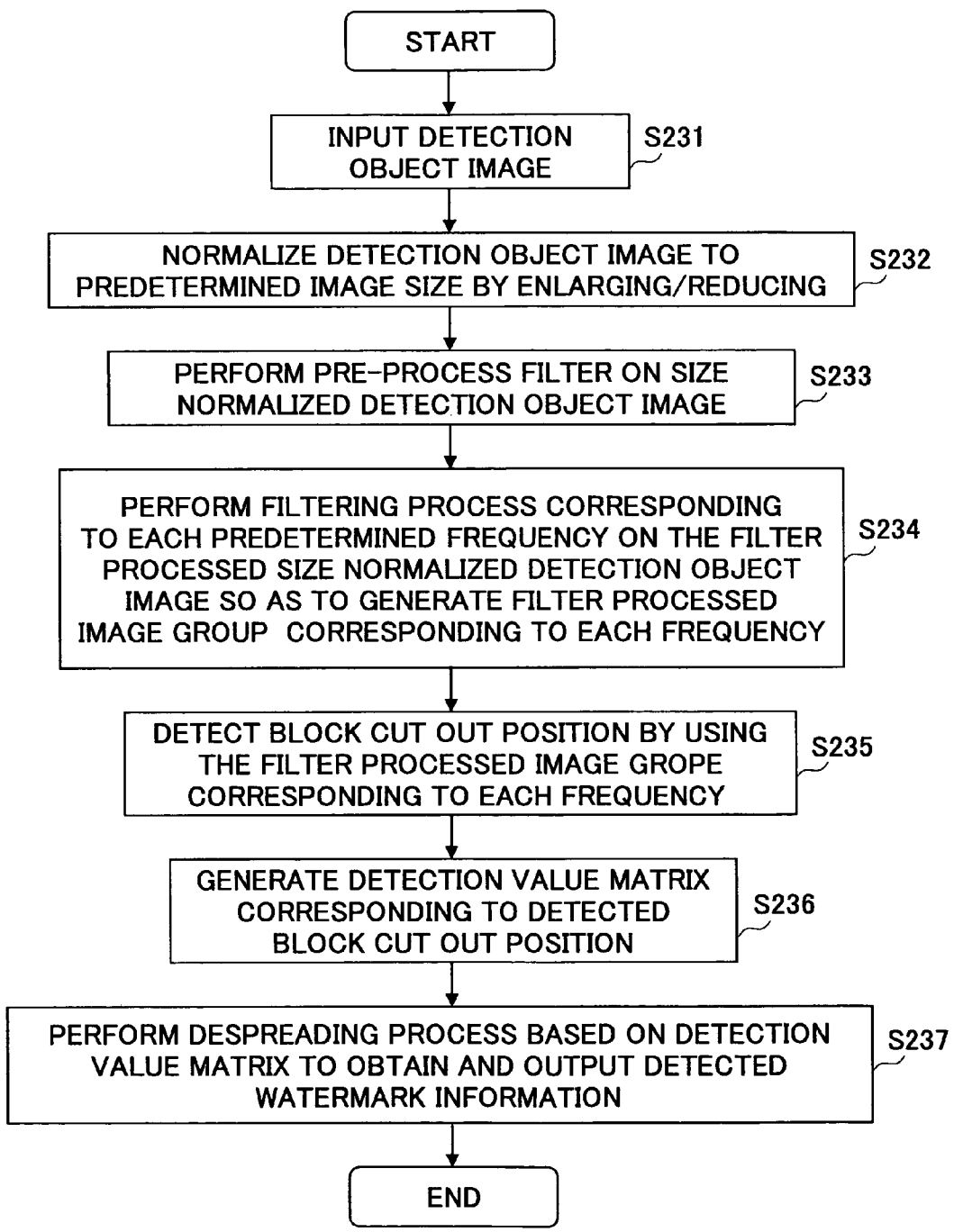
FIG. 65 shows a process flow of the digital watermark detection apparatus 30 of the tenth embodiment of the present invention.

FIG. 64 shows a configuration of the digital watermark detection apparatus 30 of the tenth embodiment of the present invention, and FIG. 65 shows a process flow. As shown in FIG. 64, the digital watermark detection apparatus 30 of this embodiment includes a detection value matrix generation unit 140 instead of the block dividing unit 32 and the block-by-block detection unit 33 in the digital watermark detection apparatus shown in FIG. 56. In this embodiment, as the image input unit 31, the image size normalization unit 120, pre-process filter processing unit 121 and the watermark information despreading unit 34, units the same as corresponding units in the eighth or ninth embodiment can be used.

In this embodiment, as shown in the flowchart of FIG. 65, after the pre-process filter processing unit 121 generates the size normalized detection object image on which filter processing has been performed (step 233), the detection value matrix generation unit 140 performs a filtering process corresponding to a predetermined frequency on the size normalized detection object image on which filter processing has been performed so as to generate a filter processed image group corresponding to each frequency (step 234). Then, a block cut out position is detected by using the filter processed image group corresponding to each frequency (step 235), and the detection value matrix generation unit 140 outputs a detection value matrix corresponding to the detected block cut out position (step 236). Finally, the watermark information despreading unit obtains detected watermark information (step 237).

Figure 66:
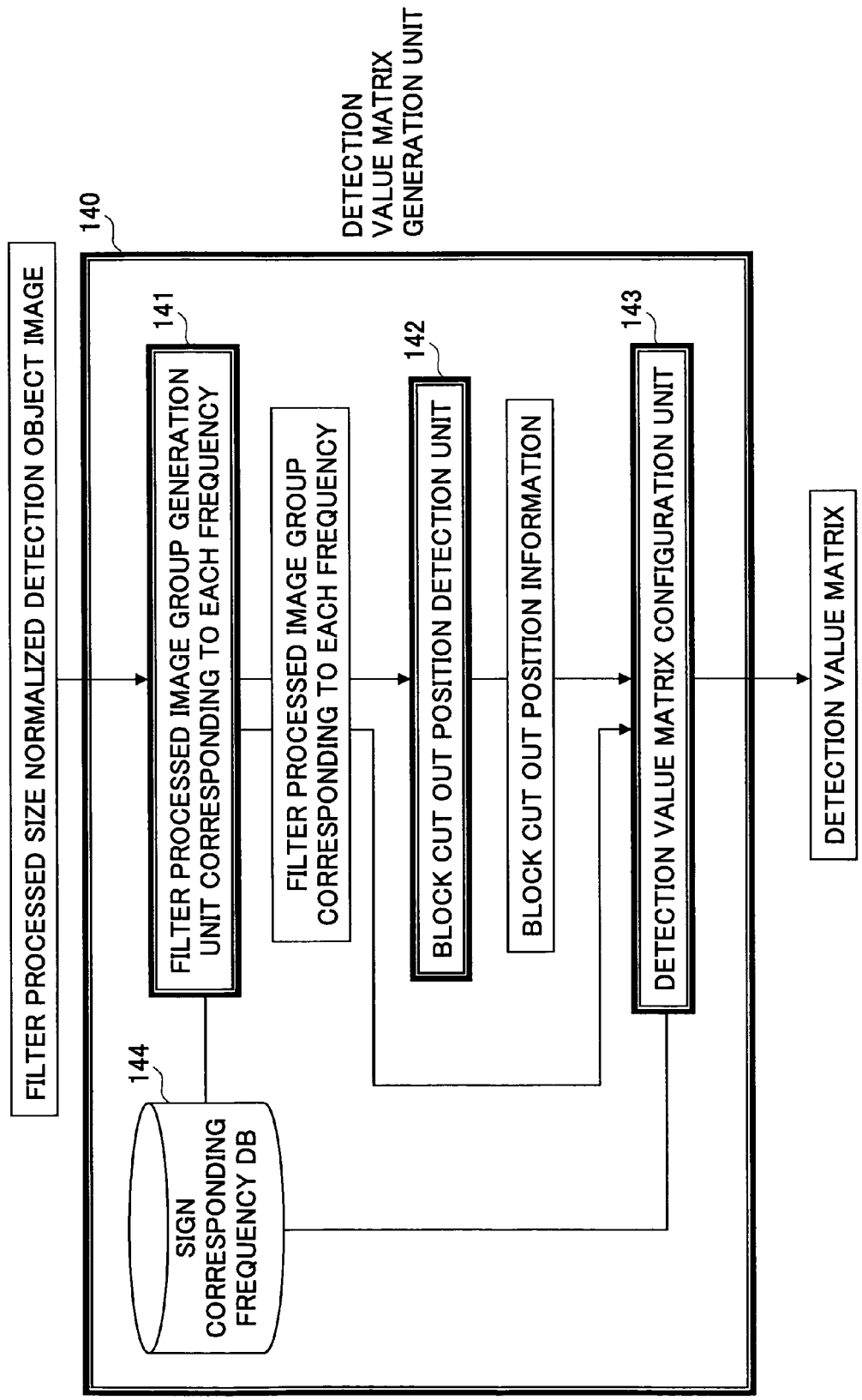
FIG. 66 is a block diagram of a detection value matrix generation unit 140.
Figure 67:
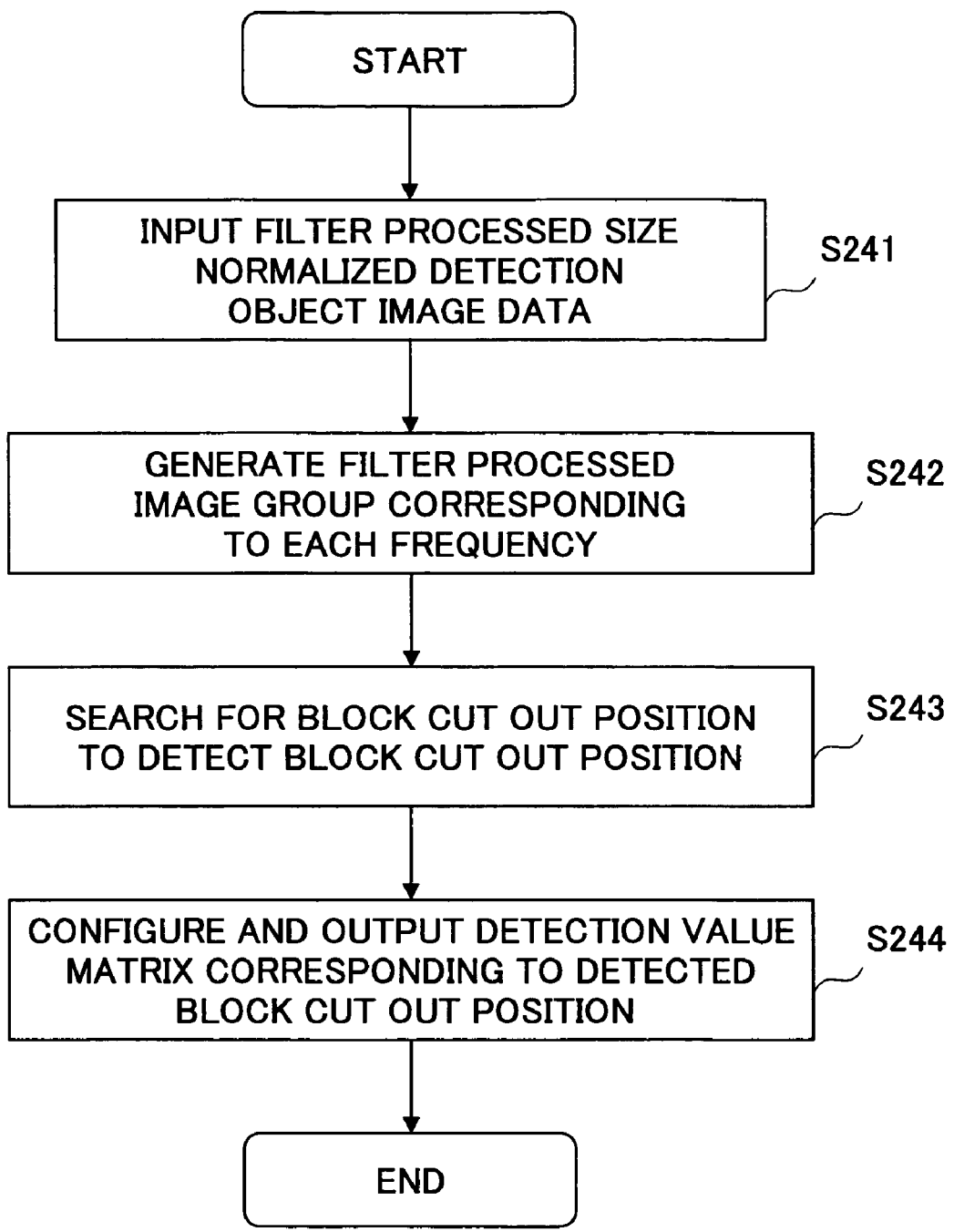
FIG. 67 shows a process flow of the detection value matrix generation unit 140.

FIG. 66 shows a configuration of the detection value matrix generation unit 140 in the tenth embodiment of the present invention, and FIG. 67 shows a process flow.

As shown in FIG. 66, the detection value matrix generation unit 140 in the tenth embodiment includes a filter processed image group generation unit 141 corresponding to each frequency, a block cut out position detection unit 142, a detection value matrix configuration unit 143, and a sign corresponding frequency database 144. Although the sign corresponding frequency database 144 is similar to the sign corresponding frequency database in the first embodiment, the sign corresponding frequency database 144 of this embodiment stores frequencies f0 and f1 corresponding to signs. The process flow is described with reference to FIG. 67.

The detection value matrix generation unit 140 receives the filter processed size normalized detection object image (step 241). Then, the filter processed image group generation unit 141 corresponding to each frequency performs convolution calculation on the filter processed size normalized image data using each convolution operator corresponding to each predetermined frequency so as to generate filter processed images the number of which is the same as the number of the kinds of the frequencies, and output the images as the filter processed image group corresponding to each frequency (step 242).

Next, the block cut out position detection unit 142 searches for the block cut out position and detects the block cut out position (step 243). Then, the detection value matrix configuration unit 143 configures a detection value matrix corresponding to the detected block cut out position and outputs it (step 244). In the following, processes of each unit are described in more detail.

Figure 68:
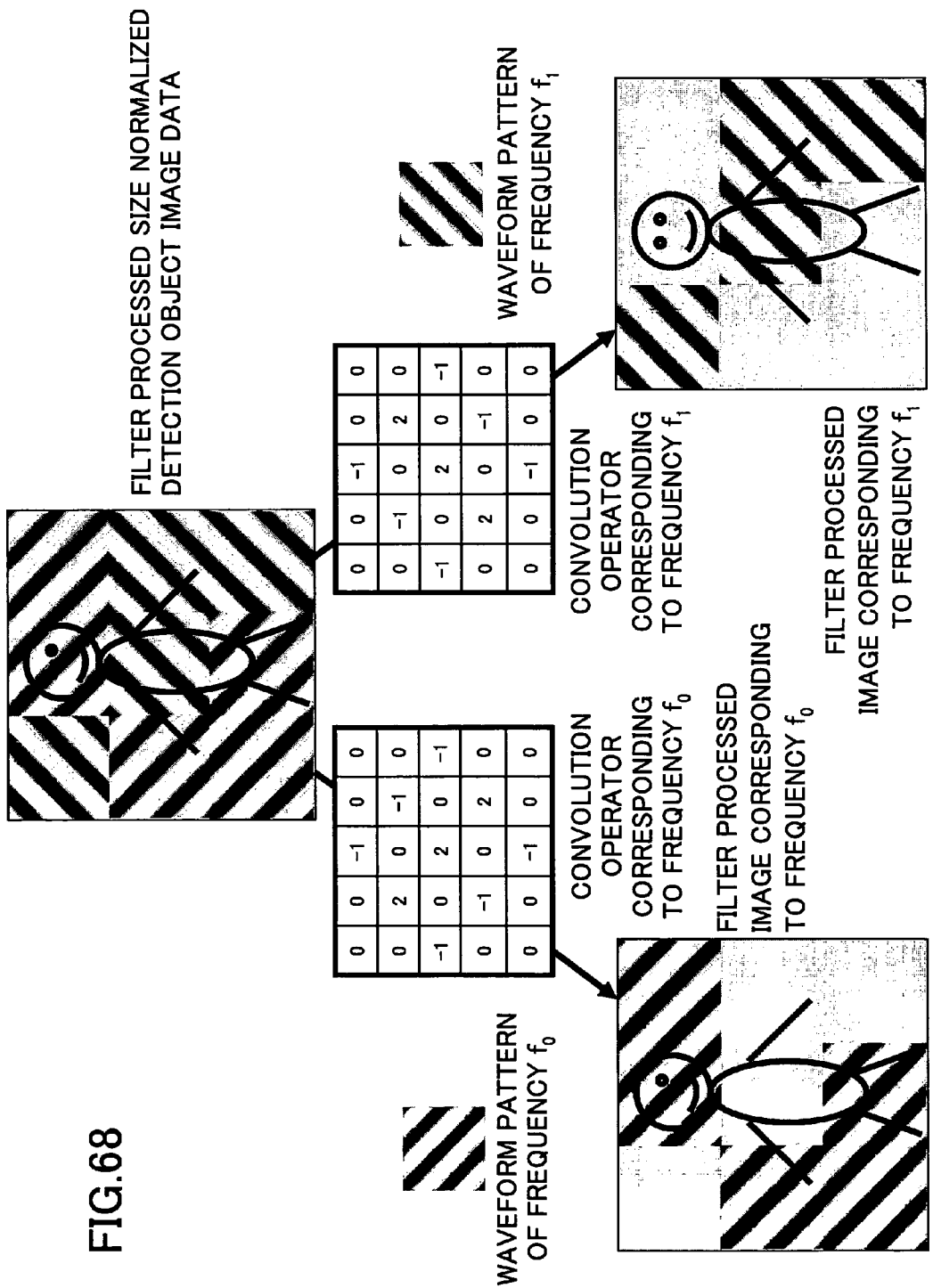
FIG. 68 is a diagram for explaining the operation of the filter processed image group generation unit 141 corresponding to each frequency.

FIG. 68 is a diagram for explaining the process of the filter processed image group generation unit 141 corresponding to each frequency. Since the predetermined frequencies are two kinds f0 and f1, the filter processed image group generation unit 141 generates two filter processed images from the filter processed size normalized detection object image. That is, as shown in FIG. 68, the filter processed image group generation unit 141 performs convolution calculation for each pixel of the filter processed size normalized detection object image while scanning pixels sequentially using each convolution operator corresponding to each frequency so as to generate two filter processed images corresponding to two frequencies. At this time, as shown in FIG. 68, in a block region of the filter processed image in which frequency corresponding to the convolution operator is the same as the frequency pattern at the time of embedding, a value with a large absolute value appears. In a block region in which frequency corresponding to the convolution operator is not the same as the frequency pattern at the time of embedding, a value with a small absolute value appears (in the figure, bright region indicates a plus value with a large absolute value, and dark region indicates a minus value with a large absolute value). Since the convolution calculation is regarded as partially performing correlation calculation, this is apparent considering the fact that a correlation value having a large absolute value is obtained when the patterns are the same, and that a correlation value having a small absolute value is obtained when the patterns are not the same. These two filter processed images are output as the filter processed image group corresponding to each frequency. When any pixel value cannot be referred to at an end point of the image, for example, at the time of convolution calculation, a proper method is adopted for calculation according to cases, for example, calculation is performed by assuming that the pixel value is 0.

Figure 69:
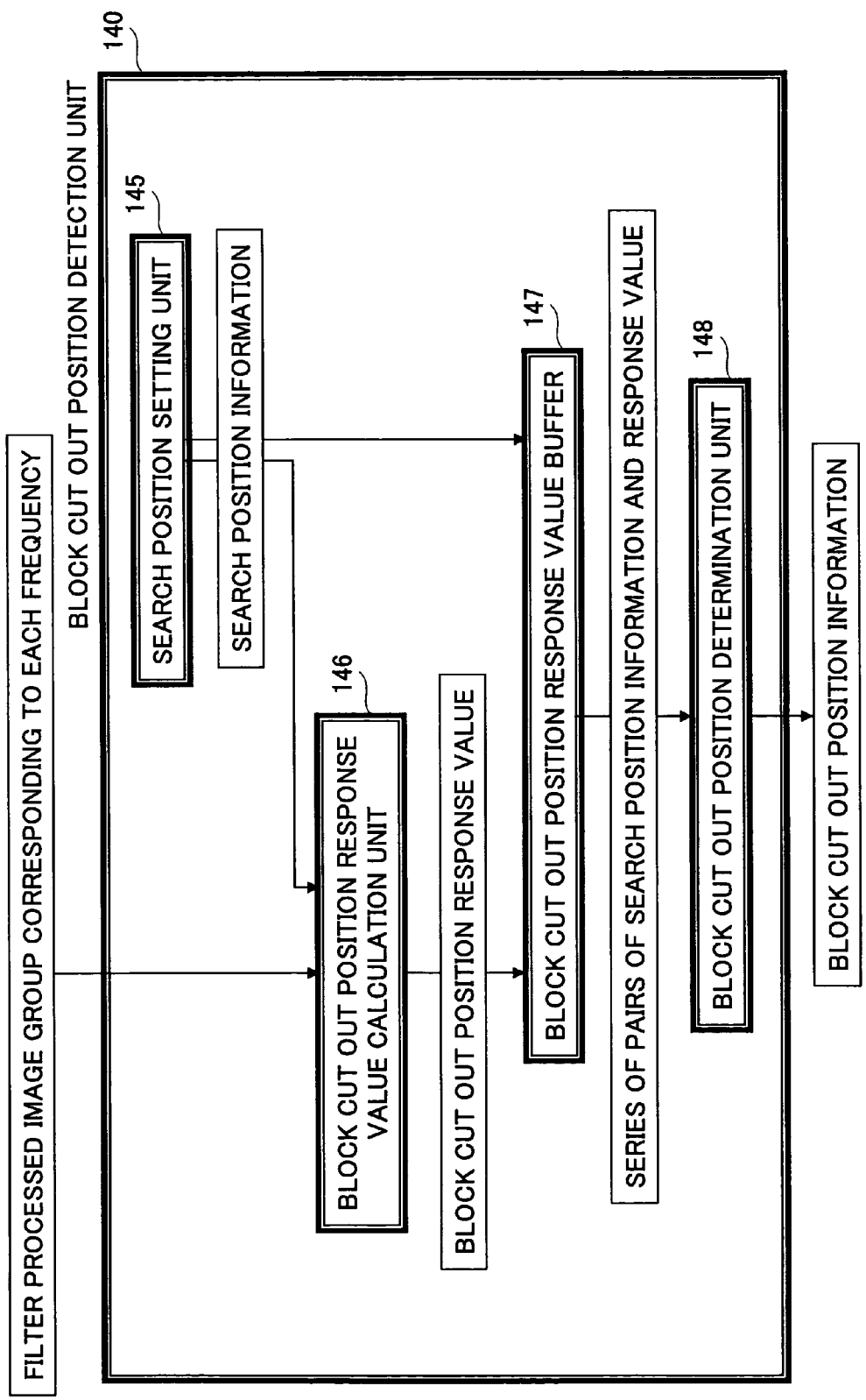
FIG. 69 is a block diagram of a block cut out position detection unit 142.
Figure 70:
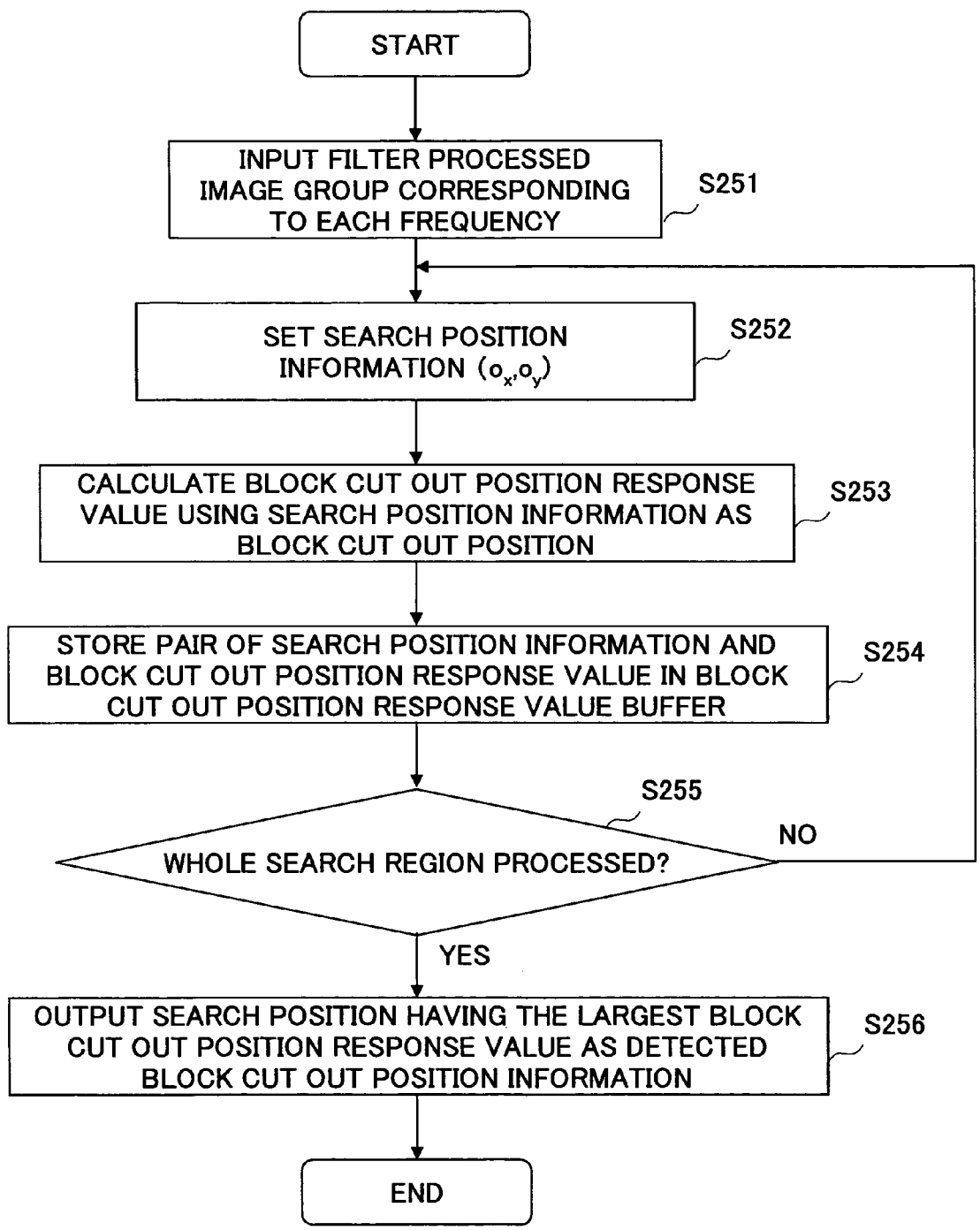
FIG. 70 is a figure showing a process flow of the block cut out position detection unit 142.

Next, the block cut out position detection unit 142 is described in more detail. FIG. 69 shows a configuration of the block cut out position detection unit 142, and FIG. 70 shows a process flow.

As shown in FIG. 69, the block cut out position detection unit 142 includes a search position setting unit 145, a block cut out position response value calculation unit 146, a block cut out position response value buffer 147 and a block cut out position determining unit 148. In the following, the process flow is described with reference to FIG. 70.

The block cut out position detection unit 142 receives the filter processed image group corresponding to each frequency (step 251). Then, the search position setting unit 145 generates search position information ($o_x$, $o_y$) in a predetermined search region (step 252). Next, the block cut out position response value calculation unit 146 obtains a block cut out position response value assuming that the coordinates indicated by the search position information are the block cut out position (step 253).

The obtained block cut out position response value is stored in a block cut out position response value buffer with corresponding position information as a pair (step 254). This process is performed for every search position included in the predetermined search region (step 255). Finally, the block cut out position determination unit 148 outputs search position information having the largest block cut out position response value as detected block cut out position information (step 256).

Figure 71:
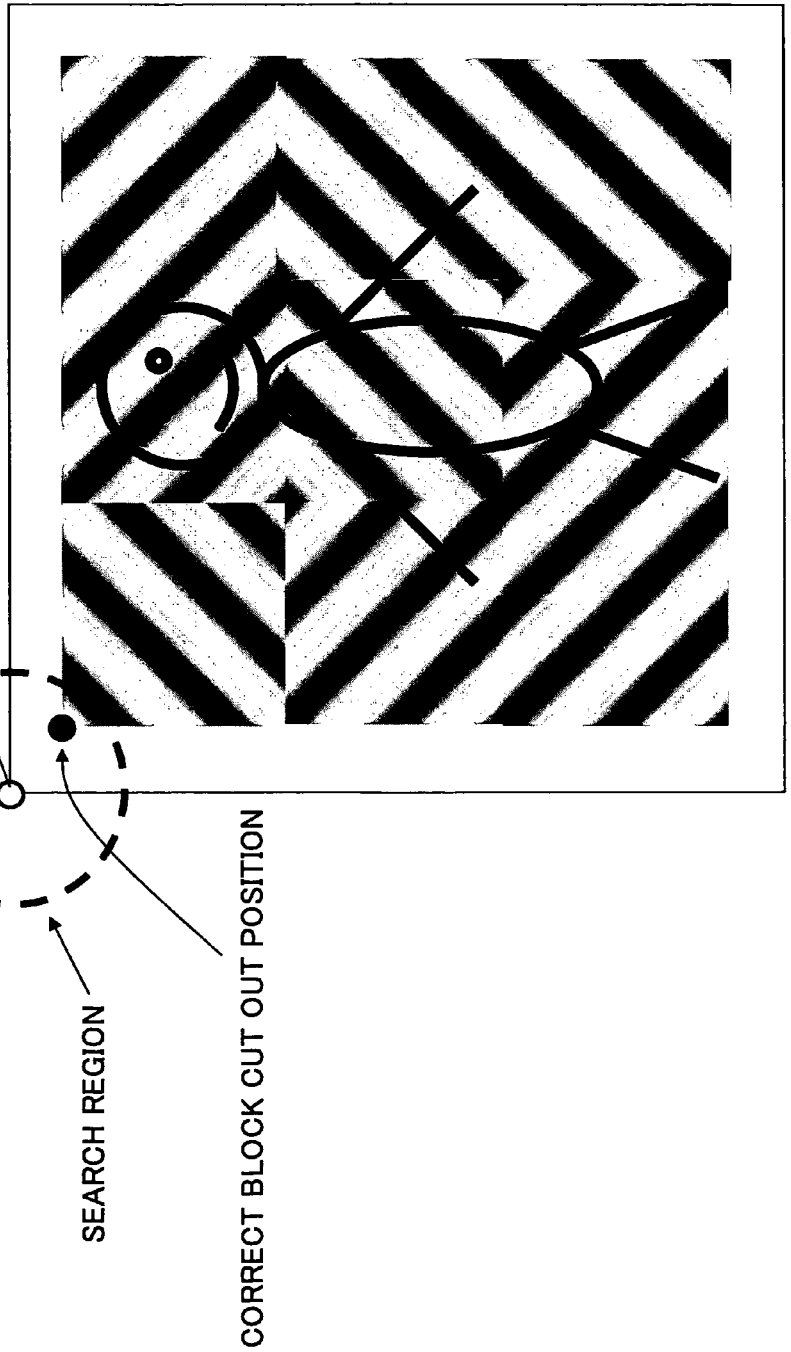
FIG. 71 is a figure for explaining search position information.

FIG. 71 shows an example of the search position information. The search region is a neighborhood having a size in which an upper left end point of the filter processed size normalized detection object image is the center of the neighborhood (wherein the upper left end point is also an upper left end point of each image of the filter processed image group corresponding to each frequency since the size of the image is the same as that of each of the filter processed size normalized detection object image), and coordinates ($o_x$, $o_y$) included in the neighborhood are sequentially selected as the search position information. For example, assuming that upper left end point coordinates of the filter processed size normalized detection object image are (0, 0), the search position ($o_x$, $o_y$) is selected as a coordinate point in a region included in a circle centered on a point of the origin with a radius r, that is, the search position satisfies SQRT ($o_x^2 + o_y^2$)<r (wherein SQRT(•) indicates square root). Even when the digital watermark detection object image at the time of input is shifted to some extent with respect to the original digital watermark embedded image, if a correct block cut out position exists in the neighborhood, the correct block cut out position can be detected by using a response value calculation method in which the block cut out position response value becomes a value larger than any other search positions when the search position agrees with the correct block cut out position. The block cut out position response value calculation unit 146 in the block cut out position detection unit 142 in the tenth embodiment is configured from this viewpoint. In the following, the block cut out position response value calculation unit 146 is described.

Figure 72:
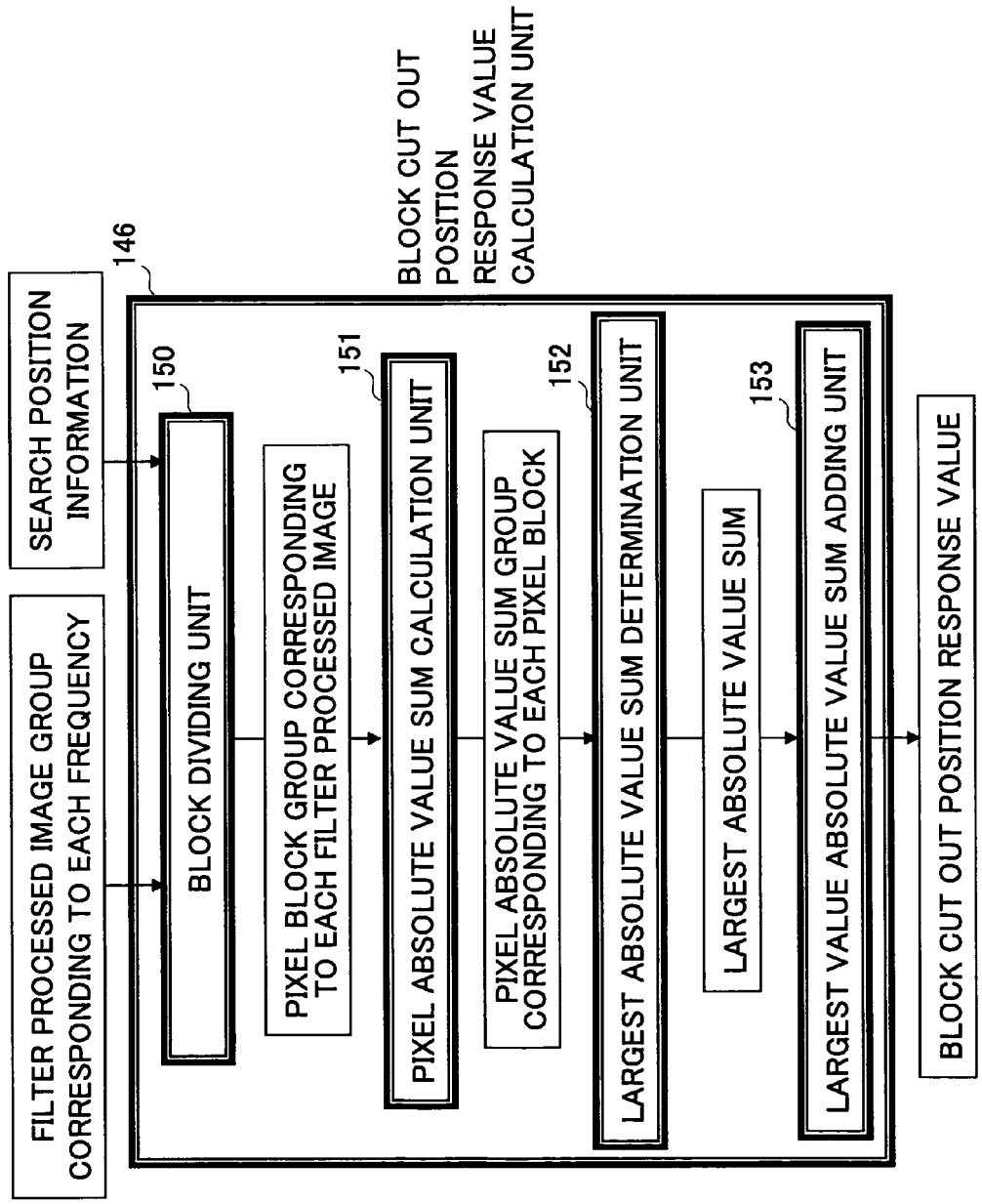
FIG. 72 is a block diagram of a block cut out position response value calculation unit 146.
Figure 73:
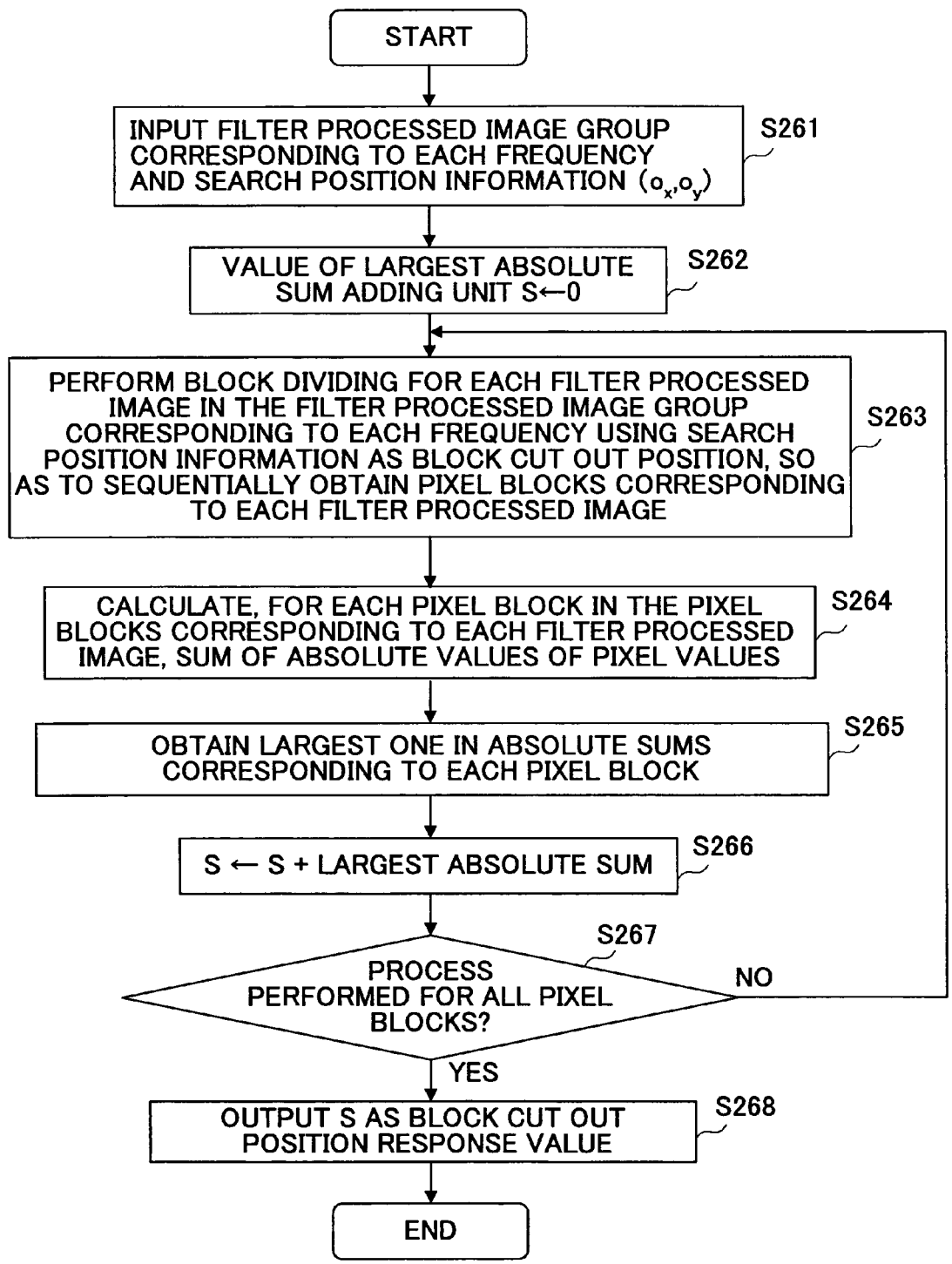
FIG. 73 is a figure showing a process flow of the block cut out position response value calculation unit 146.

FIG. 72 shows a configuration of the block cut out position detection unit 142 of the tenth embodiment of the present invention, and FIG. 73 shows a process flow. As shown in FIG. 72, the block cut out position-response value calculation unit 146 includes a block dividing unit 150, a pixel absolute value sum calculation unit 151, a largest value absolute value sum determination unit 152 and a largest value absolute value sum adding unit 153. The process flow of the block cut out position response value calculation unit 146 is described with reference to FIG. 73.

The block cut out position response value calculation unit 146 receives the filter processed image group corresponding to each frequency and search position information (step 261). In addition, the value of the largest value absolute value sum adding unit 153 is initialized (step 262).

The block dividing unit 150 performs block dividing for each filter processed image in the filter processed image group corresponding to each frequency using the coordinates indicated by the search position information as a block cut out position, so as to sequentially obtain pixel blocks of each filter processed image locating at the same block position (step 263).

Next, the pixel absolute value sum calculation unit 151 calculates, for each pixel block in the pixel blocks locating at the same block position and corresponding to each filter processed image, a sum of absolute values of pixel values in the pixel block to obtain a pixel absolute value sum group corresponding to each pixel block (step 264).

Next, the largest value absolute value sum determination unit 152 selects one having the largest value from the pixel absolute value sum group corresponding to each pixel block so as to obtain the value as a largest absolute value sum (step 265). Finally, the largest value absolute value sum adding unit 153 adds the largest absolute value sum to S that has 0 as an initial value (step 266). Processes from the pixel absolute value sum calculation unit 151 to the largest value absolute value sum determination unit 152 are repeatedly performed for each pixel block group corresponding to each filter processed image obtained in the block dividing (step 267). Then, S that is obtained by the above-mentioned processes is output as a block cut out position response value (step 268).

Figure 74:
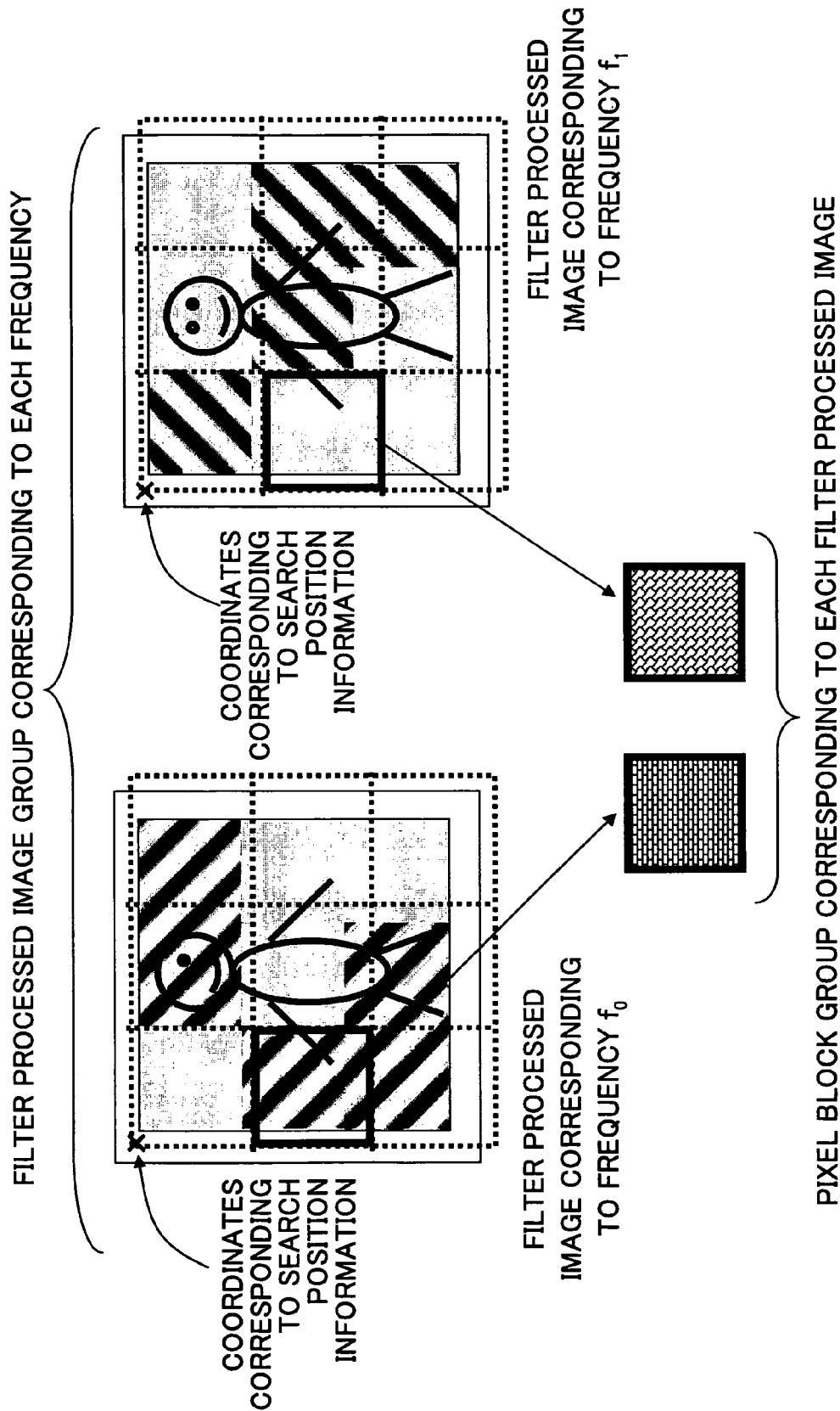
FIG. 74 is a figure for explaining the operation of a block dividing unit 150.

FIG. 74 is a diagram for explaining the process of the block dividing unit 150. The block dividing unit 150 receives the filter processed image group corresponding to each frequency and search position information, and performs block dividing for each filter processed image in the filter processed image group corresponding to each frequency using the coordinates indicated by the search position information as a block cut out position, so as to sequentially output pixel blocks located at the same block position and corresponding to each filter processed image. The size of each pixel block is a size of a block obtained by dividing each filter processed image (having the same size) by a predetermined number of blocks. In a case where a pixel outside of the image size should be referred to when performing block dividing based on the coordinates indicated by the search position information, a proper method is adopted for configuring the pixel blocks by assuming that the pixel value is 0, for example.

FIG. 75 is a diagram for explaining the operation of the pixel absolute value sum calculation unit 151. As mentioned above, the pixel absolute value sum calculation unit 151 receives the pixel block group corresponding to each filter processed image, calculates total sum of absolute values of pixel values for each pixel block so as to output the results as a pixel absolute value sum group corresponding to each pixel block. This process corresponds to calculating energy of the frequency that are associated with the pixel block when generating each pixel block.

Next, the reason why the block cut out position response value calculation unit 146 having the above-mentioned configuration outputs the large value when the coordinates indicated by the search position information is a correct block cut out position is described. When performing block cut out as shown in FIG. 74, if the search position information indicates a position largely separated from a block dividing position, each pixel block obtained by cutting out is shifted from block dividing positions at the time of digital watermark embedding. Thus, the cut out pixel block includes a pixel region other than the frequency pattern superimposed at the time of embedding. Therefore, the energy of the superimposed frequency becomes smaller than that in a case where the block is correctly cut out. In addition, the frequency having the largest energy in each block is the same as the frequency corresponding to the frequency pattern superimposed at the time of embedding if the search position and the block dividing position are not largely separated (depending on the area of the superimposed frequency pattern occupied in the pixel block).

Therefore, on condition that the shifted amount is no more than the half of the vertical/horizontal size of the block, when the coordinates indicated by the search position information approximately correspond to the correct block cut out position, the largest frequency energy value of the pixel block, that is, the largest absolute value sum becomes a large value. As a result, the block cut out position response value that is total sum of the largest absolute value sums also becomes a large value. In the above description, the reason of mentioning "approximately corresponds" is described in the following. As shown in FIG. 76, when enlargement/reduction, not simple translation, is included to some extent in the detection object image, the largest block cut out position response value is not necessarily obtained at the correct block cut out position. However, even in the case, when evaluating using whole blocks, there is a case where the largest block cut out position response value can be obtained at a cut out position at which the frequency energy is largest. Even in this case, when the amount of enlarging/reduction is minute, the frequency having the largest energy in each pixel block almost corresponds to the frequency corresponding to the frequency pattern superimposed at the time of embedding. Thus, correct detection watermark information can be obtained in the watermark information despreading unit. At the same time, since the block cut out position is searched such that the largest frequency energy can be obtained when performing evaluation in the whole pixel blocks, detection gain for the frequency pattern at the time of embedding is set largest. Thus, tolerance can be improved compared with a case where the search is not performed.

Figure 77:
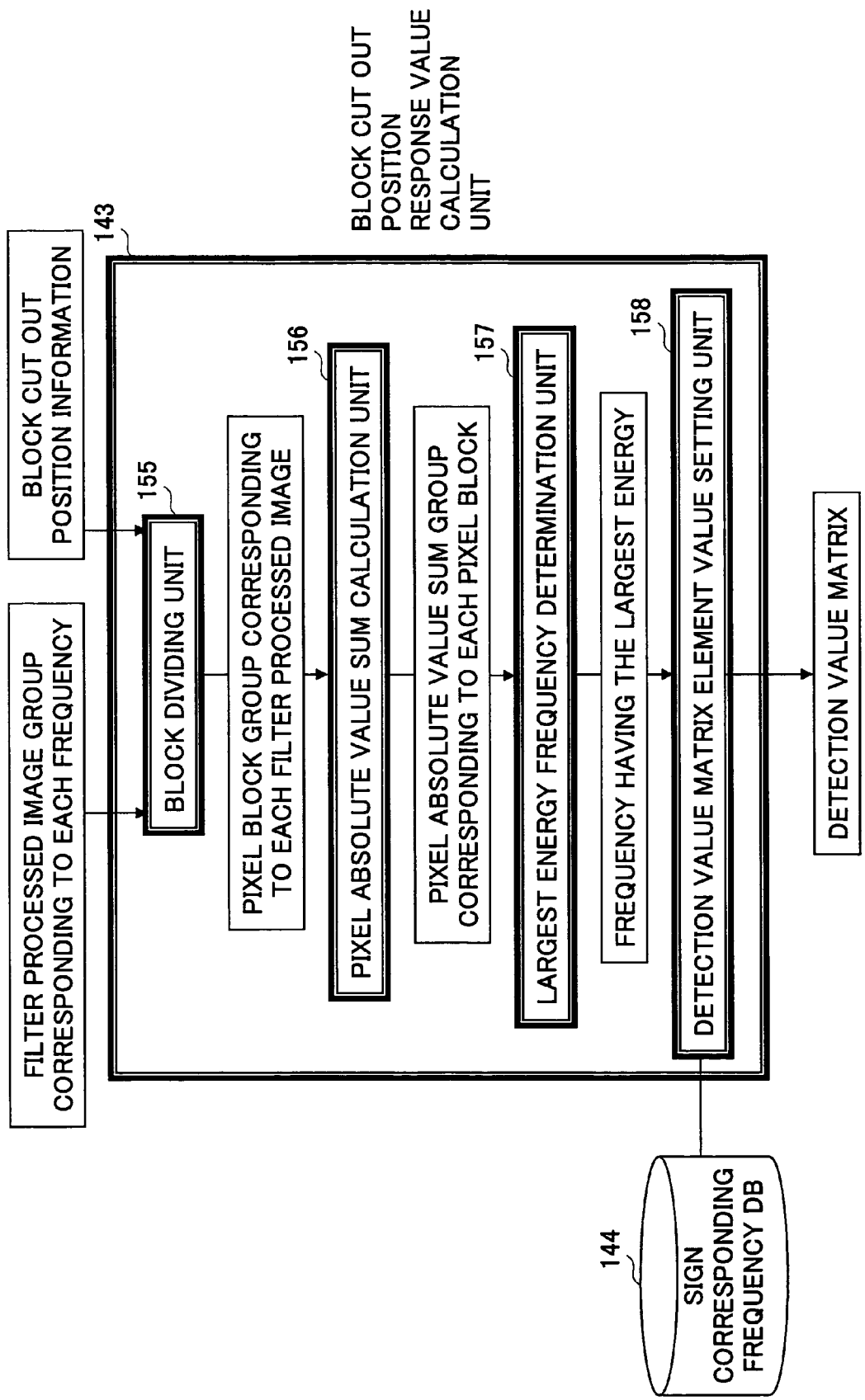
FIG. 77 is a block diagram of a detection value matrix configuration unit 143.
Figure 78:
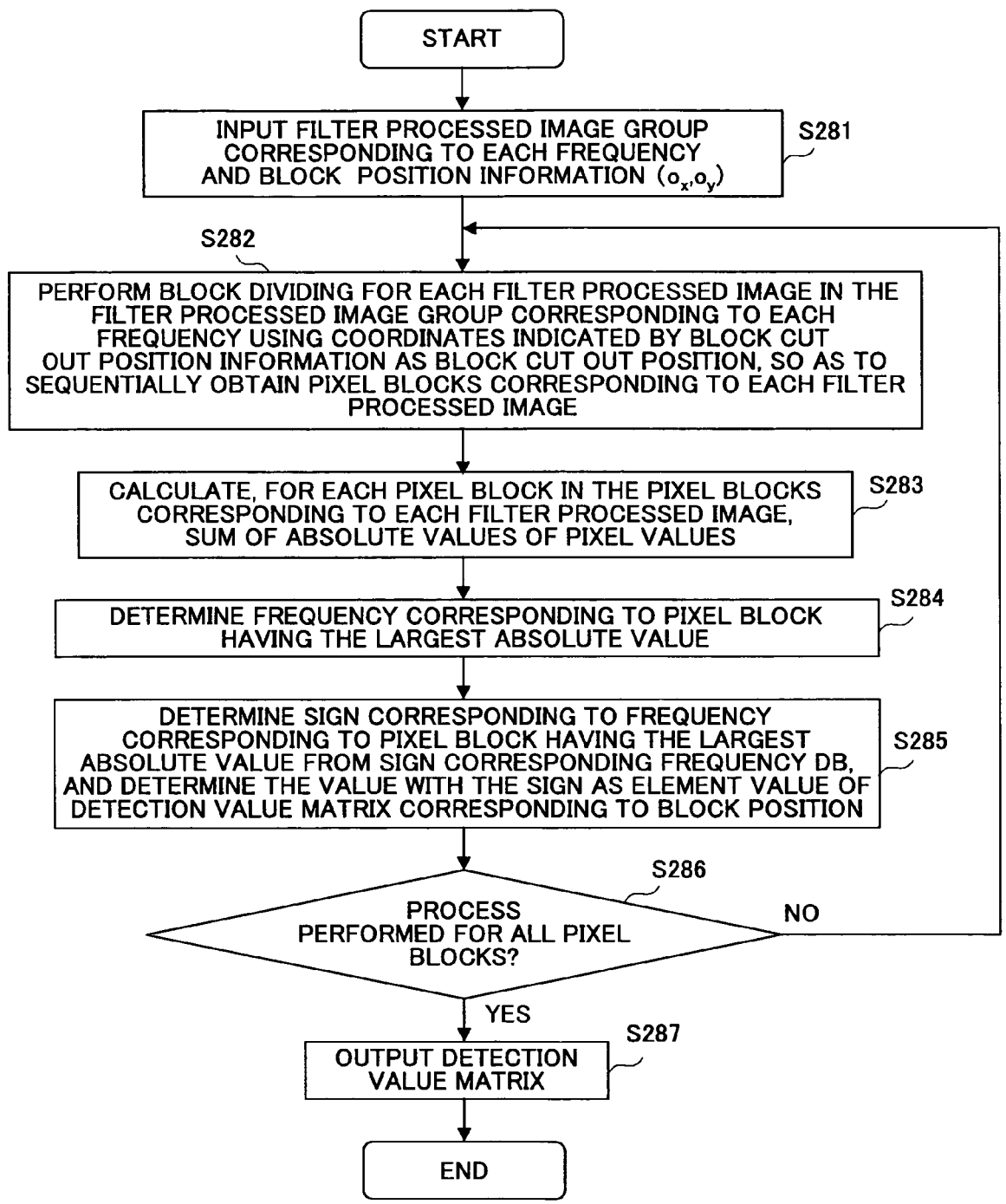
FIG. 78 is a figure showing a process flow of the detection value matrix configuration unit 143.

Next, the detection value matrix configuration unit 143 in the detection value matrix generation unit 140 of the tenth embodiment is described in more detail. FIG. 77 shows a configuration of the detection value matrix configuration unit 143 and FIG. 78 shows a process flow.

As shown in FIG. 77, the detection value matrix configuration unit 143 includes a block dividing unit 155, a pixel absolute value sum calculation unit 156, a largest energy frequency determination unit 157, a detection value matrix element value setting unit 158. The process flow of the detection value matrix configuration unit 143 is described with reference to FIGS. 78 and 79.

The detection value matrix configuration unit 143 receives the filter processed image group corresponding to each frequency and the block cut out position information determined by the block cut out position detection unit 142 (step 281). The block dividing unit 155 performs block dividing for each filter processed image in the filter processed image group corresponding to each frequency using the coordinates indicated by the block cut out position information, so as to sequentially obtain pixel blocks locating at the same block position and corresponding to each filter processed image (step 282).

Next, the pixel absolute value sum calculation unit 156 receives the pixel block group corresponding to each filter processed image, calculates, for each pixel block in the pixel block group, a sum of absolute values of pixel values in the pixel block to output the sums as a pixel absolute value group corresponding to each pixel block (step 283). The processes of the block dividing unit 155 and the pixel absolute value sum calculation unit 156 in the detection value matrix configuration unit 143 are the same as the block dividing unit 150 and the pixel absolute value sum calculation unit 151 in the block cut out position response value calculation unit 146.

Next, the largest energy frequency determination unit 157 determines which filter processed image associated with a frequency the pixel block that has the largest value in the pixel absolute value sum group corresponds to (step 284) and outputs the associated frequency as a frequency having the largest energy. Finally, the detection value matrix element value setting unit 158 determines a sign (− or +) corresponding to the frequency having the largest energy from the sign corresponding frequency database 144 so as to set −1 or +1 as an element value corresponding to the block position in the detection value matrix (step 285). Although this part of the process is the same as a corresponding process in the first embodiment, the process may be the same as a corresponding process in other embodiments. In addition, the largest pixel absolute value sum with the sign may be set as the element value of the detection value matrix.

The processes performed from the pixel absolute value sum calculation unit 156 to the detection value matrix element value setting unit 158 are repeatedly performed for every block position (step 286) and the results are output as the detection value matrix (step 287).

Figure 79:
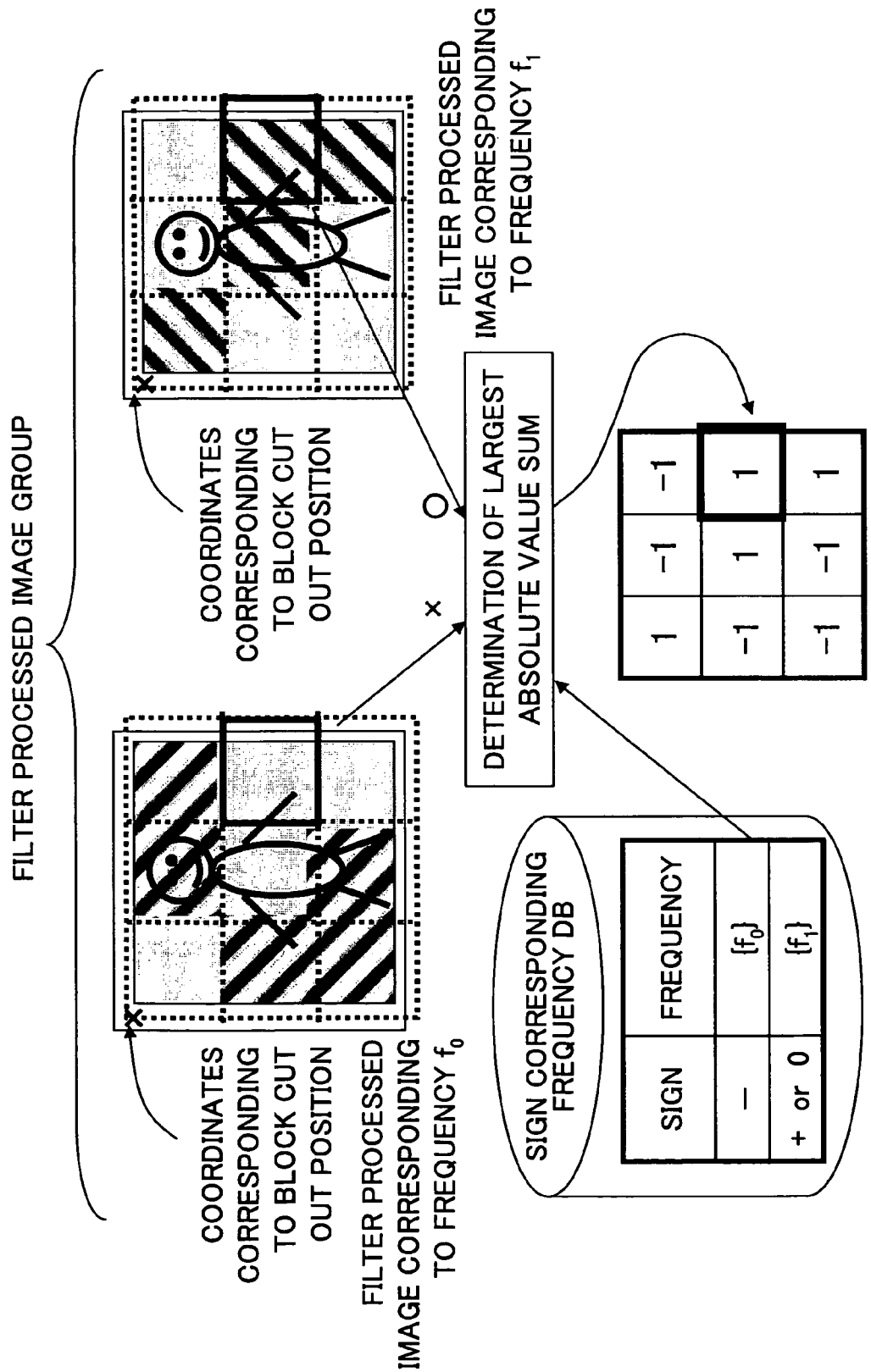
FIG. 79 is a figure for explaining the process flow of the detection value matrix configuration unit 143.

The process flow of the detection value matrix configuration unit 143 is described more concretely with reference to FIG. 79. FIG. 79 shows an example in which two kinds of frequencies: f0 and f1 are used. The detection value matrix configuration unit 143 divides each filter processed image in the filter processed image group corresponding to each frequency to blocks using coordinates corresponding to the block cut out position information as a block cut out position to generate the pixel block group corresponding to each filter processed image. Then, the detection value matrix configuration unit 143 obtains the absolute value sum of pixel values for each pixel block in a pixel block group so as to determine which frequency is associated with the pixel block having the largest pixel absolute sum to obtain the frequency as the largest energy frequency for each block dividing position. Then, the detection value matrix configuration unit 143 determines a sign corresponding to the largest energy frequency from the sign corresponding frequency database so as to set the value (−1 or 1) as an element value corresponding to the block position in the detection value matrix.

(Effects of Tenth Embodiment)

According to this embodiment, even if the detection object image is shifted from the state of the original digital watermark embedded image and even if the detection object image is affected by enlargement/reduction, the watermark information can be detected more robustly according to the reason described in this embodiment.

In addition, although watermark embedding and detection are performed using the sign corresponding frequency database like the first and second embodiments in this embodiment, watermark embedding and detection using the quantized value corresponding frequency database like the third embodiment can be also applied in this embodiment.

In addition, according to this embodiment, when detection is performed in the state in which the detection object image is shifted from the state of the original digital watermark embedded image and the detection object image is affected by enlargement/reduction, compared with a simple method in which block dividing is performed while perturbing the input image and the frequency energy is measured every time of the perturbation for each frequency energy, filtering process corresponding to energy measurement for each frequency is necessary only once. When searching for the block cut out position, it is only necessary to repeat performing block dividing based on the search position and calculating the absolute value sum of pixel values for each block. Thus, efficient process is realized.

Eleventh Embodiment

Next, as to the eleventh embodiment of the present invention, parts different from the first to tenth embodiments are mainly described. That is, configurations described in the first to tenth embodiments can be used as necessary as corresponding configurations other than parts described below in the eleventh embodiment of the present invention.

Figure 80:
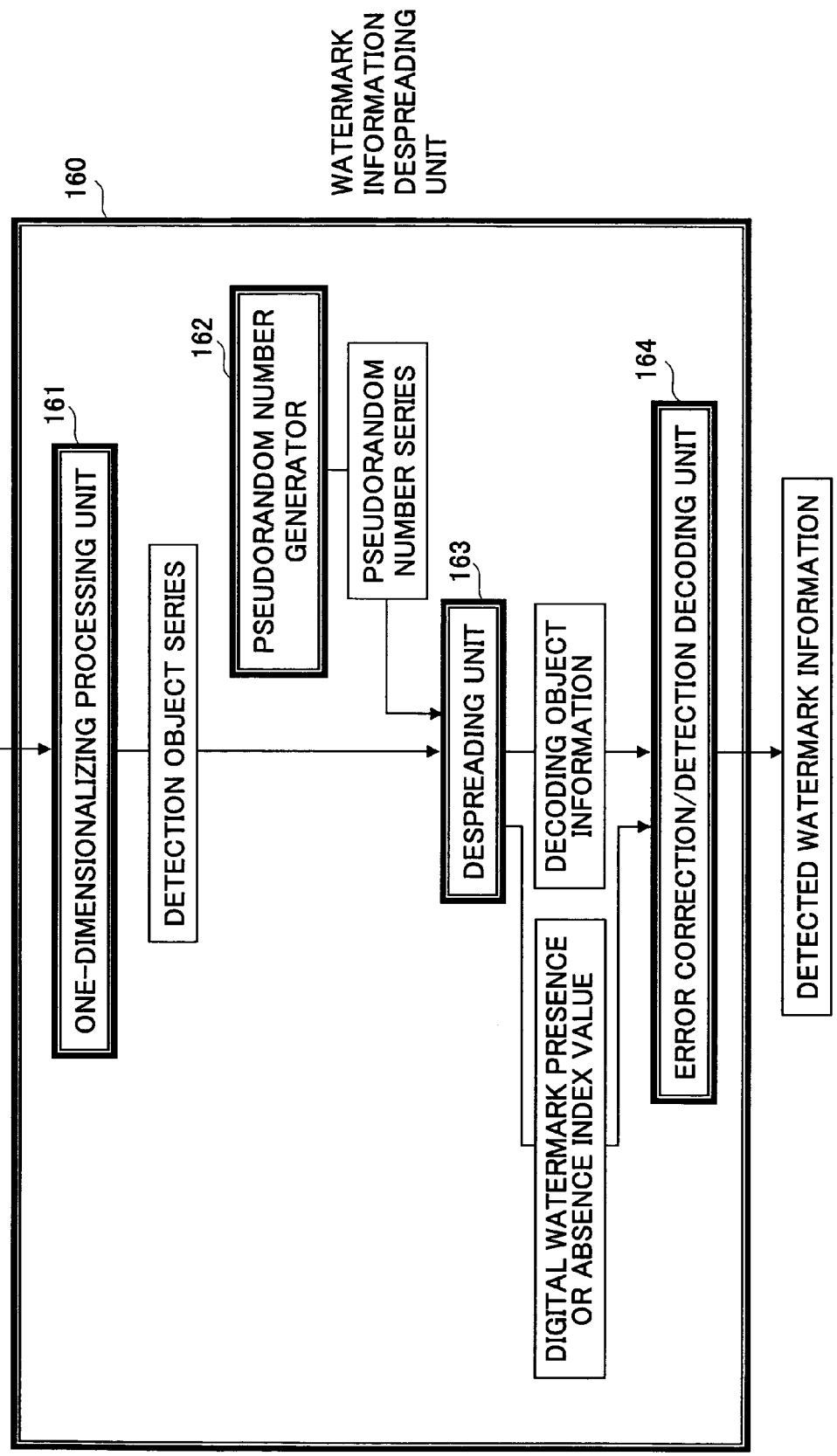
FIG. 80 is a block diagram of a watermark information despreading unit 160 in the digital watermark detection apparatus of the eleventh embodiment of the present invention.
Figure 81:
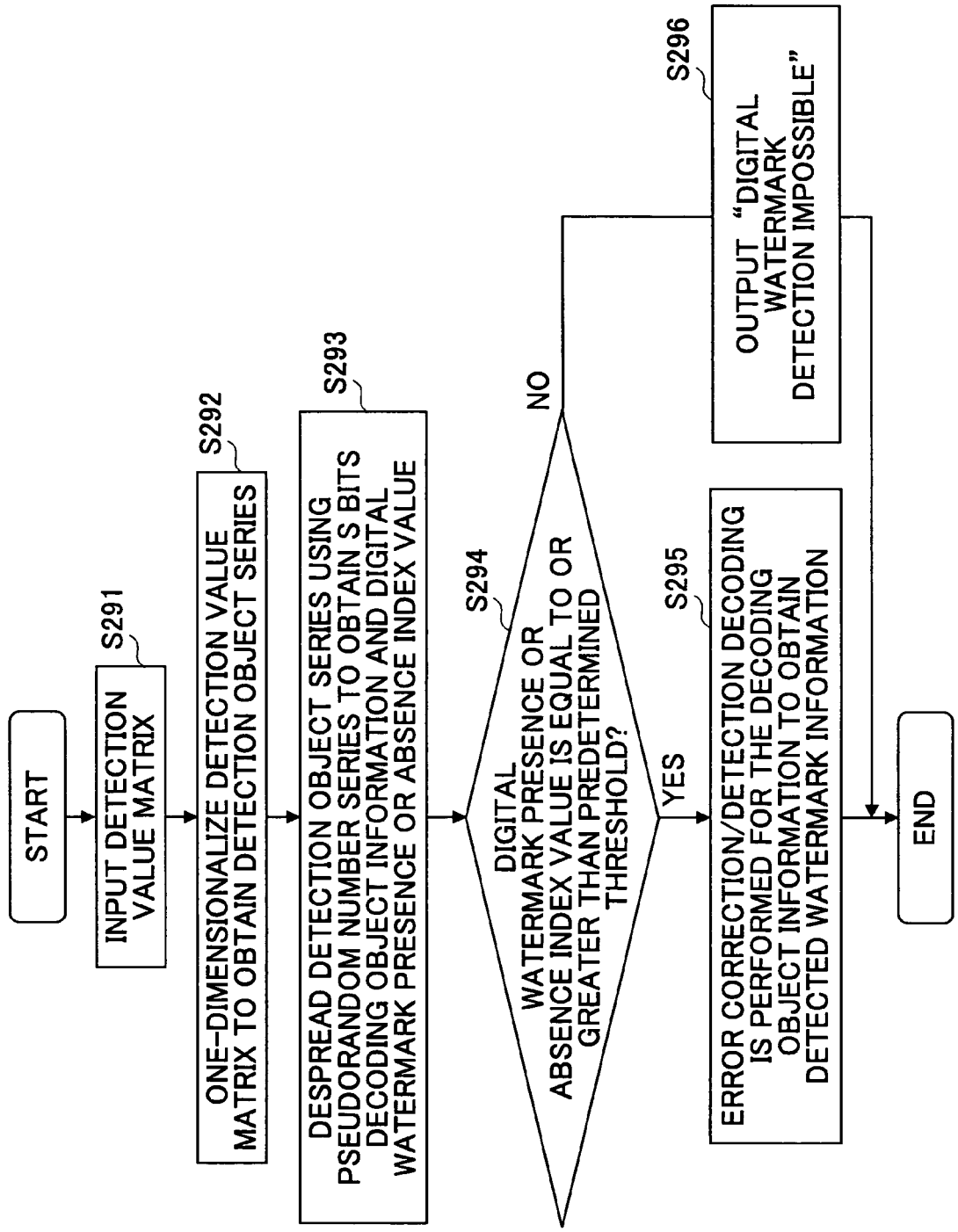
FIG. 81 is a figure showing a process flow of the watermark information despreading unit 160.

FIG. 80 shows a configuration of a watermark information despreading unit 160 in the digital watermark detection apparatus of the eleventh embodiment of the present invention, and FIG. 81 shows a process flow. As shown in FIG. 80, the watermark information despreading unit 160 in the eleventh embodiment has a configuration similar to the watermark information despreading unit of the first embodiment. However, operations of the despreading unit 163 and the error correction/detection decoding unit 164 are different. The process flow is described with reference to FIG. 81.

The watermark information despreading unit 160 receives the detection value matrix (step 291). The one-dimensionalizing process unit 161 converts the detection value matrix into a detection object series that is an one-dimensional series having a length of m×n (step 292). This conversion procedure is based on a rule the same as one used in the embedding term selection unit in the digital watermark embedding apparatus. For example, by applying a rule the same as one in the before-mentioned rule, the one-dimensionalizing processing unit 161 sets an element (m0, n0) of the detection value matrix as a term $d_i$ (i=m0+n0×m (m is a total number of blocks in the x direction)) as shown in FIG. 24.

Next, the despreading unit 163 despreads the detection object series using pseudorandom number series so as to obtain decoding object information. The pseudorandom number series is generated using the pseudorandom number generator 162 the same as the pseudorandom number generator in the digital watermark embedding apparatus.

As a concrete despreading method, following methods corresponding to spreading methods at the time of embedding (following (A)-(C) correspond to spreading methods (A)-(C) at the time of embedding respectively) can be used:

(A) When the detection object series is $\{d_i\}$ (i=0~mn−1) and the pseudorandom number series is $\{r_i\}$ (i=0~mn−1), the decoding object information (S bits) $\{c_k\}$ (k=0~S−1) is obtained in the following way, $Cor_k$ is obtained by $$Cor_k = (\Sigma_{(i=0\sim mn-1) \cap (i\% S = k)}(d_i \times r_i)) / SQRT(\Sigma_{(i=0\sim mn-1) \cap (i\% S = k)} d_i^2) \quad (k=0\sim S-1)$$

and the bit value is determined in the following way:

$Cor_k >= 0 \rightarrow c_k = \text{``1''}$ $Cor_k < 0 \rightarrow c_k = \text{``0''}$ wherein $r_i$ is a random number series in which $r_i$=1 or −1. In addition, x % y is a surplus when dividing x by y, and SQRT(•) indicates square root.

(B) When the detection object series is $\{d_i\}$ (i=0~mn−1) and two types of pseudorandom number series are generated which are $\{r1_i\}$ (i=0~mn−1) and $\{r2_i\}$ (i=0~mn−1) respectively, the decoding object information (S bits) $\{c_k\}$ (k=0~S−1) is obtained in the following way. First, an array $\{p_i\}$ used for permutation is generated using $\{r1_i\}$ in the same way in embedding.

Next, $Cor_k$ is obtained by $$Cor_k = (\Sigma_{(i=0\sim mn-1) \cap (pi\% S = k)}(d_{pi} \times r2_{pi})) / SQRT(\Sigma_{(i=0\sim mn-1) \cap (i\% S = k)} d_{pi}^2) \quad (k=0\sim S-1)$$

and the bit value is determined in the following way:

$Cor_k >= 0 \rightarrow c_k = \text{``1''}$ $Cor_k < 0 \rightarrow c_k = \text{``0''}$ wherein $r2_i$ is a random number series in which $r_i$=1 or −1. In addition, x % y is a surplus when dividing x by y, and SQRT(•) indicates square root.

(C) When the detection object series is $\{d_i\}$ (i=0~mn−1) and the pseudorandom number series is $\{r_i\}$ (i=0~mn−1), the decoding object information (S bits) $\{c_k\}$ (k=0~S−1) is obtained in the following way.

$Cor_k$ is obtained by $$Cor_k = (\Sigma_{(i=0\sim mn-1)}(d_i \times r_{(i+k) \% mn})) / SQRT(\Sigma_{(i=0\sim mn-1)} d_i^2) \quad (k=0\sim S-1)$$

and the bit value is determined in the following way:

$Cor_k >= 0 \rightarrow c_k = \text{``1''}$ $Cor_k < 0 \rightarrow c_k = \text{``0''}$ wherein $r_i$ is a random number series in which $r_i$=1 or −1. In addition, x % y is a surplus when dividing x by y, and SQRT(•) indicates square root.

The despreading unit 163 generates digital watermark presence or absence index value with the decoding object information (step 293). This value is an index value indicating detected signal strength of the decoding object information obtained by despreading. In the examples of the above-mentioned (A), (B) and (C), the digital watermark presence or absence index value E is calculated in the following way, for example.

$$E = \Sigma_{(k=0\sim S-1)} |Cor_k|$$

Finally, the error correction/detection decoding unit 164 checks whether the digital watermark presence or absence index value is equal to or greater than a predetermined threshold (step 294). When the digital watermark presence or absence index value is less than the predetermined threshold, digital watermark detection impossible is output (step 296). When the digital watermark presence or absence index value is equal to or greater than the predetermined threshold, error correction/detection decoding is performed on the decoding object information so as to obtain detected watermark information (step 295). At this time, when an error is detected in the decoding object information, if the error is correctable, the error is corrected so that detected watermark information is output. If uncorrectable error is detected, digital watermark detection impossible is output.

(Effects of the Eleventh Embodiment)

According to this embodiment, in a case where digital watermark detection is attempted from a detection object image in which digital watermark is not embedded or distortion is too large to detect watermark, it can be avoided to erroneously determine that erroneous watermark information is "correctly" detected. Thus, reliability of the detected watermark information can be realized.

Figure 82:
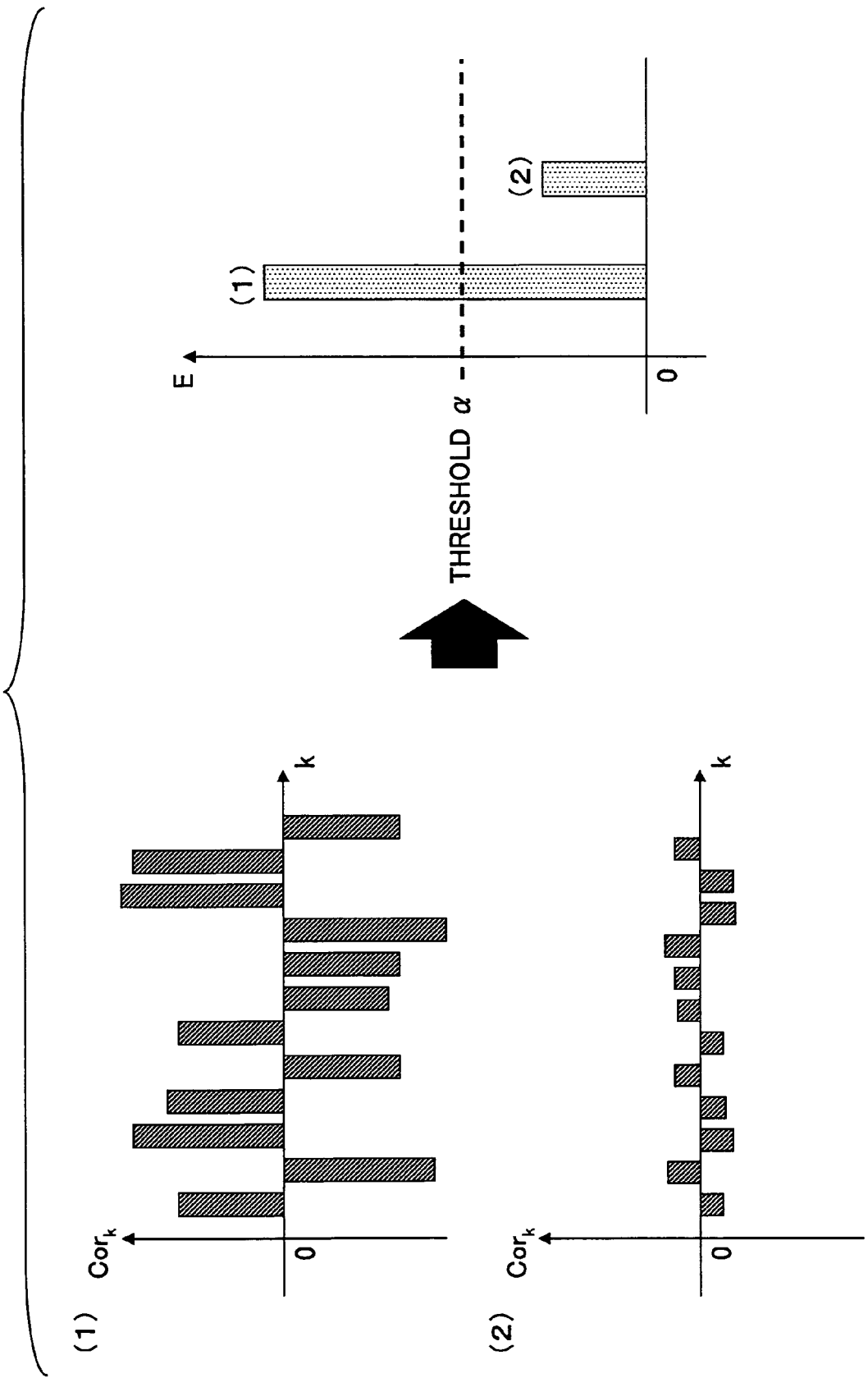
FIG. 82 is a figure for explaining effects of the eleventh embodiment.

The reason that an example of the digital watermark presence or absence index value functions effectively is described with reference to FIG. 82. (1) in FIG. 82 shows values of $Cor_k$ when digital watermark detection is properly performed. (2) shows values of $Cor_k$ when digital watermark detection is not properly performed for reasons such as that digital watermark is not embedded and that a detection object image having distortion too large to detect the digital watermark signal is provided. As shown in FIG. 82(1), when the watermark can be properly detected, since correlation between random number series used for embedding and detection object series obtained from the detection object image is high, the absolute value of each of $Cor_k$ becomes large. On the other hand, when detection is not properly performed, the absolute value of each of $Cor_k$ becomes small. In the despreading examples (A), (B) and (C) in this embodiment, since correlation with the random number series is calculated after normalizing the norm of the detection object series, the evaluation can be performed with the same criterion for different detection object images and for different watermark information. As mentioned above, as shown in the right side of FIG. 82, the digital watermark presence or absence index value E that is absolute value sum of $Cor_k$ becomes a large value for the case of (1), and becomes a small value for the case of (2). Therefore, by using the predetermined threshold $\alpha$, it can be determined whether digital watermark detection can be correctly performed. In a case where a partial error is corrected in the detected watermark information using the error correction code, generally there is a risk that erroneous correction (correct to wrong code) may occur when error exceeding correction ability occurs in the error correction code. However, the problem of the erroneous correction can be avoided by combining with threshold determination of the digital watermark presence or absence index value like this embodiment.

In this embodiment, processes are performed from threshold determination of the digital watermark presence or absence index value to error determination by error correction/detection decoding process as described in the following. First, threshold determination is performed for the digital watermark presence or absence index value, so that when the value is less than the threshold, digital watermark detection impossible is output and the process ends. When the value is equal to or greater than the threshold, error correction/detection decoding is performed. For a correctable error, error correction is performed and detected watermark information is output and the process ends. When uncorrectable error is detected, digital watermark detection impossible is output and the process ends. This process order may be reversed. More concretely, first, when uncorrectable error is detected by the error correction/detection decoding process, digital watermark detection impossible is output and the process ends. When the error is correctable, error correction is performed so that detected watermark information is generated. Then, threshold determination for the digital watermark presence or absence index value is performed. When the value is smaller than the threshold, digital watermark detection impossible is output and the process ends. When the value is equal to or greater than the threshold, the detected watermark information obtained before is output and the process ends.

Each apparatus described in each embodiment can be realized by installing a program for executing functions of the apparatus in a computer. The program can be distributed by storing the program in a recording medium such as a CD-ROM or a memory, and can be distributed via a network.

The present invention is not limited to the specifically disclosed embodiments, and variations and modifications may be made without departing from the scope of the invention.

The invention claimed is:

1. A digital watermark detection apparatus for detecting digital watermark information from an image on which a two dimensional waveform pattern is superimposed on each pixel block, the digital watermark detection apparatus comprising:
   a block dividing unit configured to divide an input image into plural pixel blocks;
   a block-by-block detection unit configured to, for a pixel block on which the two dimensional waveform pattern is superimposed, determine a frequency, of the two dimensional waveform pattern, having a larger energy from two kinds of frequencies associated with a sign + and a sign −, to obtain a sign corresponding to the determined frequency, and to obtain a value according to the sign as a detection value corresponding to the pixel block; and
   a watermark information despreading unit configured to despread a series of detection values corresponding to the plural pixel blocks obtained by the block-by-block detection unit so as to detect the digital watermark information embedded in the image.

2. The digital watermark detection apparatus as claimed in claim 1, wherein the value according to the sign is 1 or −1.

3. The digital watermark detection apparatus as claimed in claim 1, wherein the value according to the sign is a value obtained by adding the sign to the larger energy value.

4. A digital watermark detection method in a digital watermark detection apparatus for detecting digital watermark information from an image on which a two dimensional waveform pattern is superimposed on each pixel block, the digital watermark detection method comprising:
   a block dividing step of dividing, by the digital watermark detection apparatus, an input image into plural pixel blocks;
   a block-by-block detection step of, for a pixel block on which the two dimensional waveform pattern is superimposed, determining, by the digital watermark detection apparatus, a frequency, of the two dimensional waveform pattern, having a larger energy from two kinds of frequencies associated with a sign + and a sign − respectively, obtaining a sign corresponding to the determined frequency, and obtaining a value according to the sign as a detection value corresponding to the pixel block; and
   a watermark information despreading step of despreading a series of detection values corresponding to the plural pixel blocks obtained by repeating the block-by-block detection step so as to detect the digital watermark information embedded in the image.

5. The digital watermark detection method as claimed in claim 4, wherein the value according to the sign is 1 or −1.

6. The digital watermark detection method as claimed in claim 4, wherein the value according to the sign is a value obtained by adding the sign to the larger energy value.

* * * * *